(12) United States Patent
Peng et al.

(10) Patent No.: US 12,373,152 B2
(45) Date of Patent: Jul. 29, 2025

(54) DISTRIBUTED INTERFACE DISPLAY METHOD, ELECTRONIC DEVICE, AND COMMUNICATION SYSTEM

(71) Applicant: Huawei Technologies Co., Ltd., Shenzhen (CN)

(72) Inventors: Yuzhuo Peng, Shenzhen (CN); Hongjun Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/643,822

(22) Filed: Apr. 23, 2024

(65) Prior Publication Data

US 2024/0281190 A1    Aug. 22, 2024

Related U.S. Application Data

(63) Continuation of application No. 18/246,986, filed as application No. PCT/CN2021/119324 on Sep. 18, 2021.

(30) Foreign Application Priority Data

Sep. 29, 2020 (CN) .......................... 202011050573.7
Sep. 29, 2020 (CN) .......................... 202011053974.8
Oct. 23, 2020 (CN) .......................... 202011149035.3

(51) Int. Cl.
*G06F 3/14* (2006.01)
*G06F 3/04845* (2022.01)
*G06F 3/0488* (2022.01)

(52) U.S. Cl.
CPC ........ *G06F 3/1423* (2013.01); *G06F 3/04845* (2013.01); *G06F 3/0488* (2013.01)

(58) Field of Classification Search
None
See application file for complete search history.

(56) References Cited

U.S. PATENT DOCUMENTS

| 2015/0065056 | A1 | 3/2015 | Won |
| 2015/0312508 | A1* | 10/2015 | Phang .............. H04N 21/42224 348/552 |
| 2021/0211535 | A1* | 7/2021 | Jin .......................... H04L 69/24 |

FOREIGN PATENT DOCUMENTS

| CN | 105518643 A | 4/2016 |
| CN | 109271121 A | 1/2019 |

(Continued)

OTHER PUBLICATIONS

Ken Hinckley, Association for Computing Machinery:"Synchronous gestures for multiple persons and computers" Proceedings of the 16th Annual ACM Symposium on User Interface Software and Technology: Vancouver, Canada, Nov. 2-5, 2003; [ACM Symposium on User Interface Software and Technology] ACM Press, New York, NY,Nov. 2, 2003 (Nov. 2, 2003) pp. 149-158 XP058109383, total: 10pages.

*Primary Examiner* — Christopher J Kohlman
(74) *Attorney, Agent, or Firm* — Slater Matsil, LLP

(57) ABSTRACT

A distributed interface display method. A first electronic device may display content in a plurality of function areas (for example, a first function area and a second function area) on the first electronic device and another electronic device (for example, a second electronic device) in a distributed collaborative manner. Specifically, when the first electronic device displays the content in the first function area and the content in the second function area, the first electronic device may send the content in one of the function areas (for example, the first function area) to the second electronic device for display.

20 Claims, 63 Drawing Sheets

(56) References Cited

FOREIGN PATENT DOCUMENTS

| CN | 109327602 A | 2/2019 |
| CN | 110515576 A | 11/2019 |
| WO | 2009143294 A2 | 11/2009 |

* cited by examiner

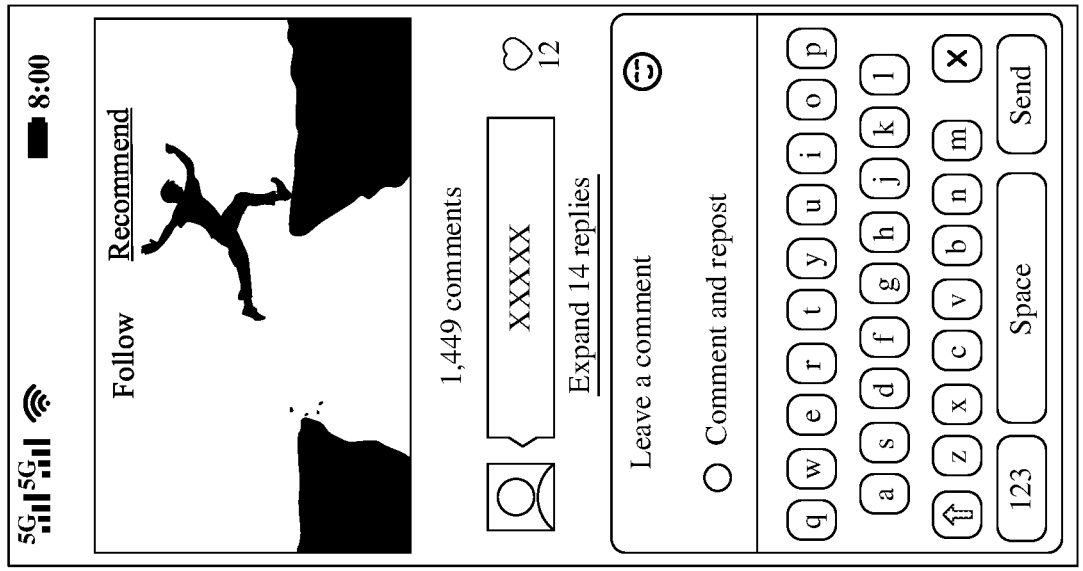
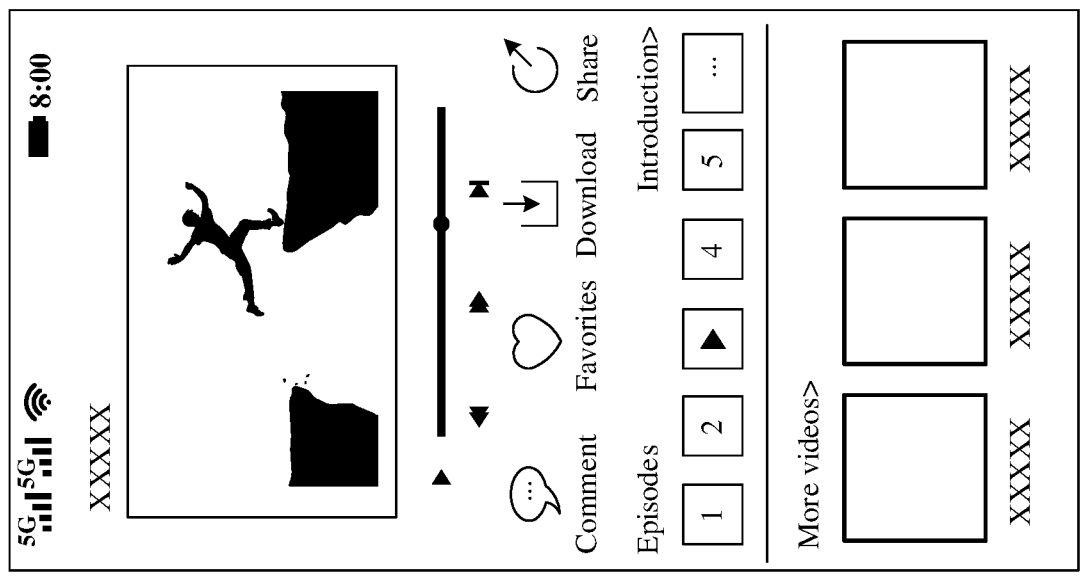
FIG. 5

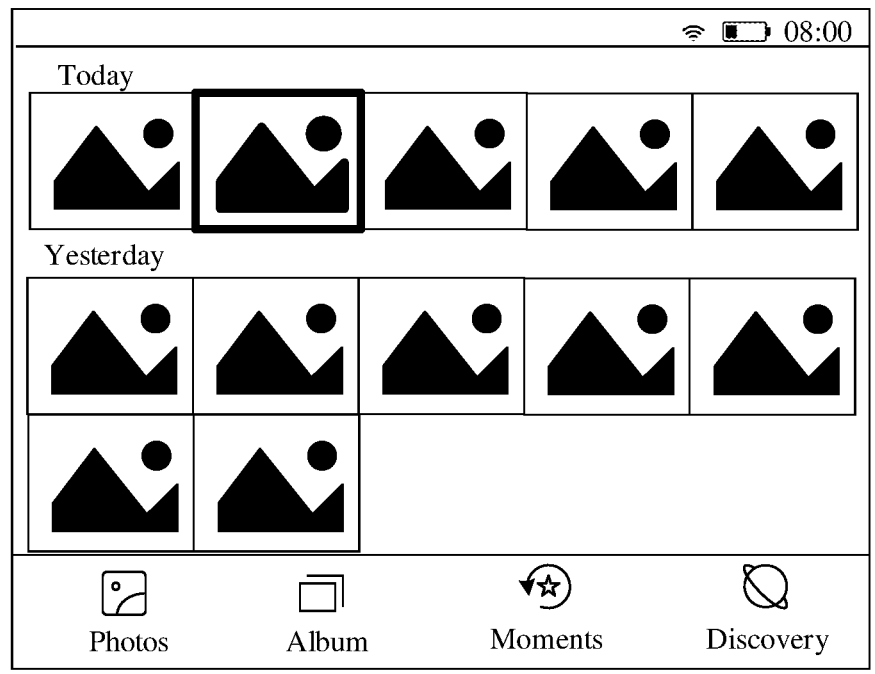
(a)
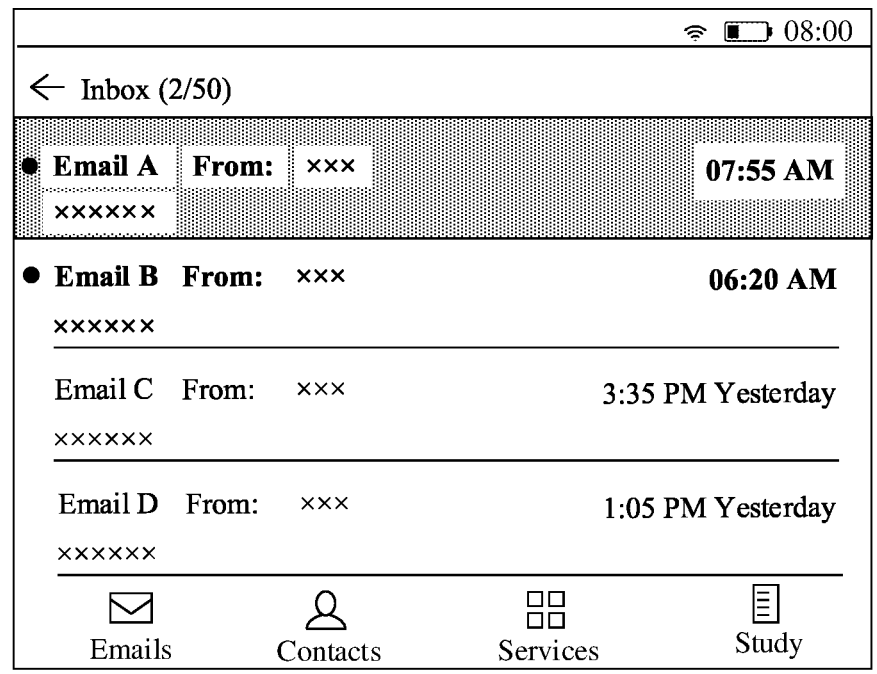
(b)
FIG. 6

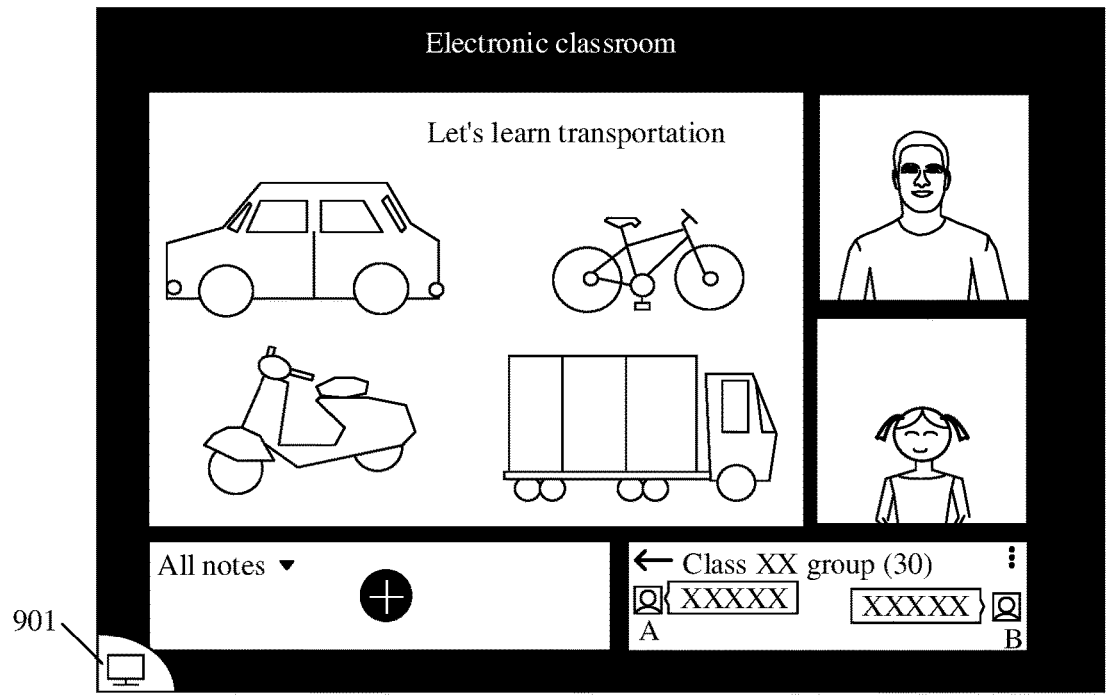
FIG. 9(a)
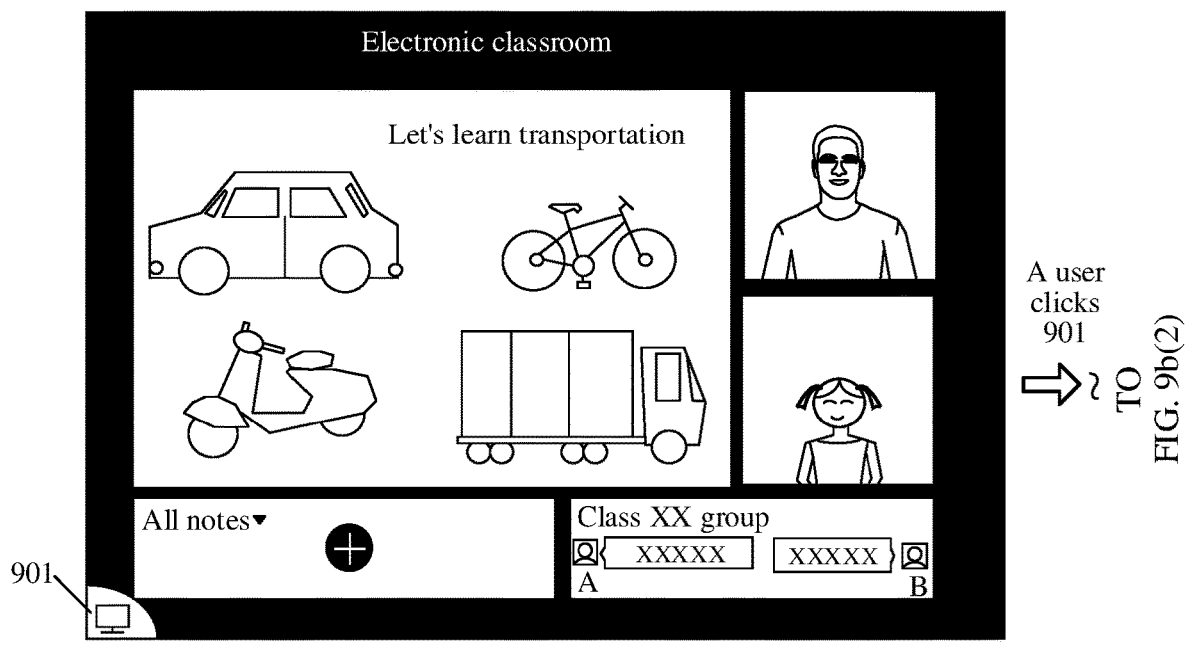
FIG. 9(b)(1)

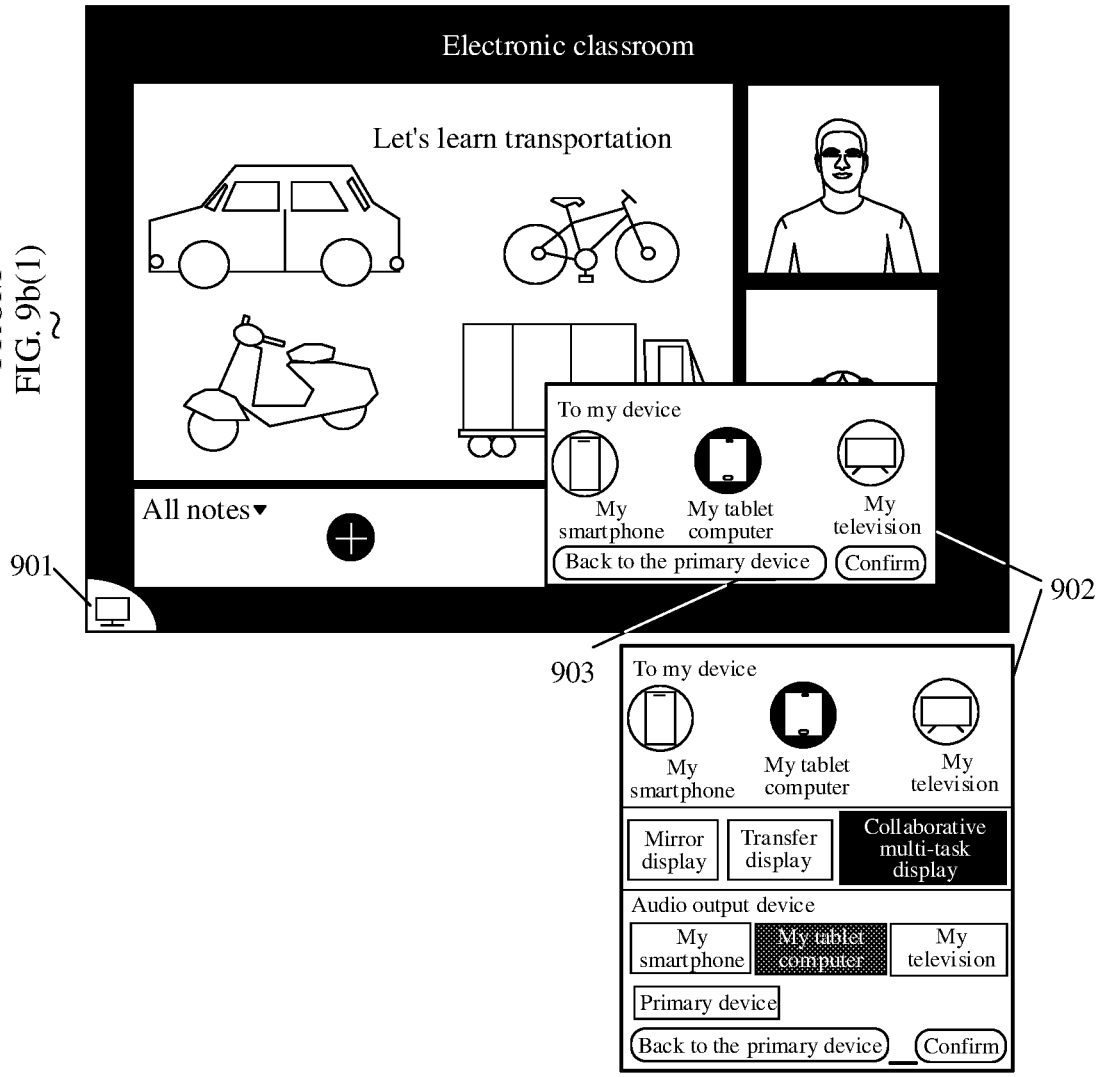
FIG. 9(b)(2)

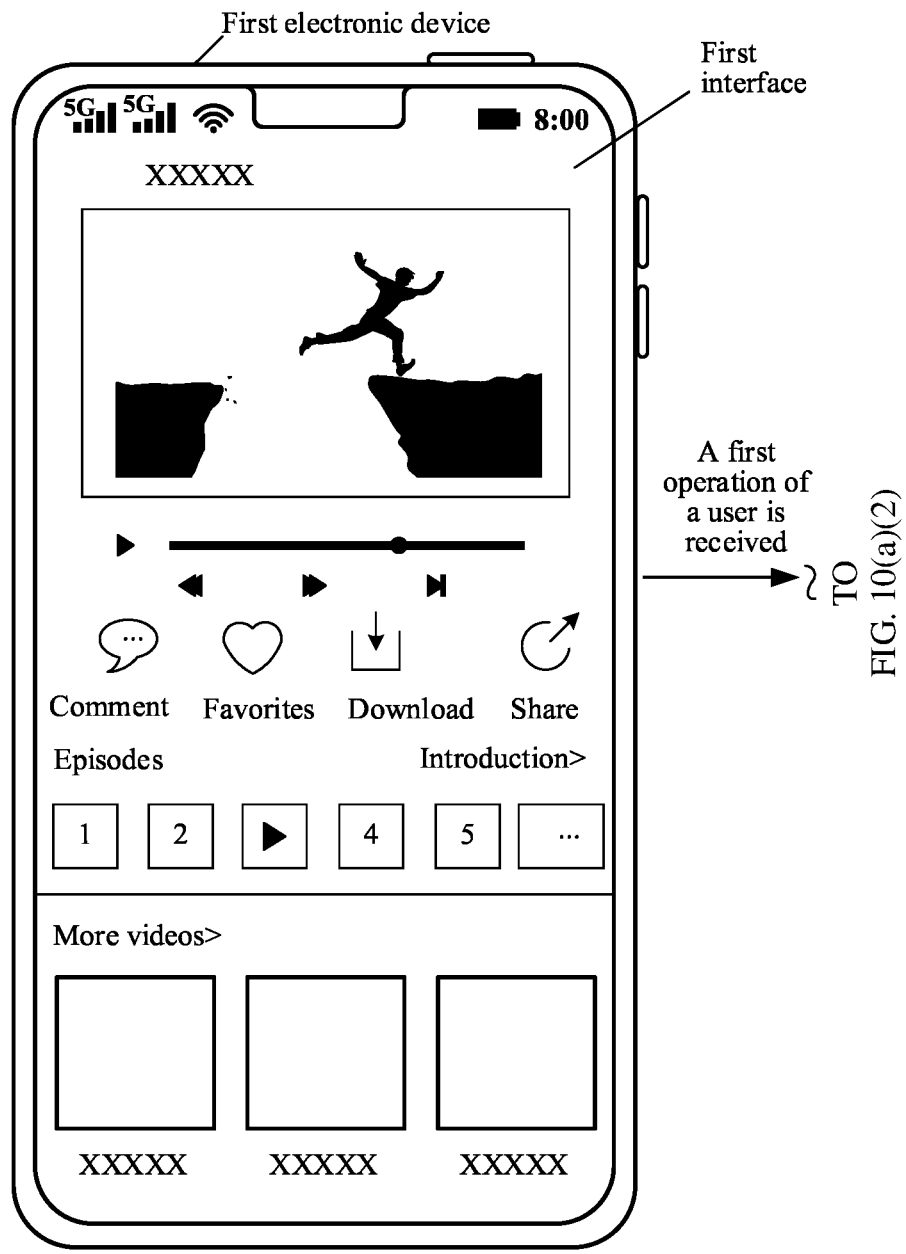
FIG. 10(a)(1)

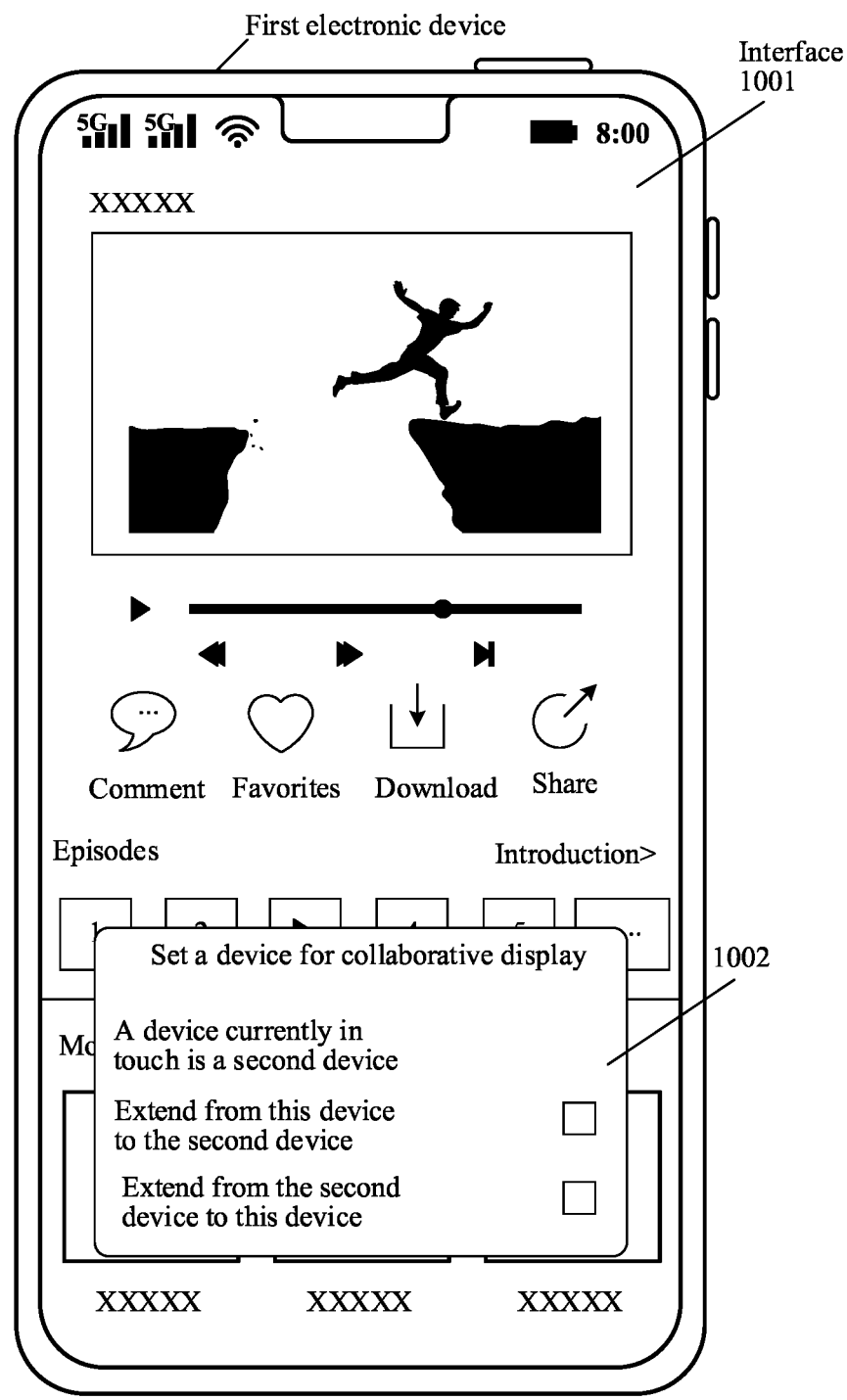
FIG. 10(a)(2)

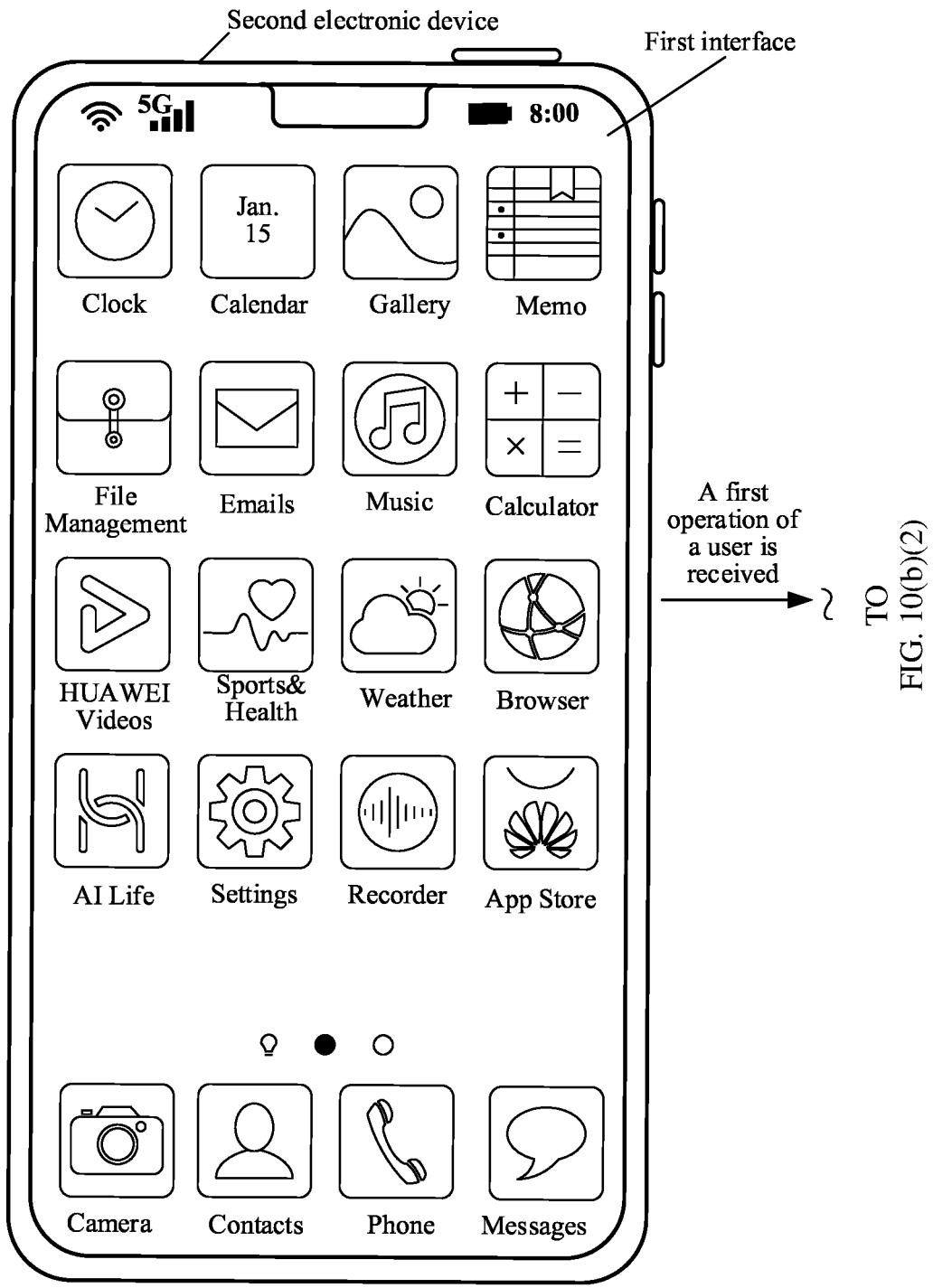
FIG. 10(b)(1)

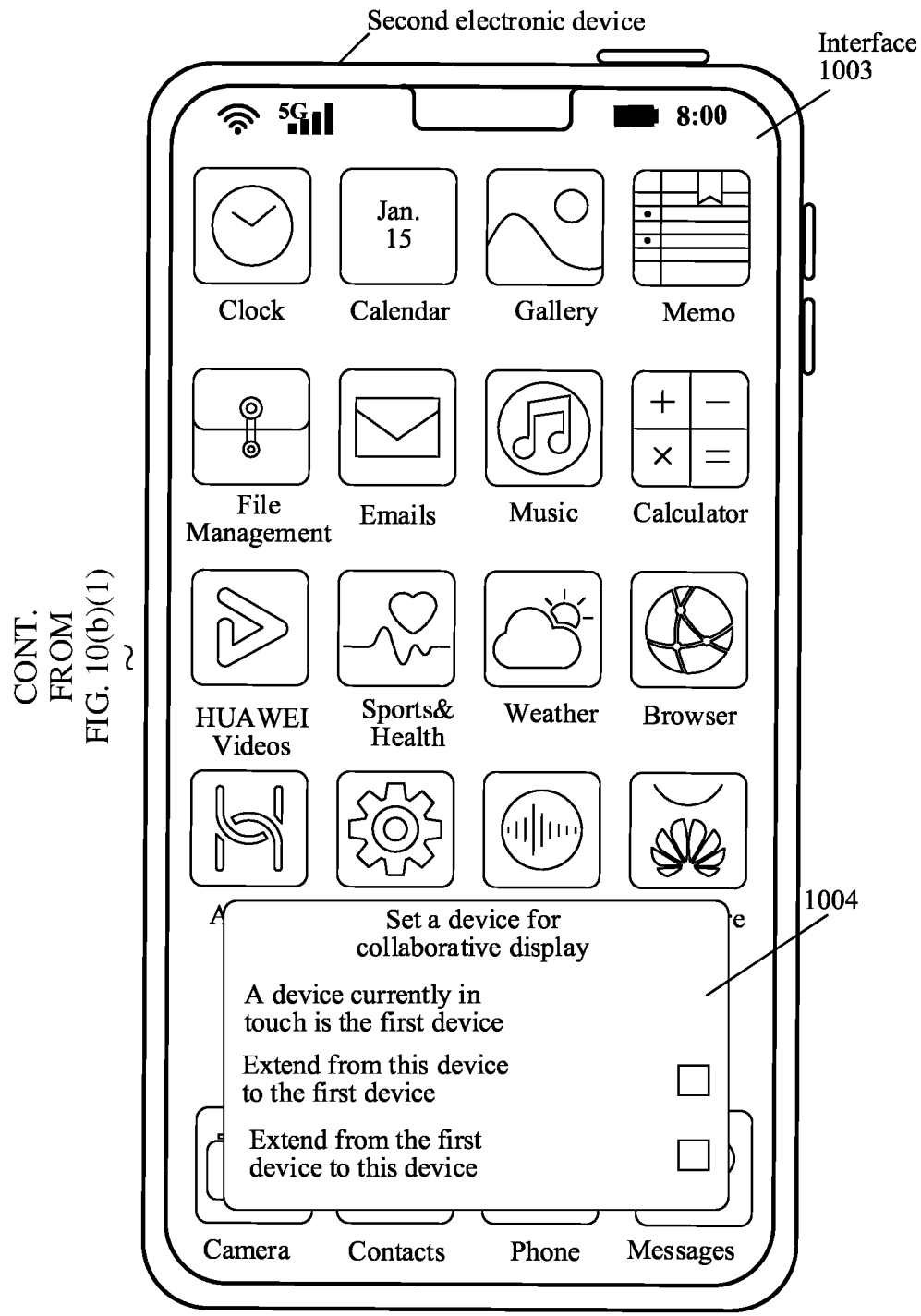
FIG. 10(b)(2)

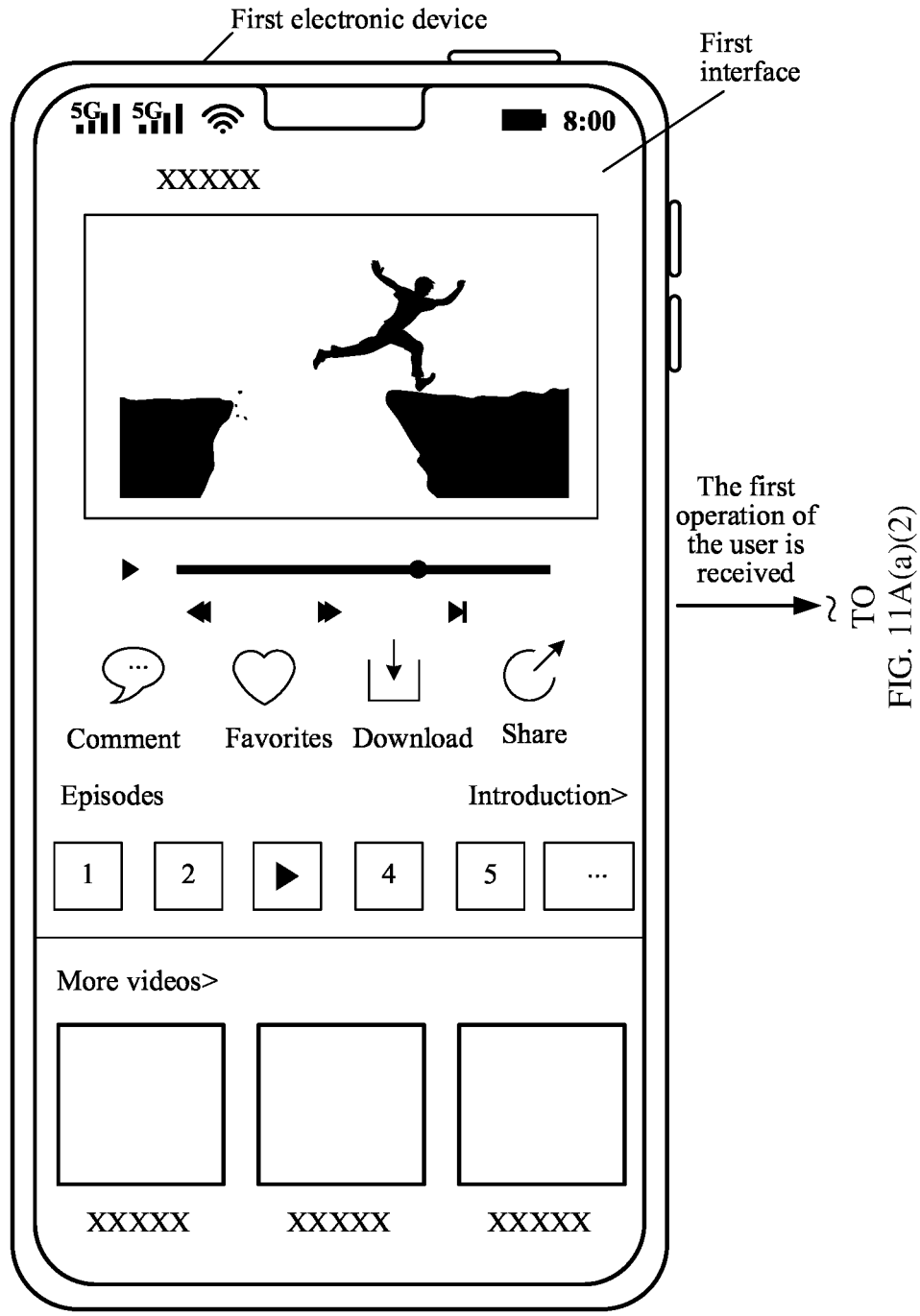
FIG. 11A(a)(1)

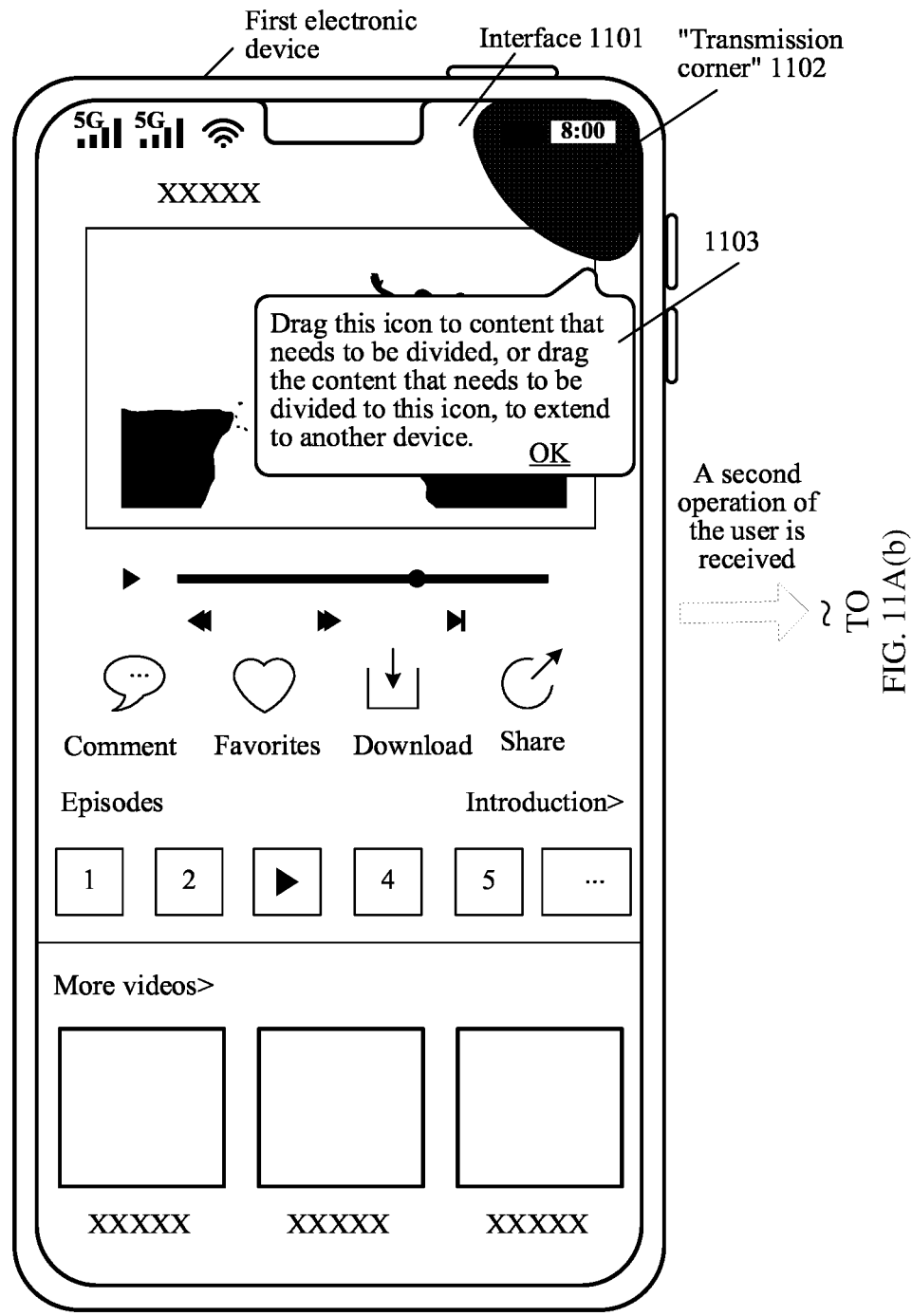
FIG. 11A(a)(2)

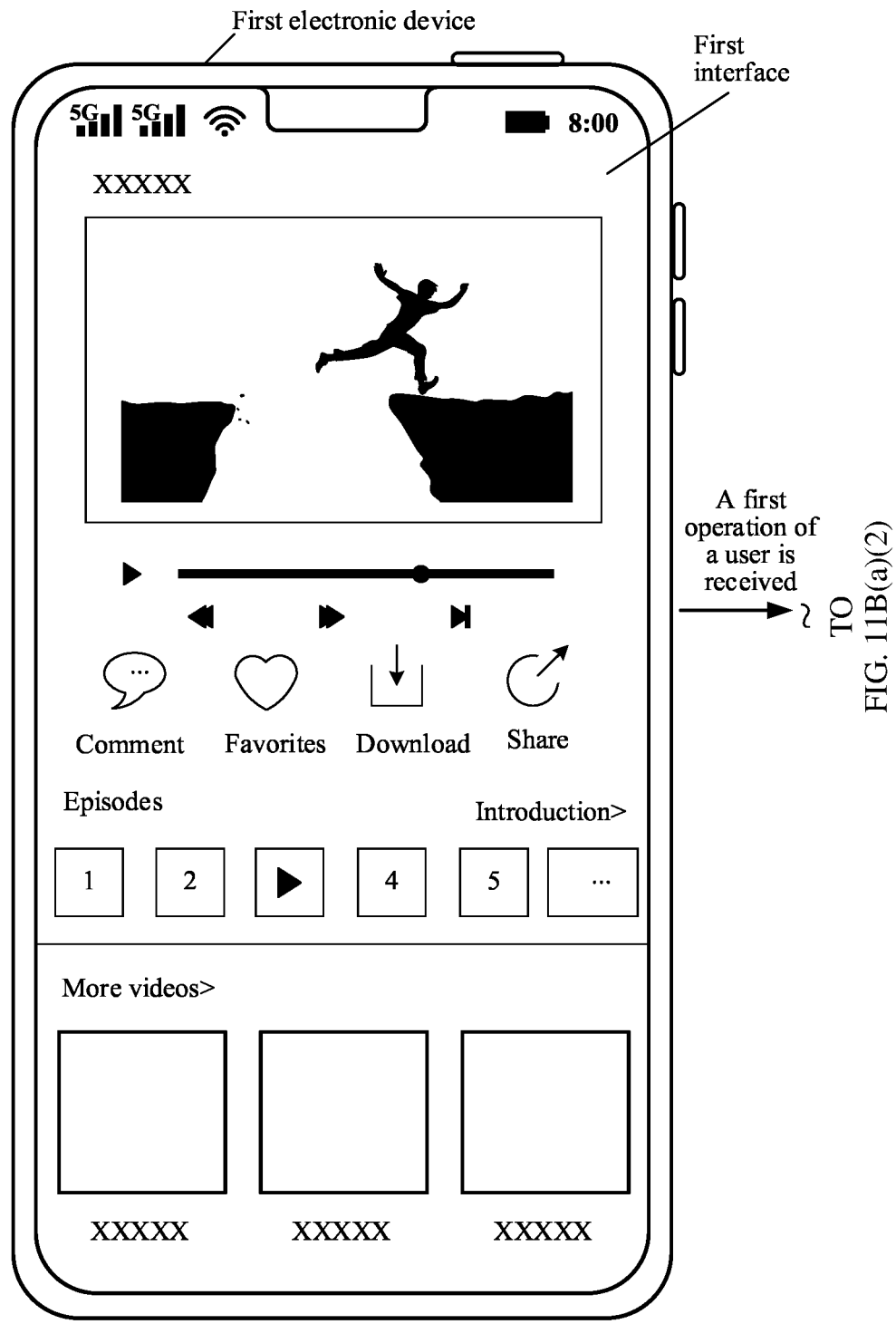
FIG. 11B(a)(1)

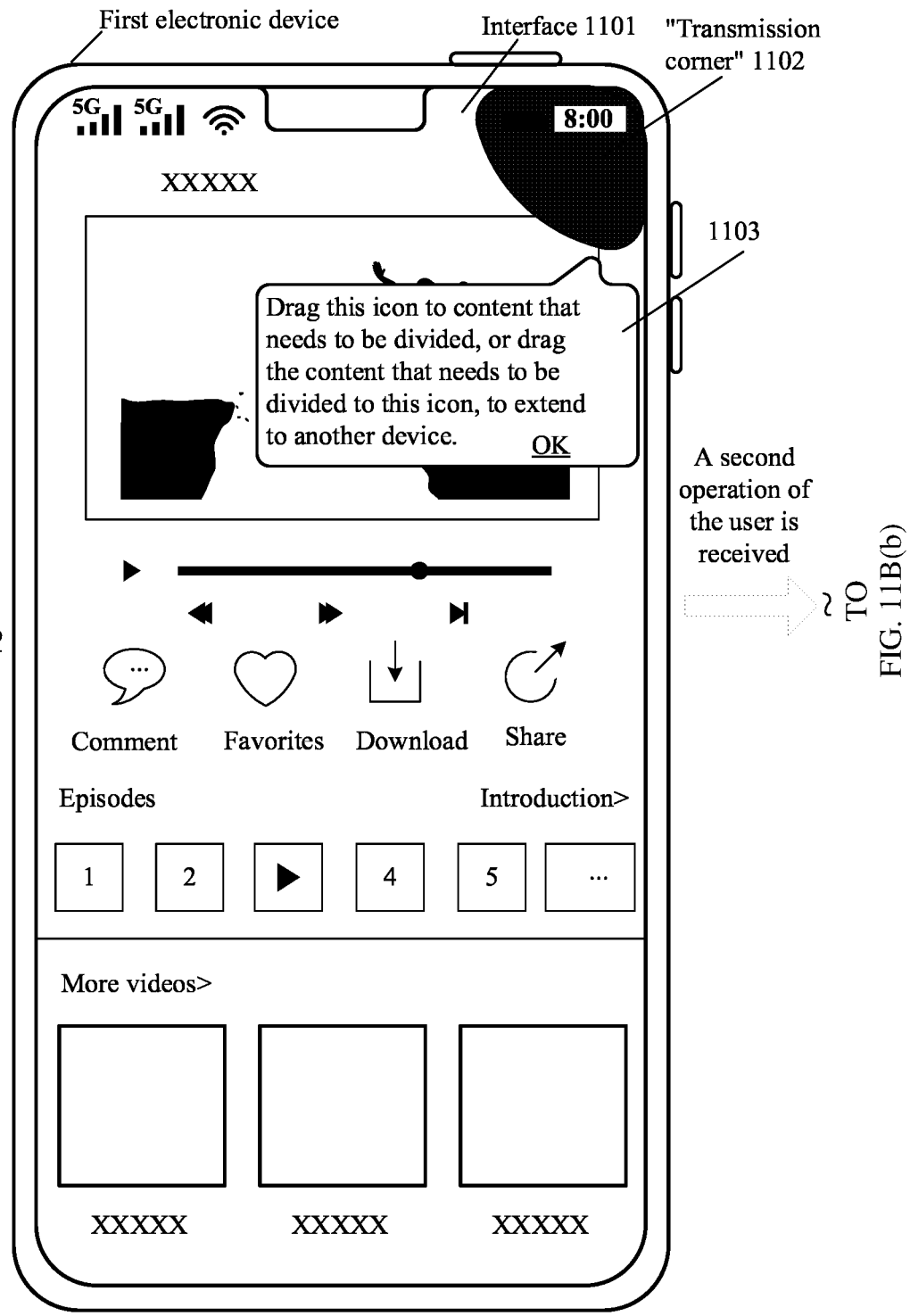
FIG. 11B(a)(2)

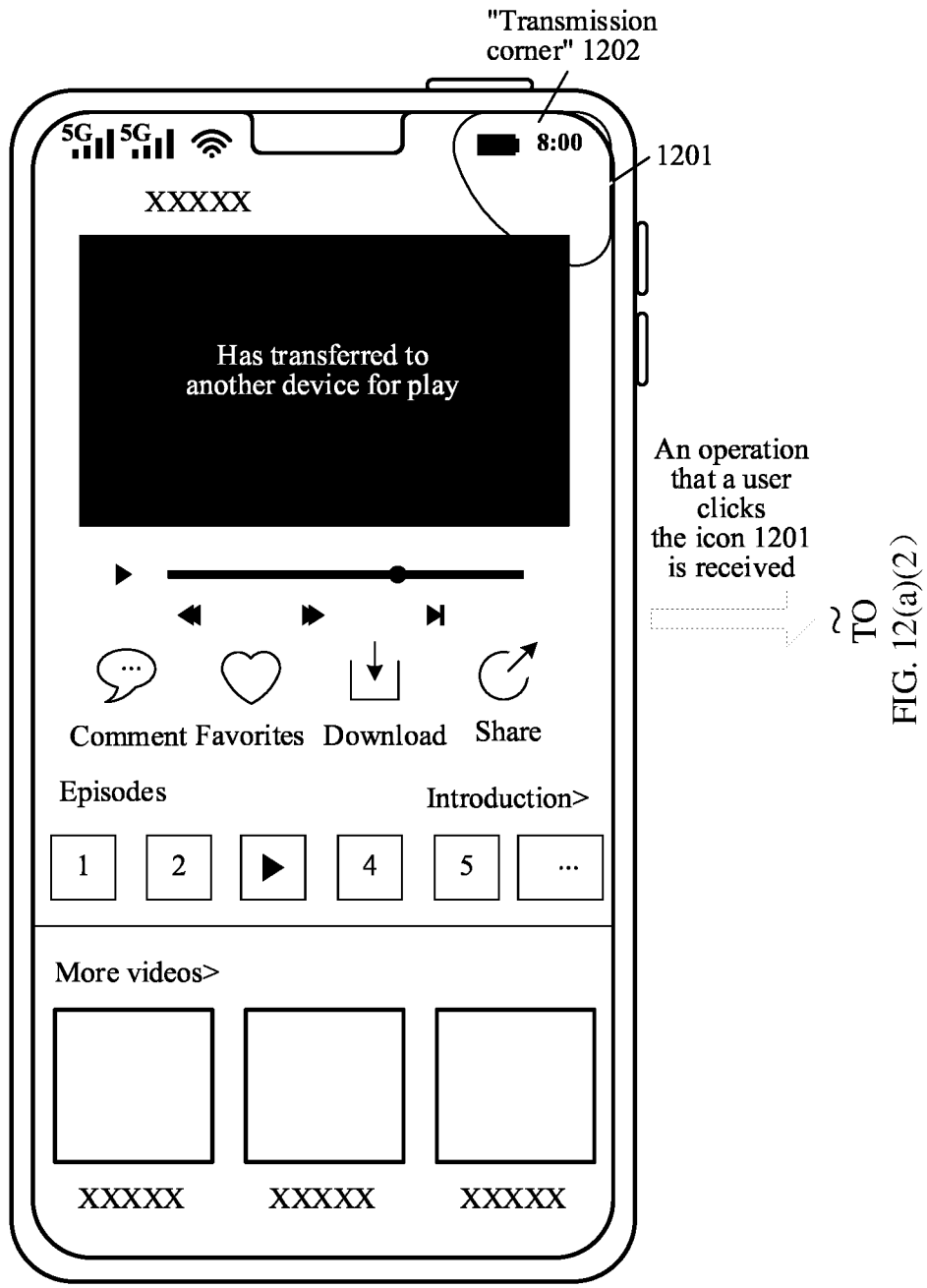
FIG. 12(a)(1)

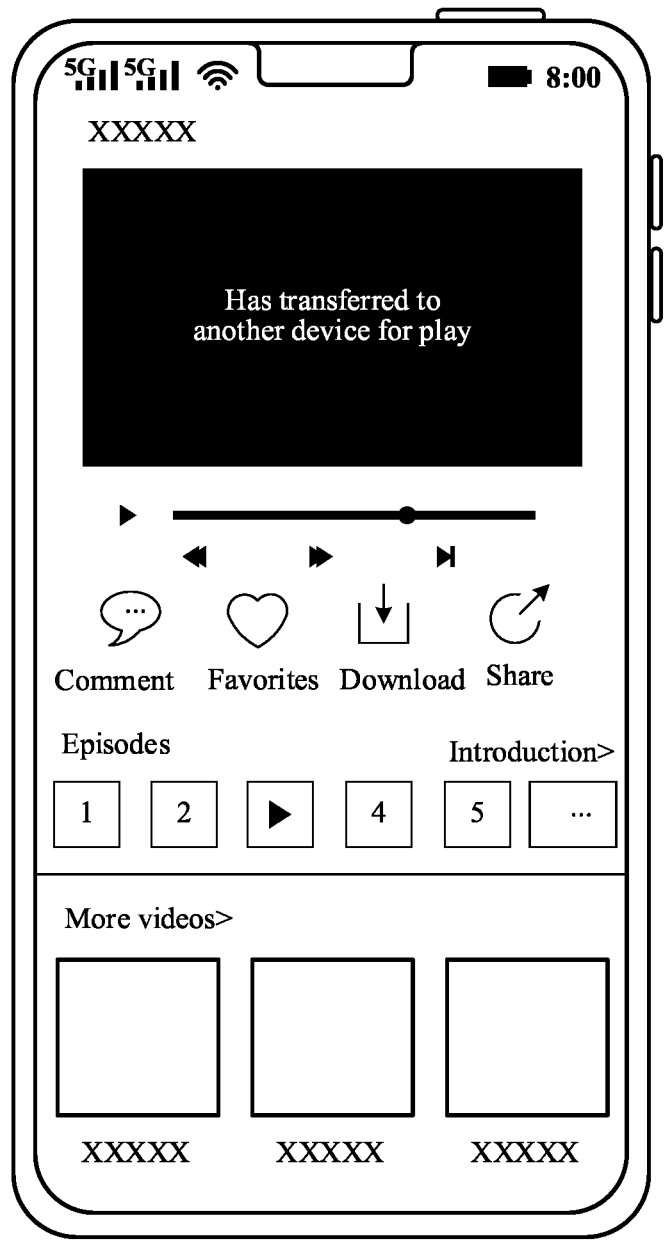
FIG. 12(a)(2)

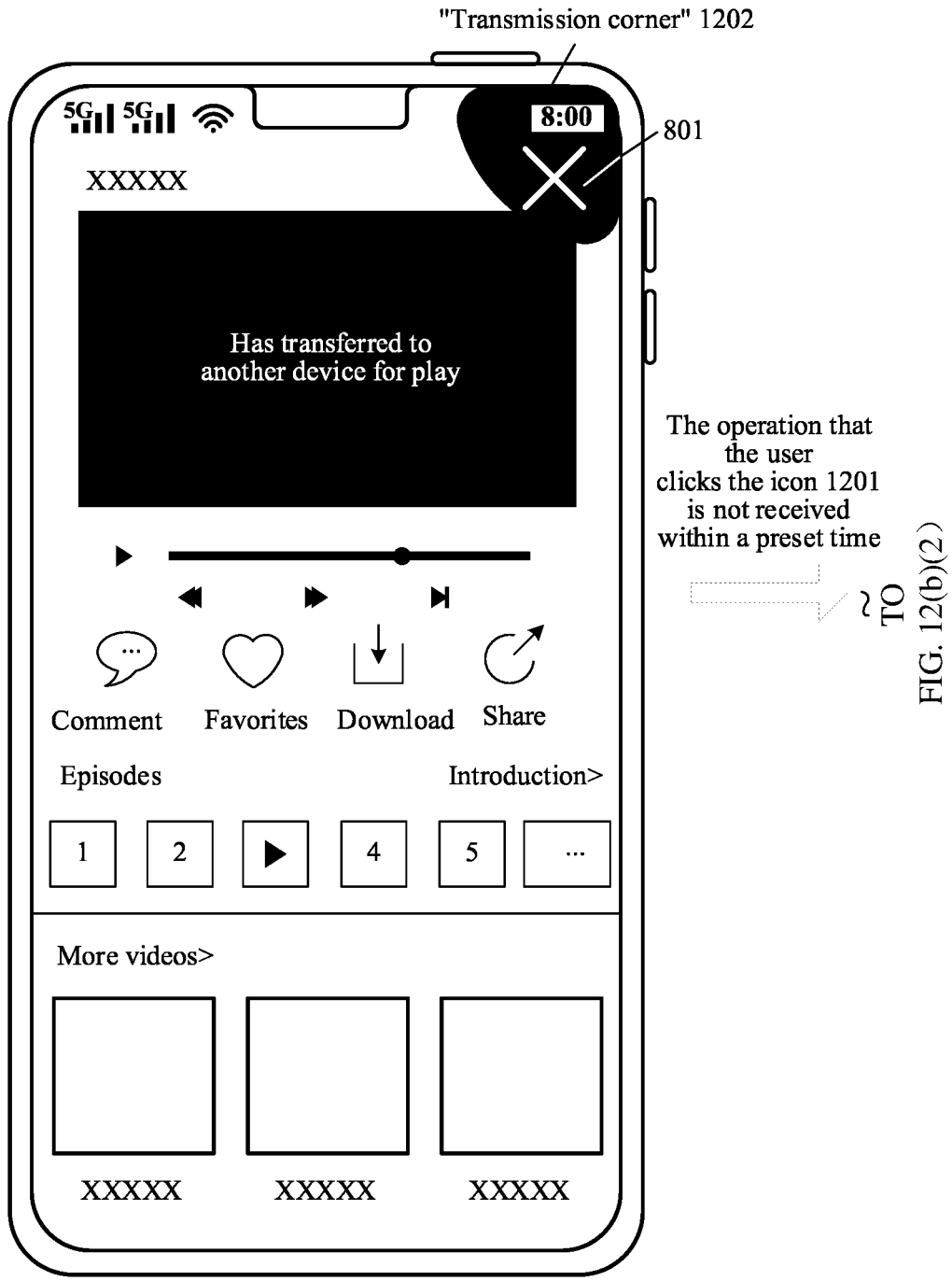
FIG. 12(b)(1)

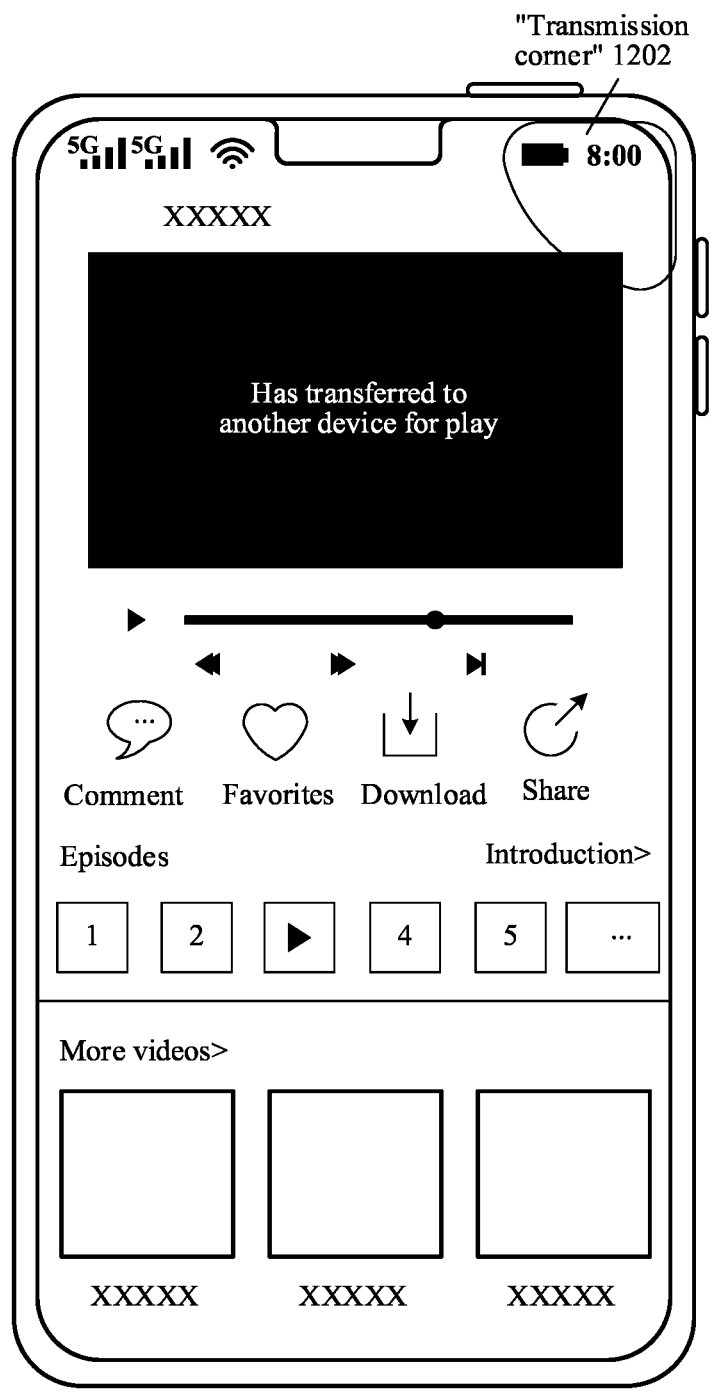
FIG. 12(b)(2)

TO FIG. 13B

CONT. FROM FIG. 14A
Smartphone A (First electronic device)   Smartphone B (Second electronic device)
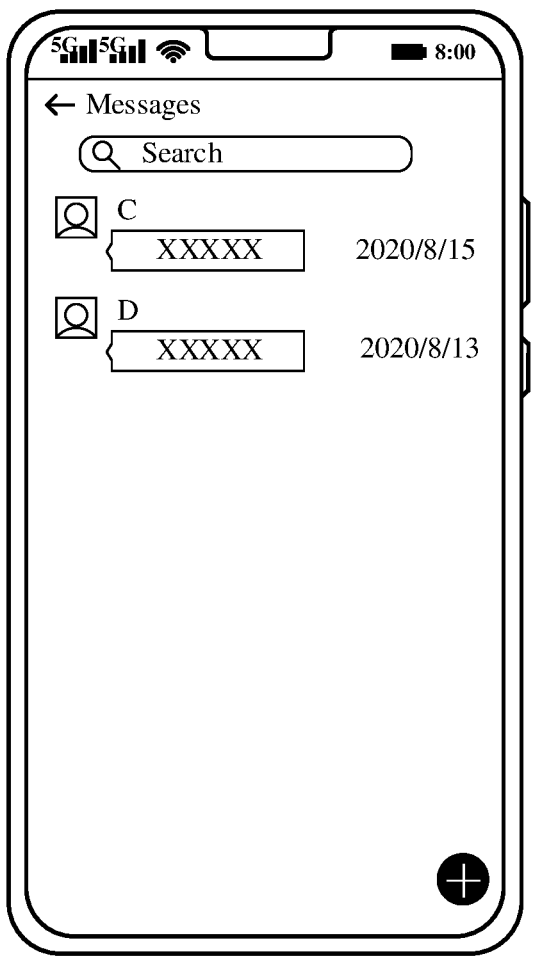
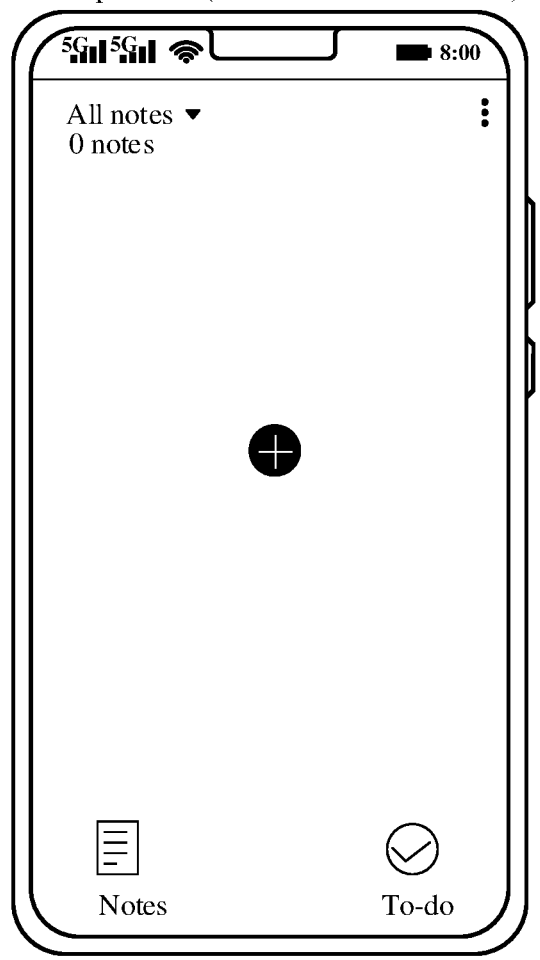
FIG. 14B

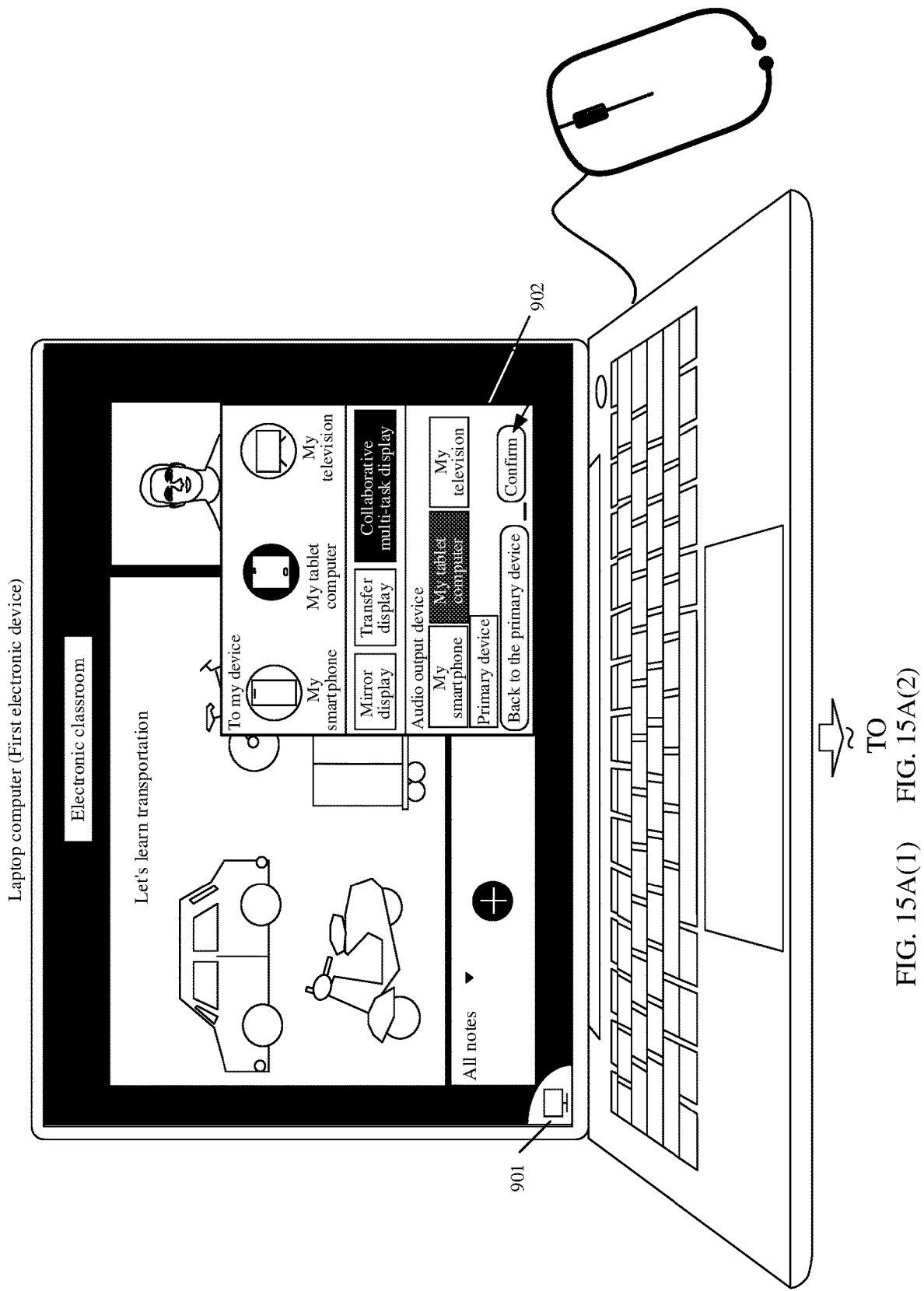
FIG. 15A(1)   FIG. 15A(2)

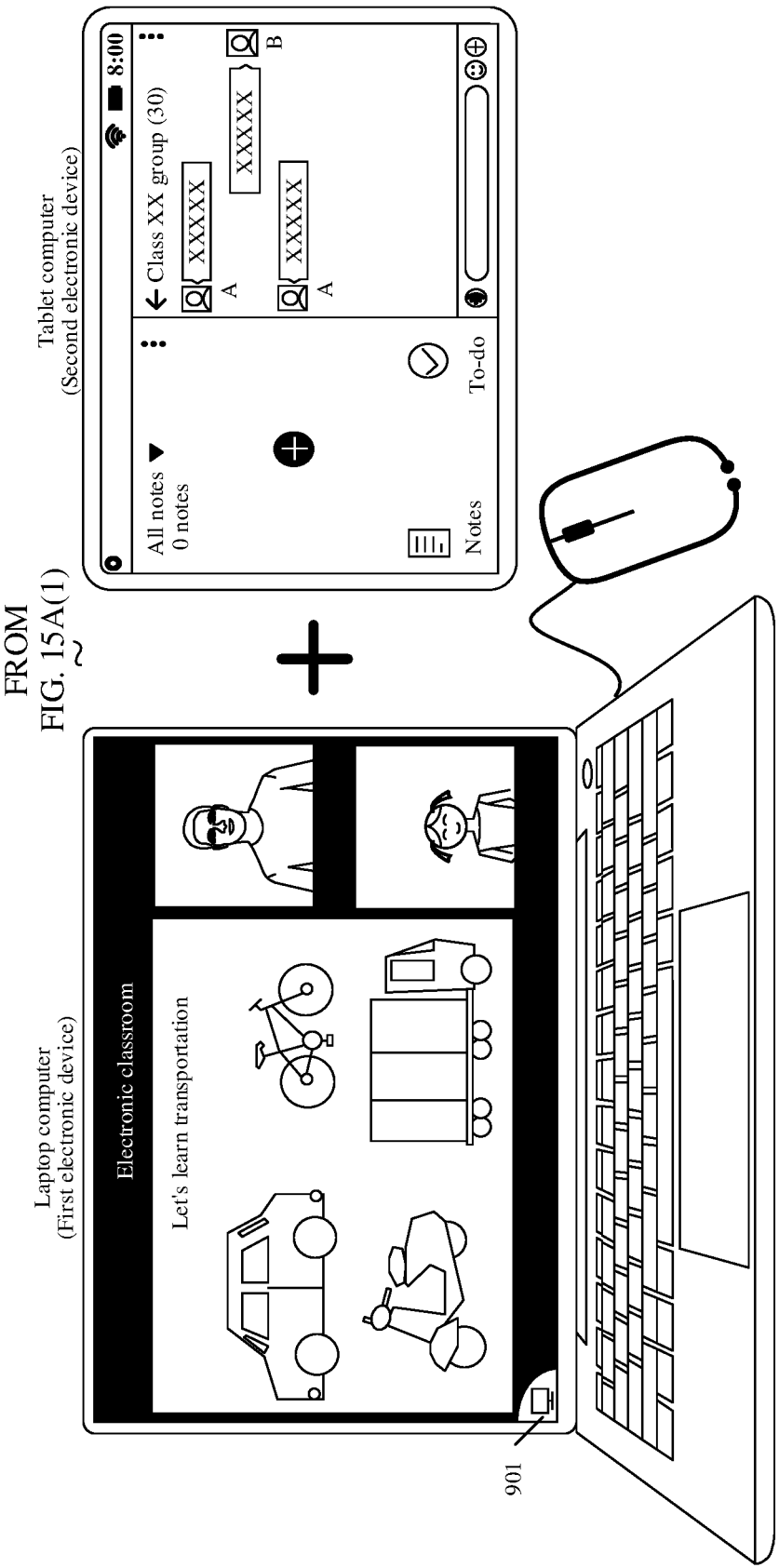

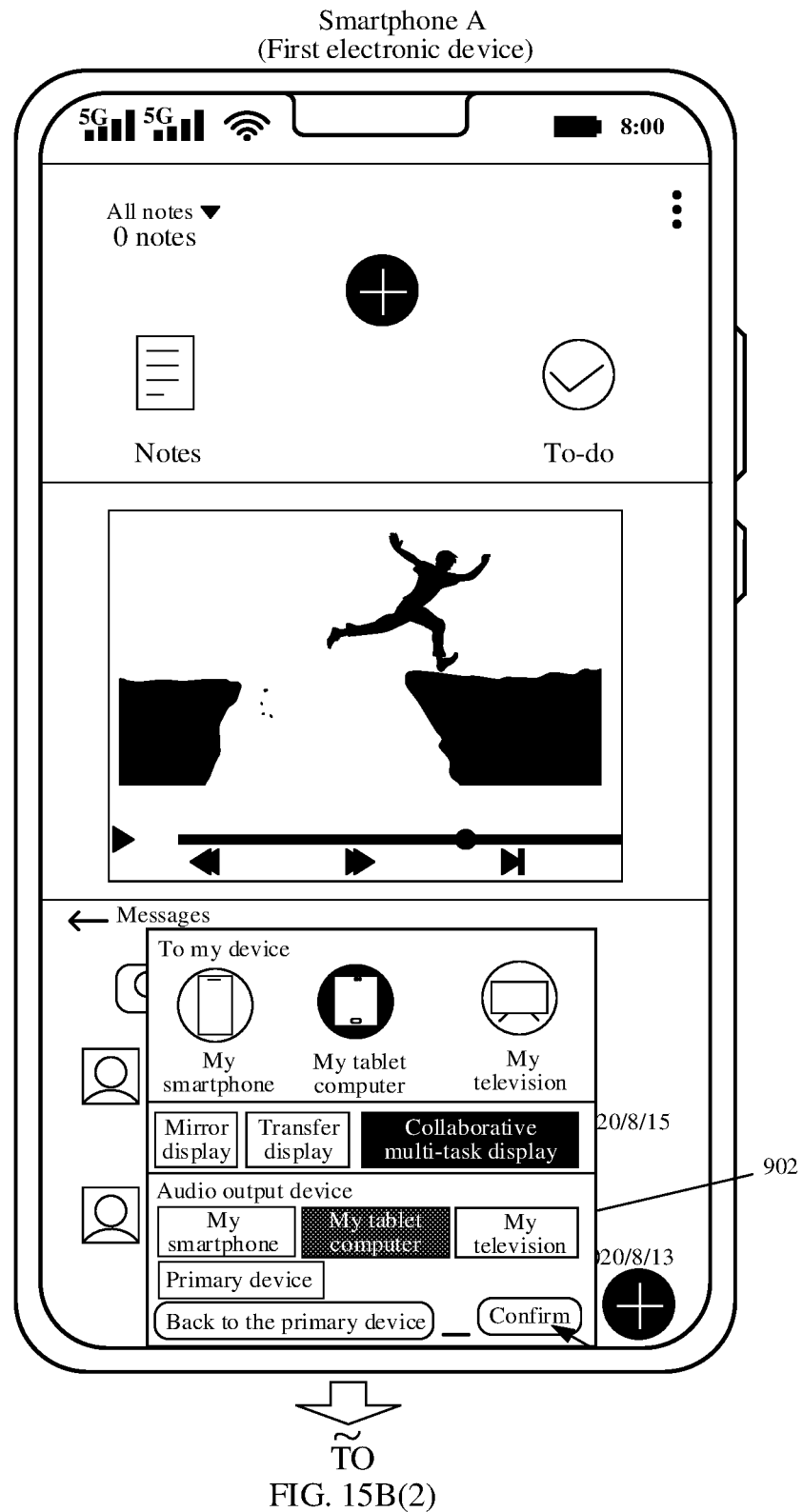
FIG. 15B(1)

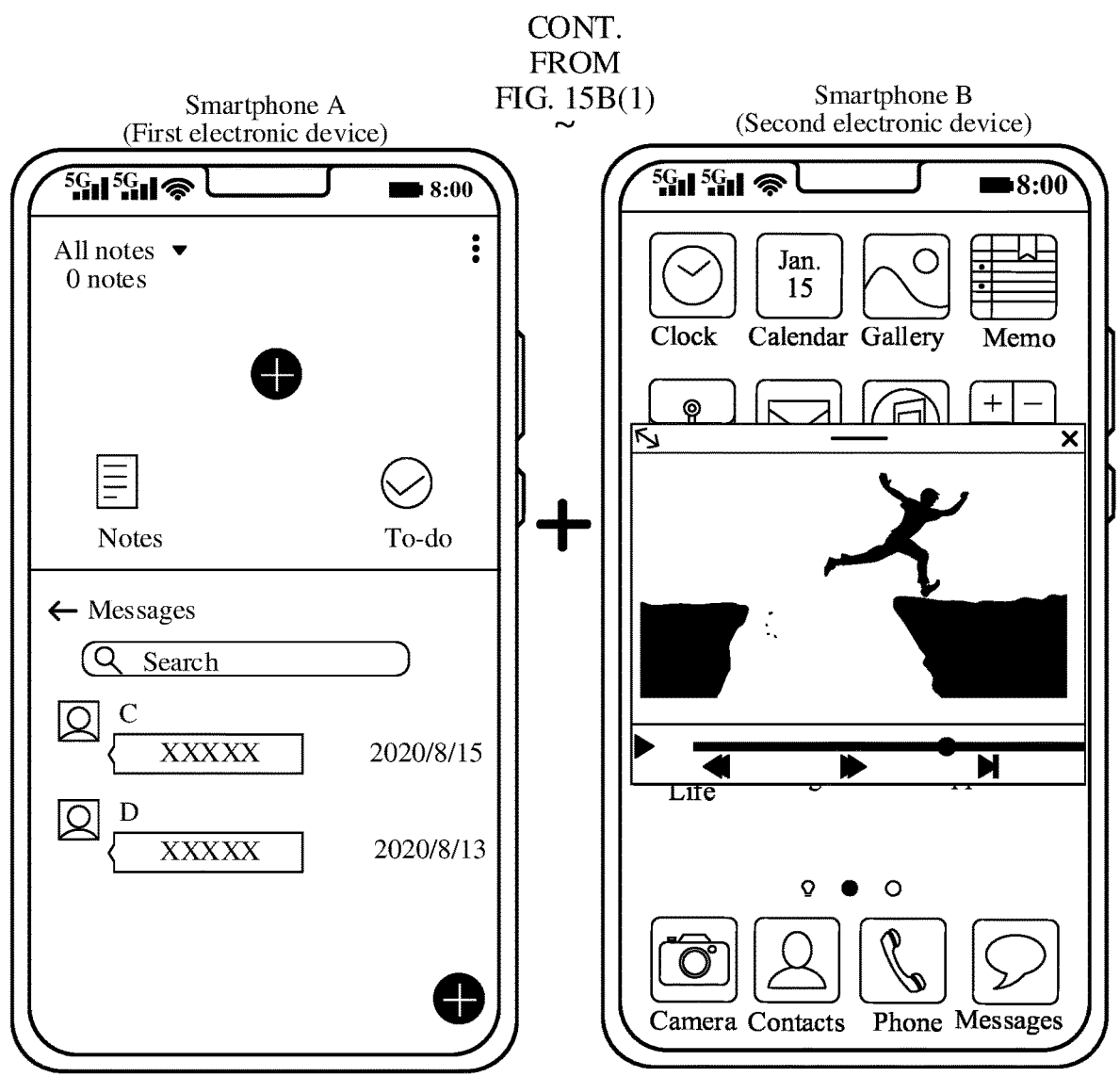
FIG. 15B(2)

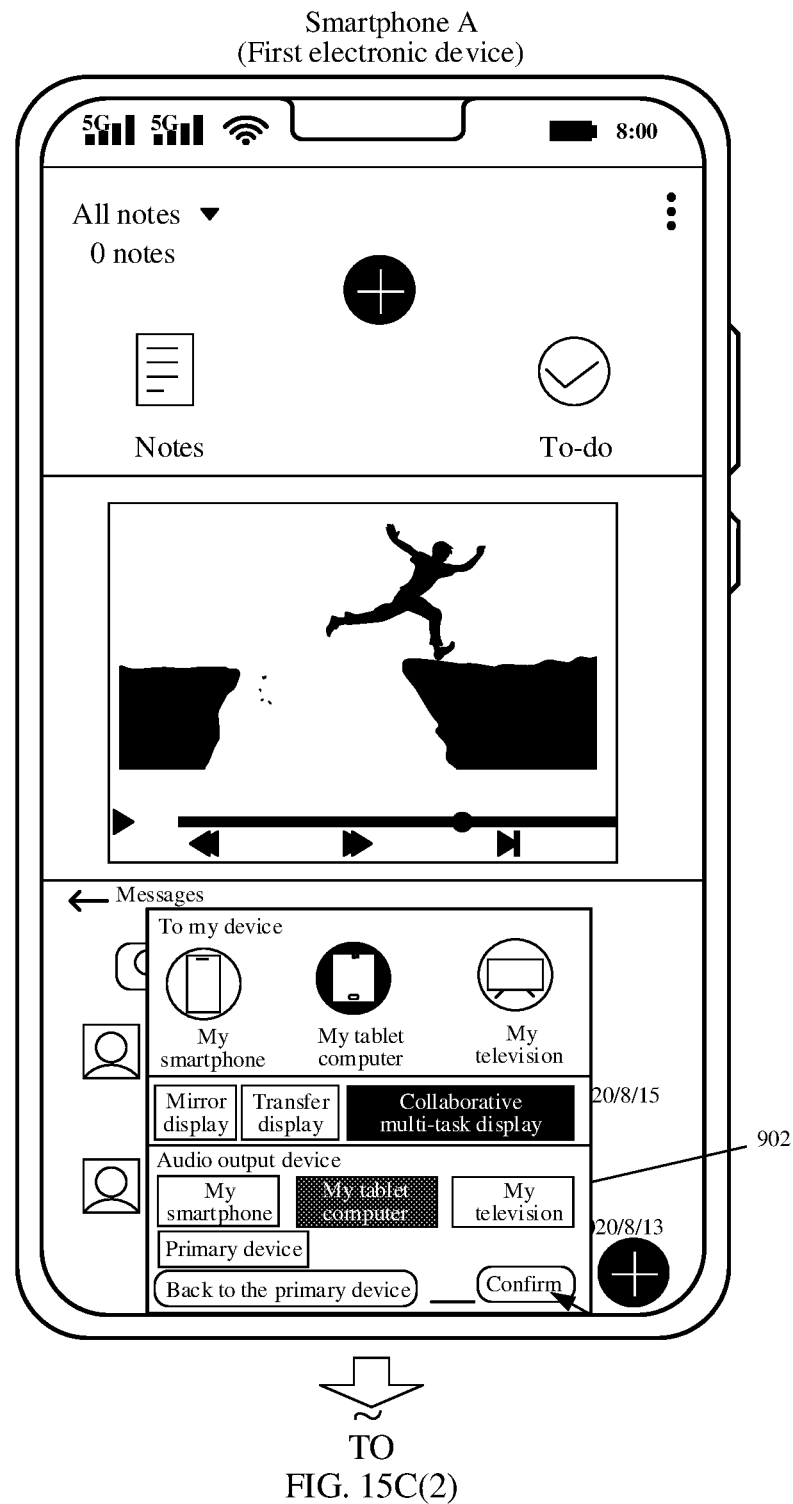
FIG. 15C(1)

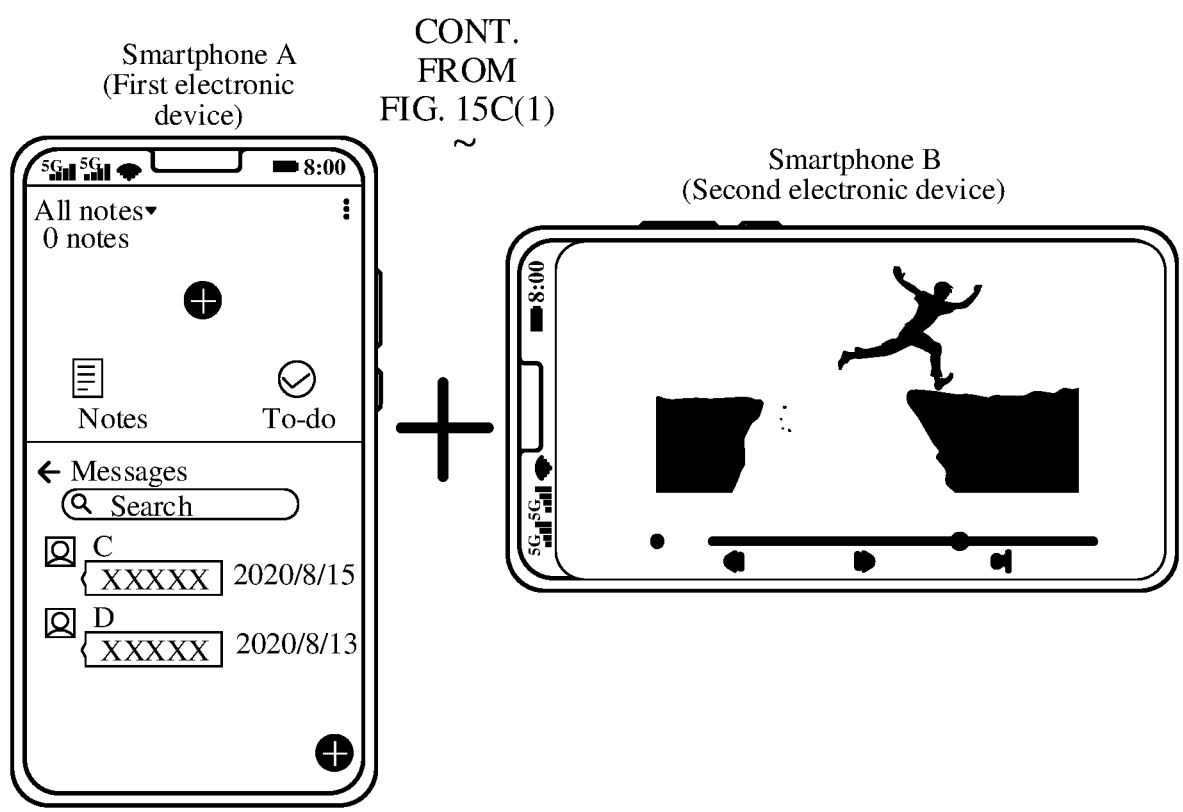
FIG. 15C(2)

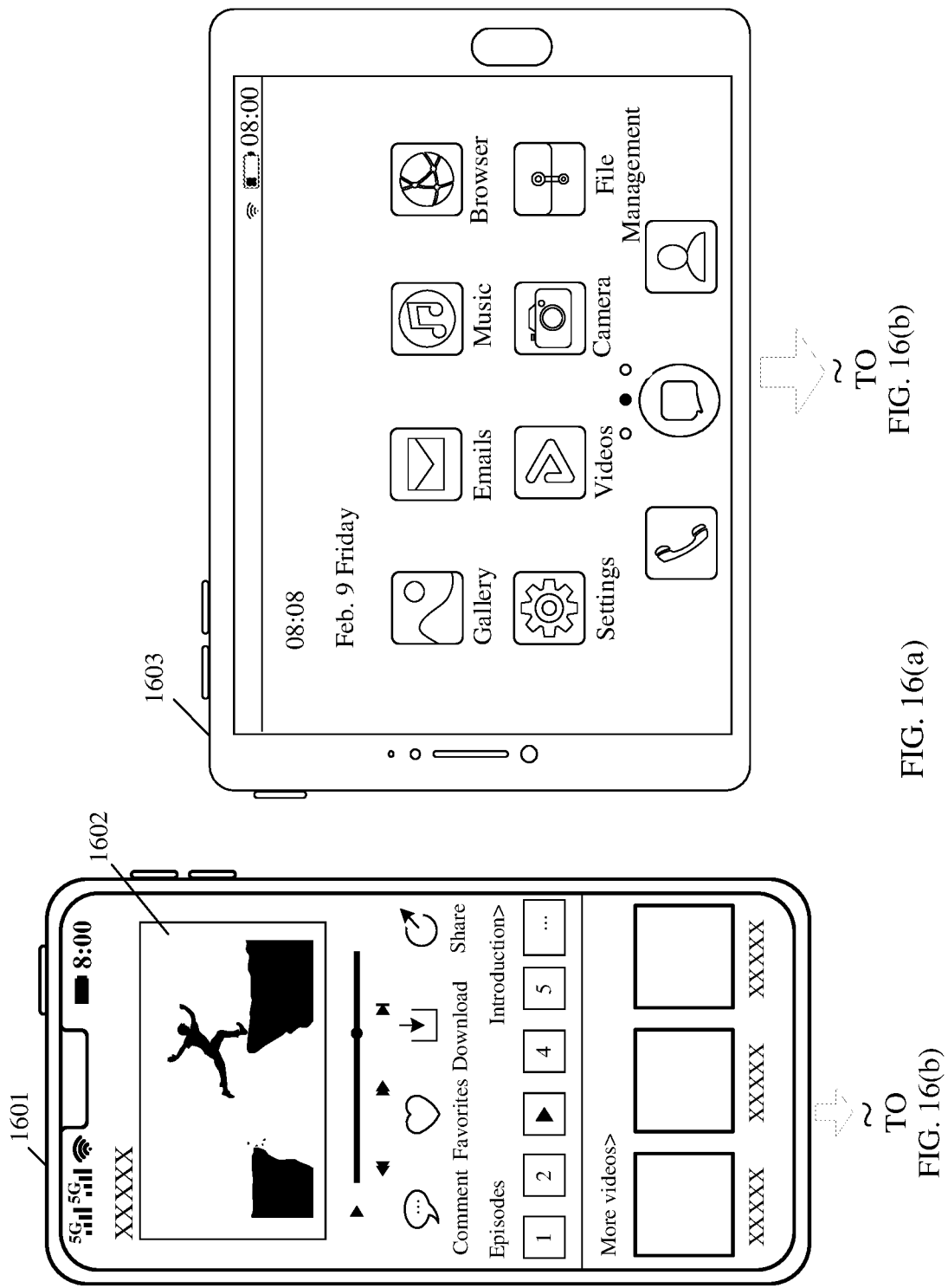

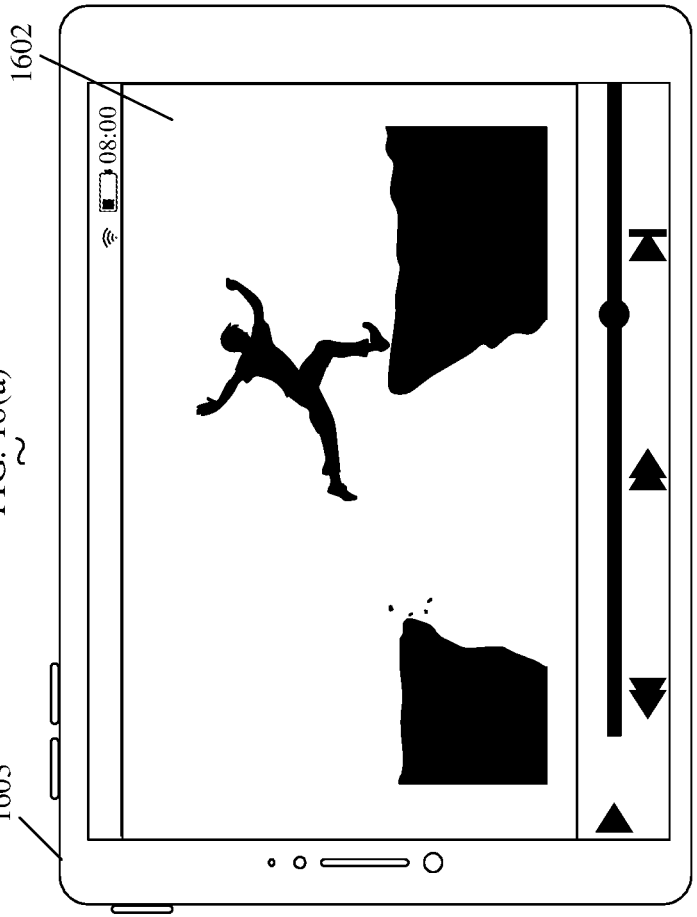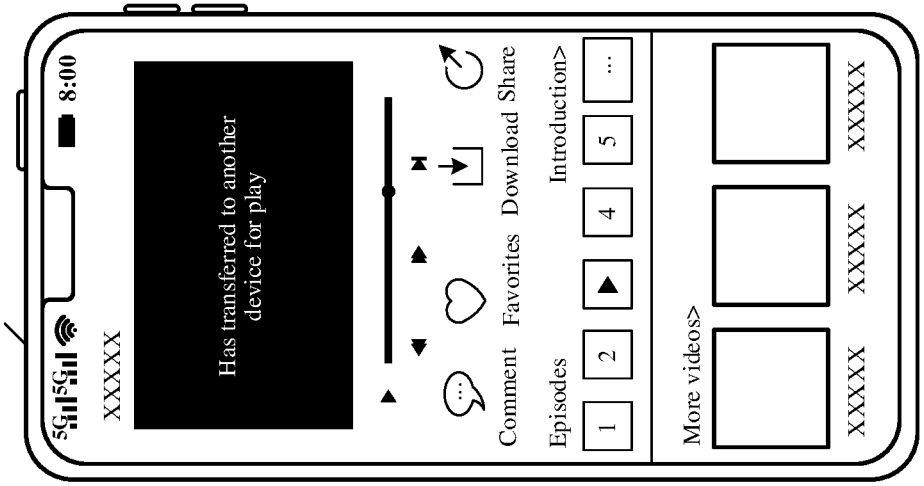
FIG. 16(b)

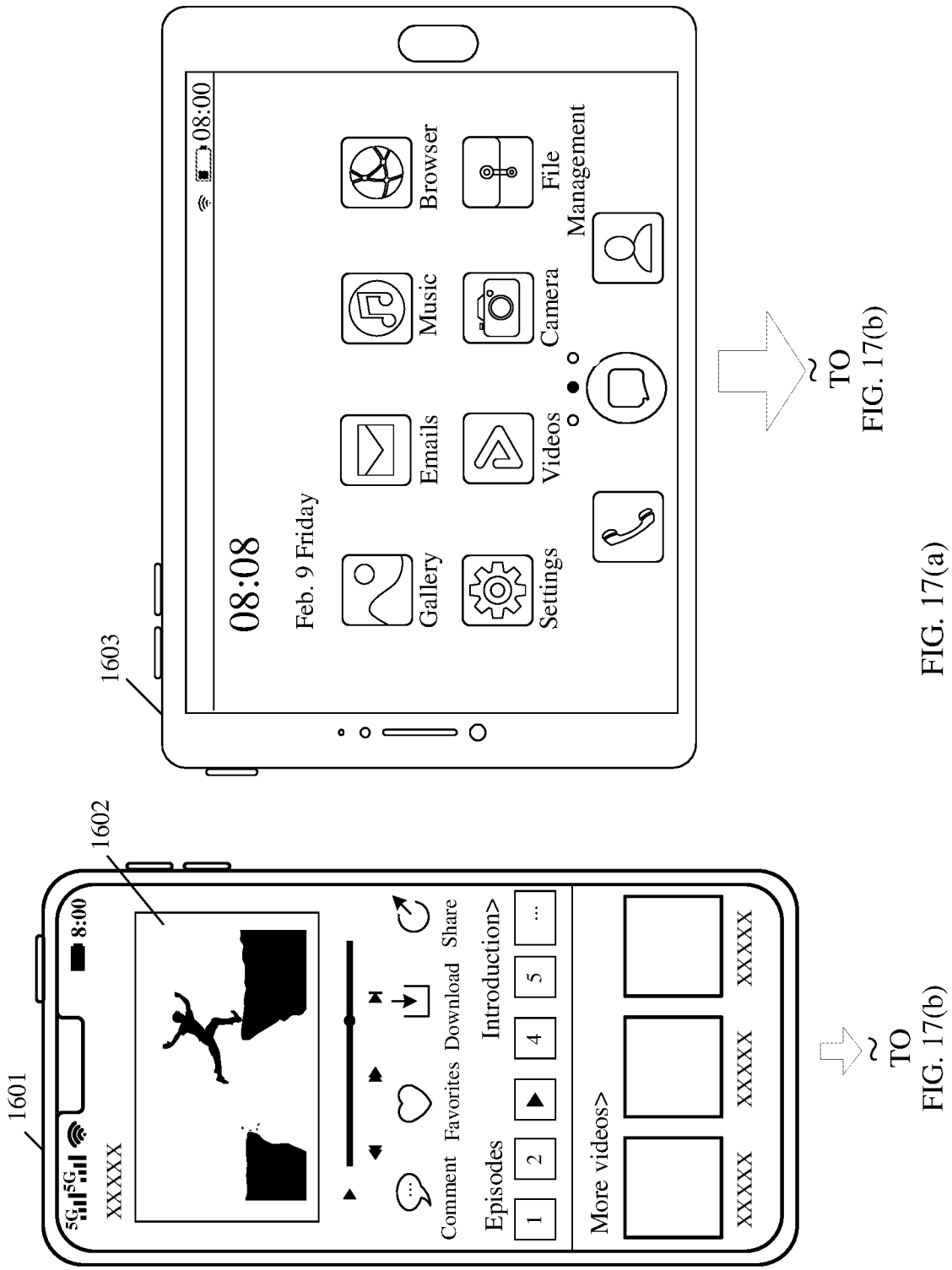

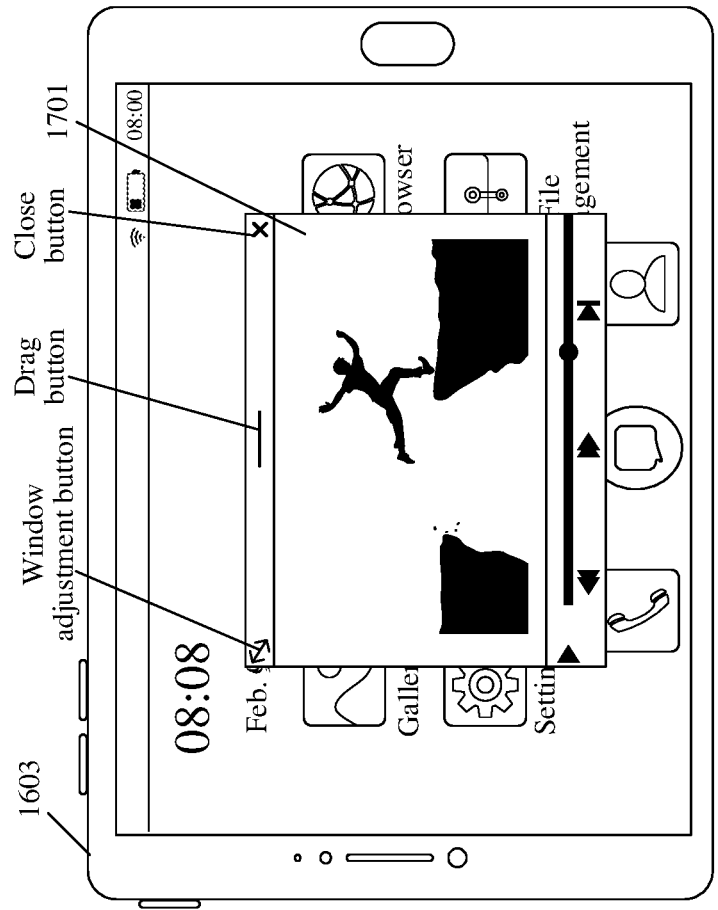
FIG. 17(b)
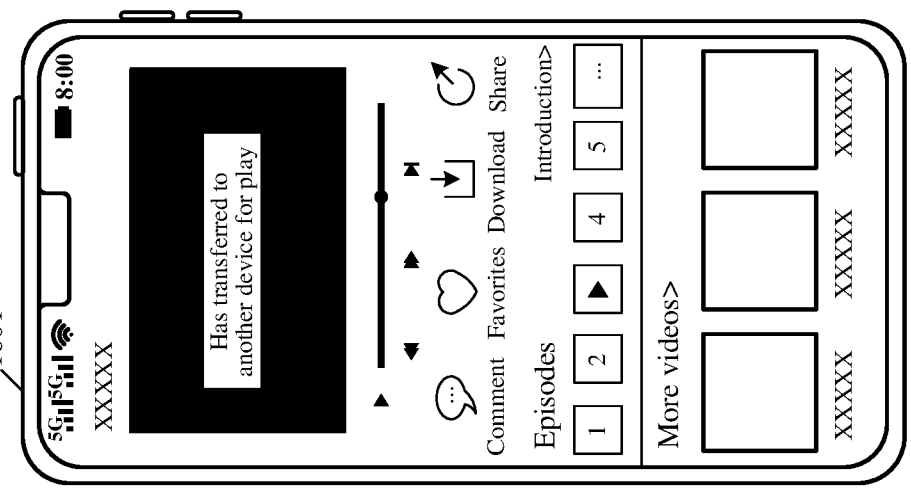

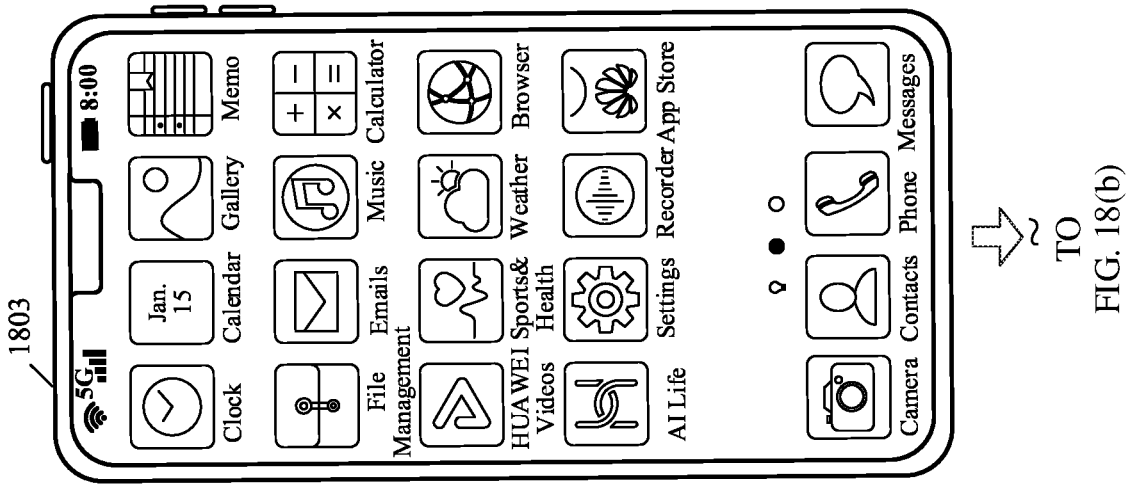
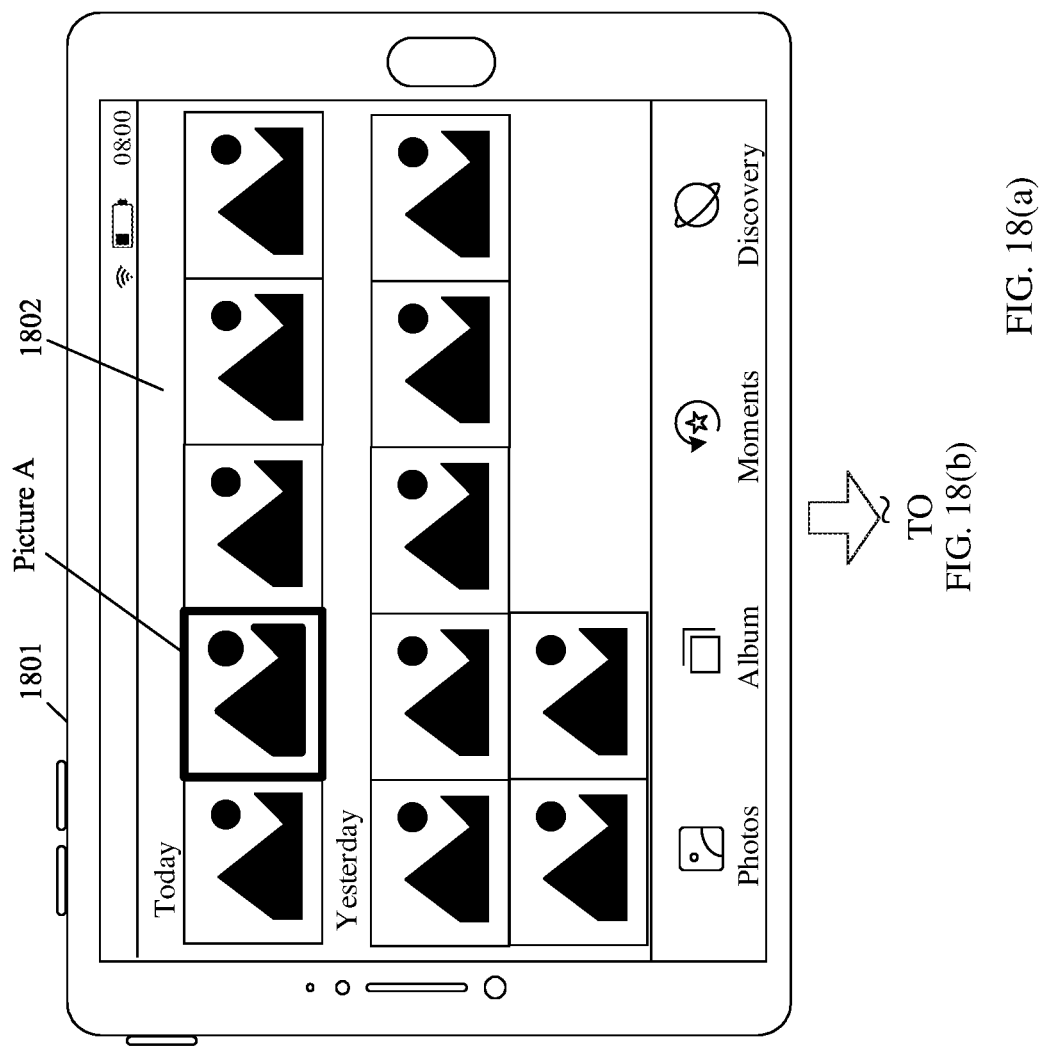
FIG. 18(a)

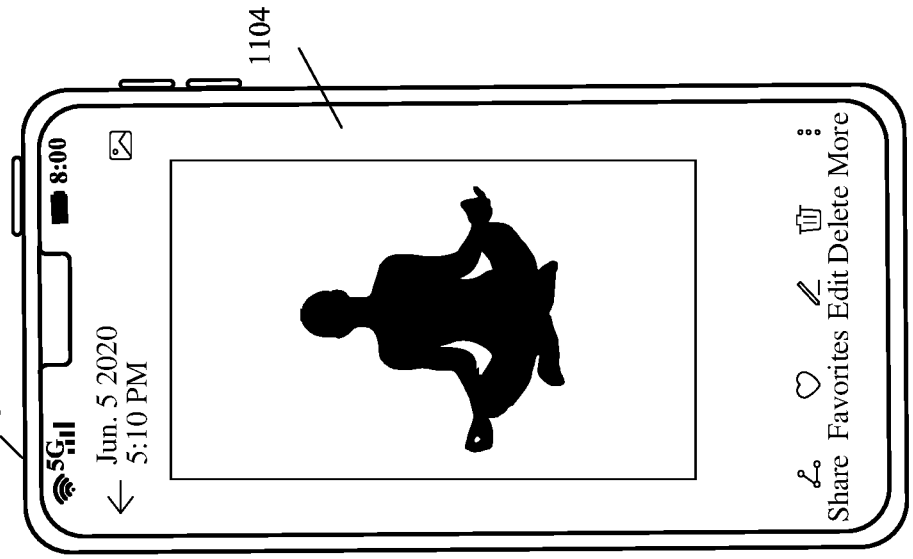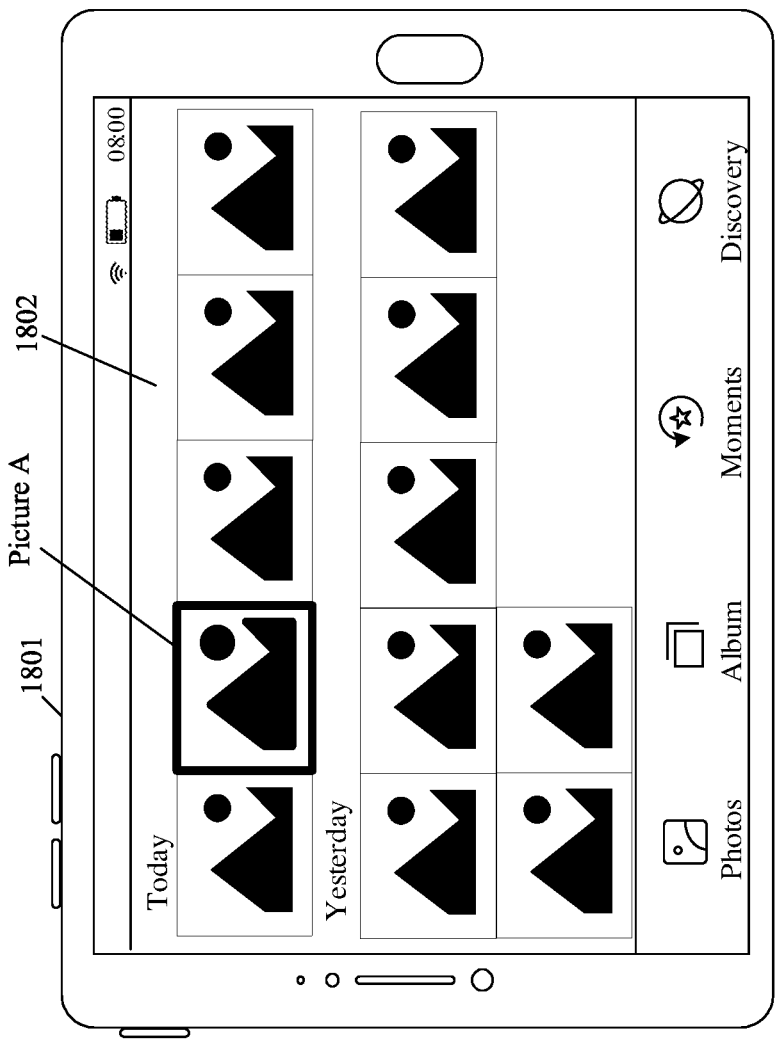
FIG. 18(b)

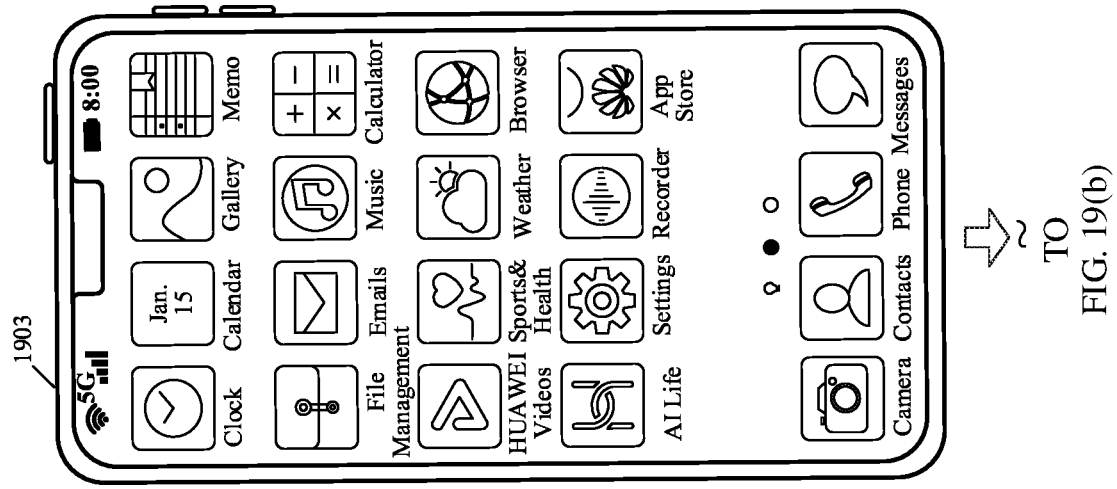
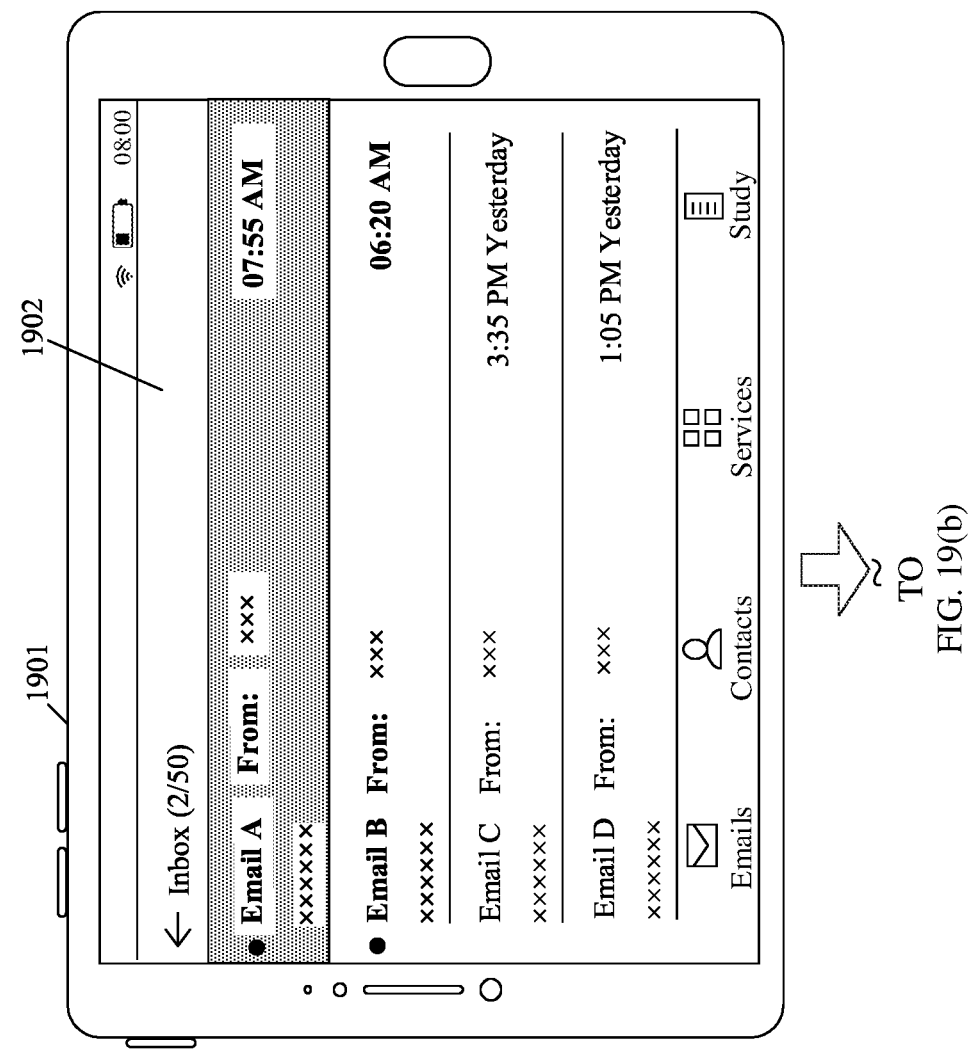
FIG. 19(a)
FIG. 19(b)

FIG. 19(b)

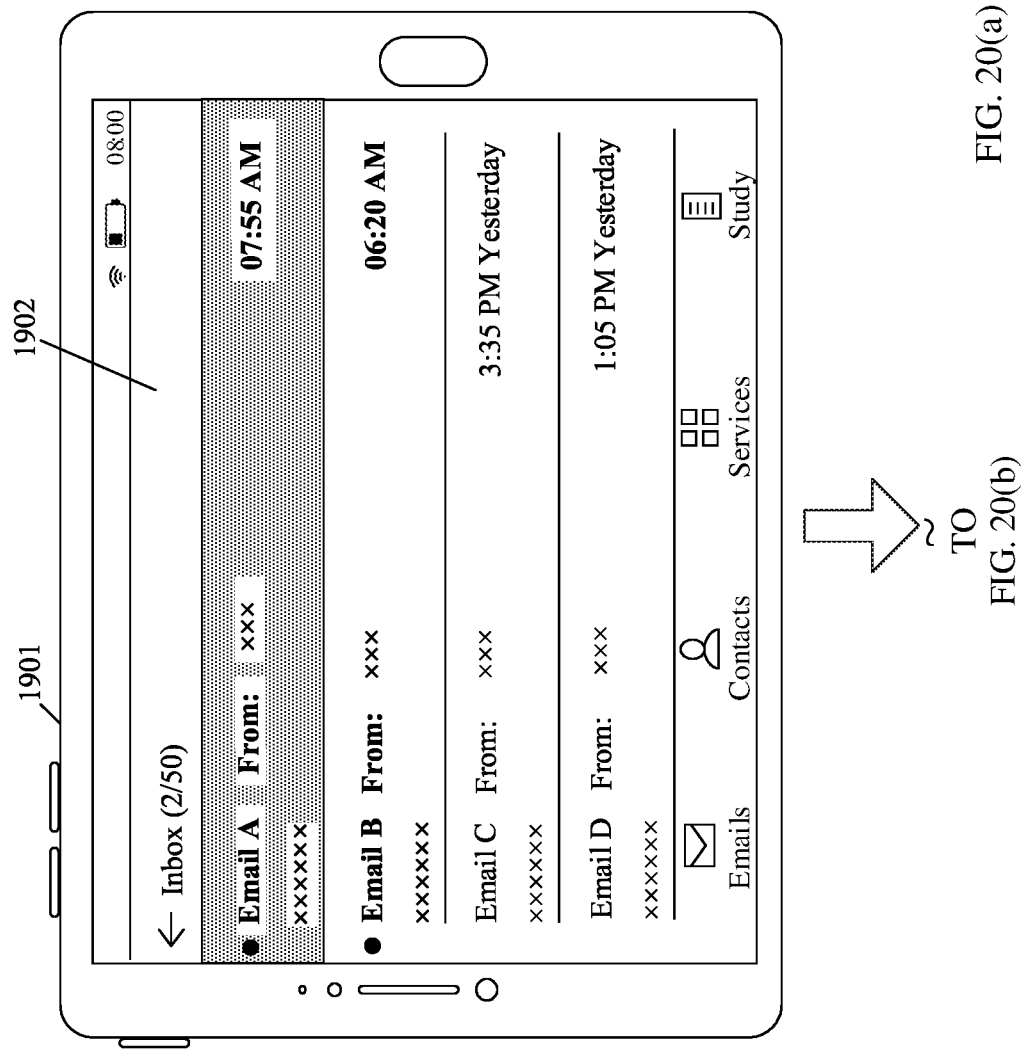
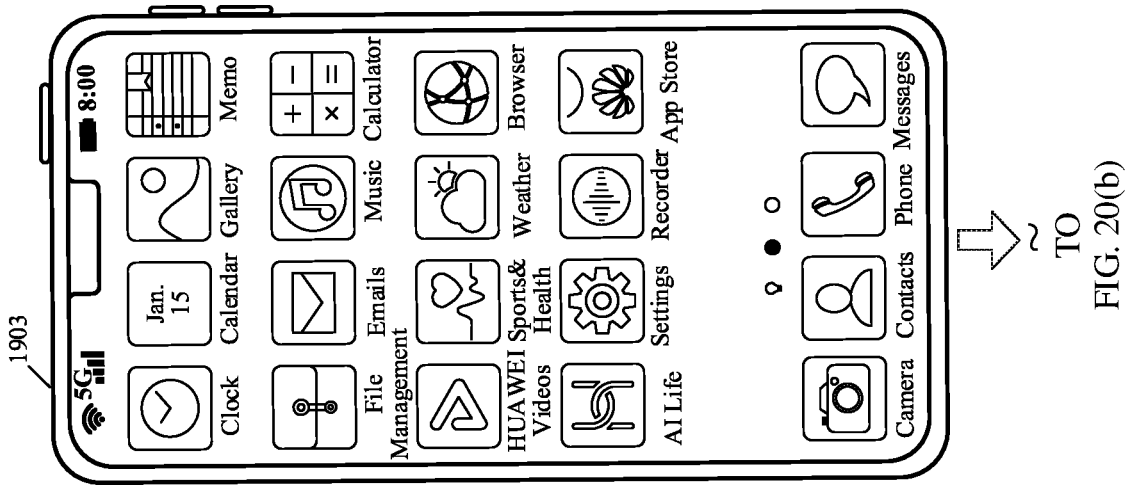
FIG. 20(a)
FIG. 20(b)

FIG. 20(b)

CONT. FROM FIG. 22(a)

A first operation is received

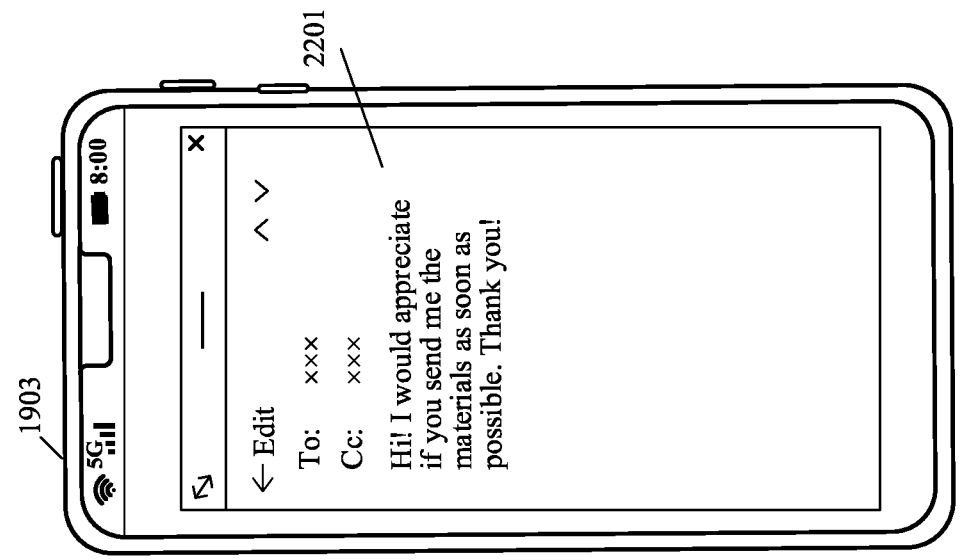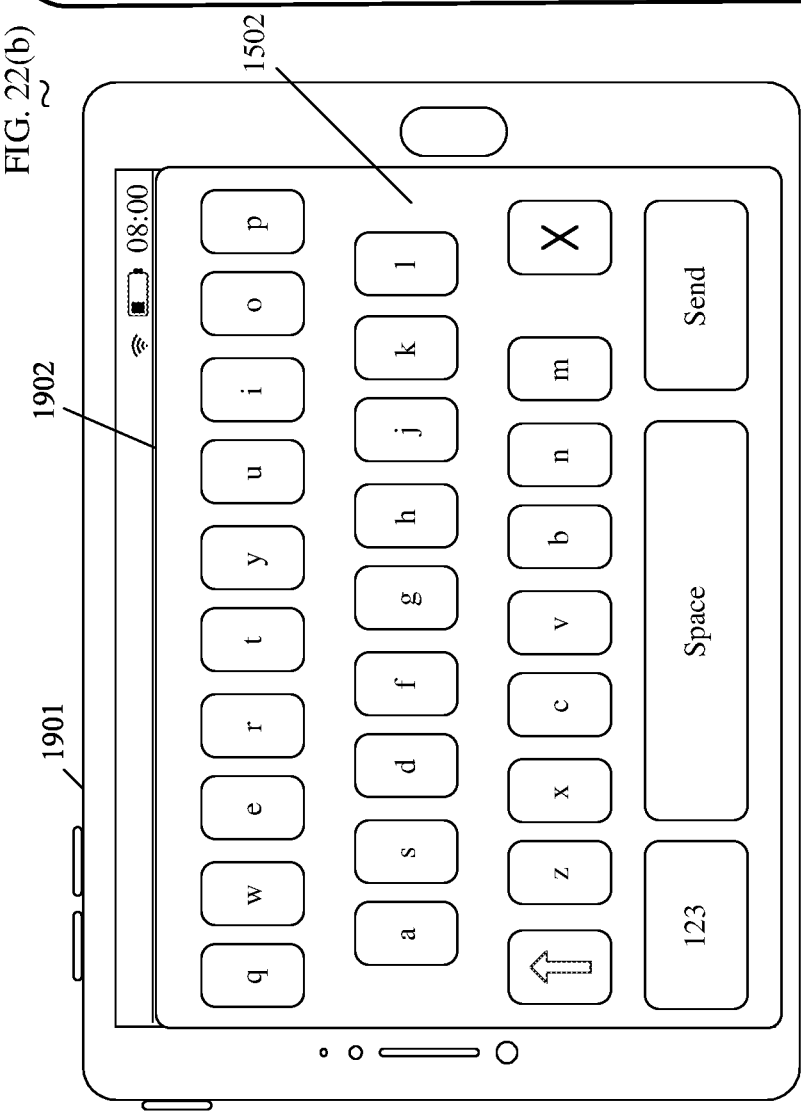
FIG. 22(c)

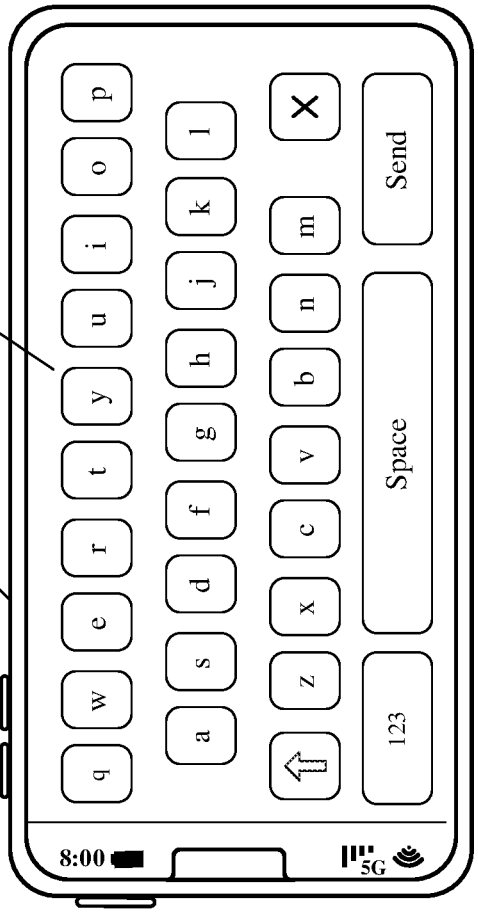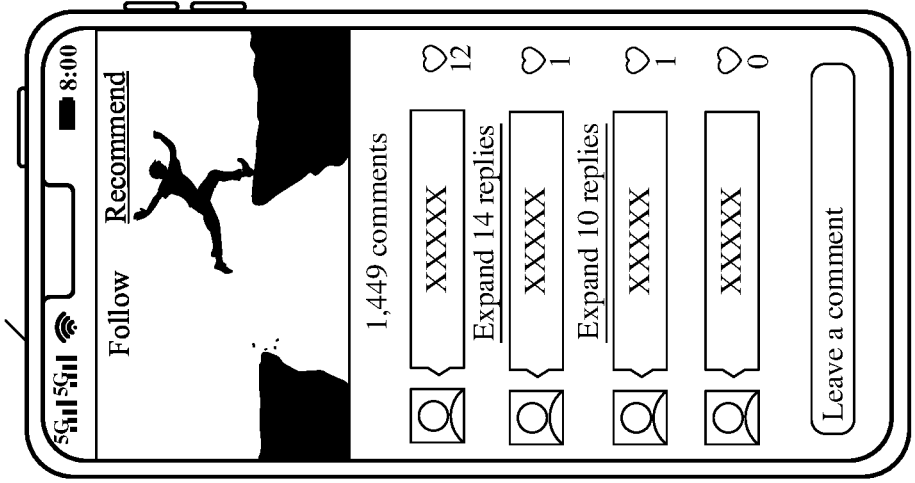
FIG. 23(b)

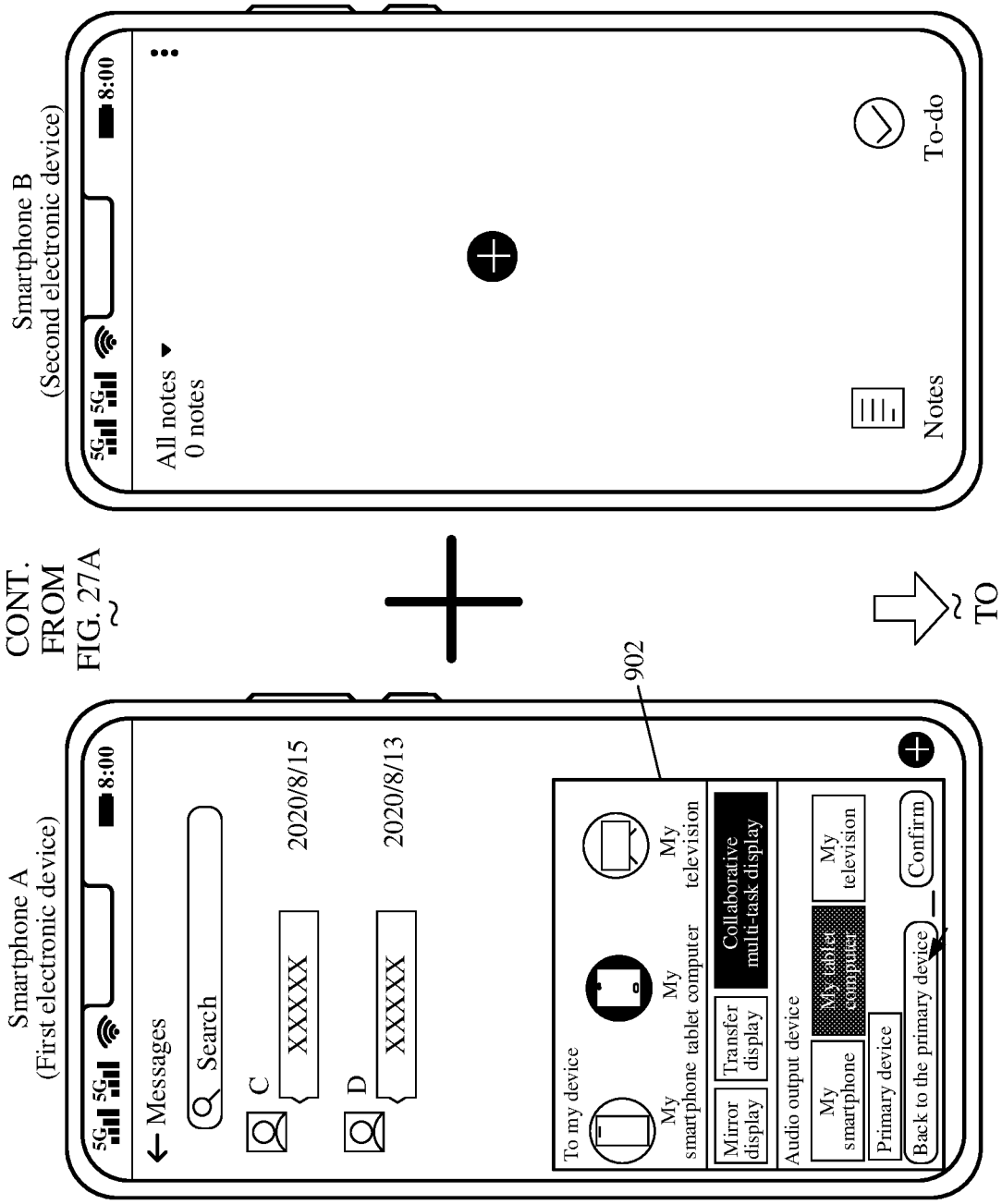

DISTRIBUTED INTERFACE DISPLAY METHOD, ELECTRONIC DEVICE, AND COMMUNICATION SYSTEM

CROSS-REFERENCE TO RELATED APPLICATIONS

This application is a continuation of U.S. patent application Ser. No. 18/246,986, filed on Mar. 28, 2023, which is a National Stage of International Patent Application No. PCT/CN2021/119324, filed on Sep. 18, 2021, which claims priority to Chinese Patent Application No. 202011050573.7, filed on Sep. 29, 2020, and Chinese Patent Application No. 202011149035.3, filed on Oct. 23, 2020 and Chinese Patent Application No. 202011053974.8, filed on Sep. 29, 2020. All of the aforementioned applications are incorporated herein by reference in their entireties.

TECHNICAL FIELD

Embodiments of this application relate to the field of electronic technologies, and in particular, to a distributed interface display method, an electronic device, and a communication system.

BACKGROUND

With the development of terminal technologies, multi-device display brings more convenience to people's lives. Multi-device display means that interface display is implemented by using displays of a plurality of electronic devices.

Generally, multi-device display may include mirror display, transfer display, or extended display. For example, as shown in (a) in FIG. 1, mirror display means mirroring an interface a displayed on a device A to a device B, and the same interface is displayed on displays of the device B and the device A. As shown in (b) in FIG. 1, transfer display means transferring the interface a displayed on the device A to the device B for display. Extended display means tiling the displays of the device B and the device A for displaying one interface. For example, as shown in (c) in FIG. 1, the interface a is divided into an interface a1 and an interface a2 geometrically, and the interface a1 and the interface a2 are displayed on the display of the device A and the display of the device B respectively.

However, neither mirror display nor transfer display in the foregoing conventional technologies can implement distributed collaborative display of different content in an interface on different devices. Extended display described above may tile a plurality of devices for displaying a same interface, but still cannot implement distributed collaborative display of and collaborative operations on different content in a same interface on different devices. However, in some scenarios, distributed display of and collaborative operations on content in an interface are very important for improving user experience.

SUMMARY

This application provides a distributed interface display method, an electronic device, and a communication system, to implement distributed collaborative display of different content in a same interface, thereby providing more convenience of using for a user and improving user experience.

To achieve the foregoing objective, the following technical solutions are used in embodiments of this application.

According to a first aspect, a distributed interface display method is provided. The method includes: A first electronic device displays a first interface of a first application that includes at least a first function area and a second function area; the first electronic device detects a touch operation with a second electronic device; the first electronic device sends, in response to the touch operation, content in the first function area to the second electronic device for display; and the first electronic device displays a second interface of the first application, where the second interface includes the second function area but does not include the first function area.

According to the solution provided in the first aspect, the first electronic device may display content in a plurality of function areas (for example, the first function area and the second function area) on the first electronic device and another electronic device (for example, the second electronic device) in a distributed collaborative manner. Specifically, when the first electronic device displays the content in the first function area and the content in the second function area, the first electronic device may send the content in one of the function areas (for example, the first function area) to the second electronic device for display. According to this solution, a user can conveniently handle different tasks by using a plurality of electronic devices, thereby facilitating a user operation.

In a possible implementation, after the first electronic device sends the content in the first function area to the second electronic device for display, the method further includes: The first electronic device reallocates a display layout of a remaining function area on the first electronic device. In this application, a flexible adjustment of a display layout of a plurality of function areas is supported.

In a possible implementation, the first function area is determined by the first electronic device based on a function area selection operation of a user; or the first function area is autonomously determined by the first electronic device based on a function implemented by a function area of the first interface. In this application, content in a function area is supported to be sent, based on actual selection of a user, to another electronic device for display, or content in a function area is supported to be sent, based on specific functions implemented by different function areas, to another electronic device for display.

In a possible implementation, the first function area is determined by the first electronic device based on a function area content selection operation of a user; or the first function area is autonomously determined by the first electronic device based on a task attribute of content in a function area of the first interface. In this application, content in a function area is supported to be sent, based on actual selection of a user, to another electronic device for display, or content in a function area is supported to be sent, based on specific task attributes of content in different function areas, to another electronic device for display.

In a possible implementation, the first function area and the second function area of the first interface are laid out on the first electronic device according to a preset relative position relationship.

In a possible implementation, the first function area and the second function area support an adjustment to an adaptability; and the adaptability includes a stretching capability, a scaling capability, a hiding capability, a line wrapping capability, an equalization capability, a proportion capability, and an extension capability. In this application, each first function area may have a flexible adjustment of an adaptability that includes a stretching capability, a scaling capability, a hiding capability, a line wrapping capability, an equalization capability, a proportion capability, an extension capability, and the like.

In a possible implementation, the method further includes: The first electronic device withdraws, in response to an operation of the user for triggering to withdraw collaborative display, the content in the first function area from the second electronic device; and the first electronic device displays the first interface of the first application after the first electronic device withdraws the content in the first function area from the second electronic device, where the first interface includes at least the first function area and the second function area. In this application, a primary device (namely, a first device) may withdraw content in a function area that is sent to a secondary device (namely, a second device) at any time.

In a possible implementation, the content in the first function area and the content in the second function area of the first interface are rendered together, by the first electronic device according to a preset framework template, on a virtual screen of the first electronic device in a form of one or more atomic services. In this application, because contents in the plurality of function areas are rendered together according to the preset framework template in the form of one or more atomic services, content division at a granularity of a function area is acceptable.

In a possible implementation, that the first electronic device sends the content in the first function area to the second electronic device for display includes: The first electronic device sends a standard video stream that is on the virtual screen and that corresponds to the content in the first function area to the second electronic device for display.

According to a second aspect, a first electronic device is provided. The first electronic device includes: a memory, configured to store computer program code, where the computer program code includes instructions; a radio frequency circuit, configured to send and receive a radio signal; and a processor, configured to: execute the instructions, so that the first electronic device displays a first interface of a first application that includes at least a first function area and a second function area; and send, in response to a touch operation when the touch operation with a second electronic device is detected, content in the first function area to the second electronic device for display, where after the first electronic device sends, by using the radio frequency circuit, the content in the first function area to the second electronic device for display, the first electronic device displays a second interface of the first application, where the second interface includes the second function area but does not include the first function area.

According to the solution provided in the second aspect, the first electronic device may display content in a plurality of function areas (for example, the first function area and the second function area) on the first electronic device and another electronic device (for example, the second electronic device) in a distributed collaborative manner. Specifically, when the first electronic device displays the content in the first function area and the content in the second function area, the first electronic device may send, by using the radio frequency circuit, the content in one of the function areas (for example, the first function area) to the second electronic device for display. According to this solution, a user can conveniently handle different tasks by using a plurality of electronic devices, thereby facilitating a user operation.

In a possible implementation, the processor is further configured to execute the instructions, so that the radio frequency circuit of the first electronic device reallocates, after sending, by using the radio frequency circuit, the content in the first function area to the second electronic device for display, a display layout of a remaining function area on the first electronic device. In this application, a flexible adjustment of a display layout of a plurality of function areas is supported.

In a possible implementation, the first function area is determined, by the processor executing the instructions, based on a function area selection operation of a user; or is autonomously determined based on a function implemented by a function area of the first interface. In this application, content in a function area is supported to be sent, based on actual selection of a user, to another electronic device for display, or content in a function area is supported to be sent, based on specific functions implemented by different function areas, to another electronic device for display.

In a possible implementation, the first function area is determined, by the processor executing the instructions, based on a function area content selection operation of a user; or is autonomously determined based on a task attribute of content in a function area of the first interface. In this application, content in a function area is supported to be sent, based on actual selection of a user, to another electronic device for display, or content in a function area is supported to be sent, based on specific task attributes of content in different function areas, to another electronic device for display.

In a possible implementation, the first function area and the second function area of the first interface are laid out on the first electronic device according to a preset relative position relationship.

In a possible implementation, the first function area and the second function area support an adjustment to an adaptability; and the adaptability includes a stretching capability, a scaling capability, a hiding capability, a line wrapping capability, an equalization capability, a proportion capability, and an extension capability. In this application, each first function area may have a flexible adjustment of an adaptability that includes a stretching capability, a scaling capability, a hiding capability, a line wrapping capability, an equalization capability, a proportion capability, an extension capability, and the like.

In a possible implementation, the processor is further configured to execute the instructions and withdraw, in response to an operation of the user for triggering to withdraw collaborative display, the content in the first function area from the second electronic device; and the first electronic device displays the first interface of the first application after the first electronic device withdraws the content in the first function area from the second electronic device, where the first interface includes at least the first function area and the second function area. In this application, a primary device (namely, a first device) may withdraw content in a function area that is sent to a secondary device (namely, a second device) at any time.

In a possible implementation, the content in the first function area and the content in the second function area of the first interface are rendered together, by the processor executing the instructions, according to a preset framework template, on a virtual screen of the first electronic device in a form of one or more atomic services. In this application, because contents in the plurality of function areas are rendered together according to the preset framework template in the form of one or more atomic services, content division at a granularity of a function area is acceptable.

In a possible implementation, the processor is specifically configured to execute the instructions, so that the first electronic device sends, by using the radio frequency circuit, a standard video stream that is on the virtual screen and that corresponds to the content in the first function area to the second electronic device for display.

According to a third aspect, a first electronic device is provided. The first electronic device includes: a display unit, configured to display a first interface of a first application that includes at least a first function area and a second function area; and a transceiver unit and a processing unit, where the processing unit is configured to send, in response to a detected touch operation when the touch operation with a second electronic device is detected, content in the first function area to the second electronic device for display, where after the first electronic device sends, by using the transceiver unit, the content in the first function area to the second electronic device for display, the first electronic device displays a second interface of the first application, where the second interface includes the second function area but does not include the first function area.

According to the solution provided in the third aspect, the first electronic device may display content in a plurality of function areas (for example, the first function area and the second function area) on the first electronic device and another electronic device (for example, the second electronic device) in a distributed collaborative manner. Specifically, when the first electronic device displays the content in the first function area and the content in the second function area, the first electronic device may send the content in one of the function areas (for example, the first function area) to the second electronic device for display. According to this solution, a user can conveniently handle different tasks by using a plurality of electronic devices, thereby facilitating a user operation.

In a possible implementation, the processing unit is further configured to: reallocate, after sending, by using the transceiver unit, the content in the first function area to the second electronic device for display, a display layout of a remaining function area on the first electronic device. In this application, a flexible adjustment of a display layout of a plurality of function areas is supported.

In a possible implementation, the first function area is determined by the processing unit based on a function area selection operation of a user; or is autonomously determined based on a function implemented by a function area of the first interface. In this application, content in a function area is supported to be sent, based on actual selection of a user, to another electronic device for display, or content in a function area is supported to be sent, based on specific functions implemented by different function areas, to another electronic device for display.

In a possible implementation, the first function area is determined by the processing unit based on a function area content selection operation of a user; or is autonomously determined based on a task attribute of content in a function area of the first interface. In this application, content in a function area is supported to be sent, based on actual selection of a user, to another electronic device for display, or content in a function area is supported to be sent, based on specific task attributes of content in different function areas, to another electronic device for display.

In a possible implementation, the first function area and the second function area of the first interface are laid out on the first electronic device according to a preset relative position relationship.

In a possible implementation, the first function area and the second function area support an adjustment to an adaptability; and the adaptability includes a stretching capability, a scaling capability, a hiding capability, a line wrapping capability, an equalization capability, a proportion capability, and an extension capability. In this application, each first function area may have a flexible adjustment of an adaptability that includes a stretching capability, a scaling capability, a hiding capability, a line wrapping capability, an equalization capability, a proportion capability, an extension capability, and the like.

In a possible implementation, the processing unit is further configured to withdraw, in response to an operation of the user for triggering to withdraw collaborative display, the content in the first function area from the second electronic device; and the first electronic device displays the first interface of the first application after the first electronic device withdraws the content in the first function area from the second electronic device, where the first interface includes at least the first function area and the second function area. In this application, a primary device (namely, a first device) may withdraw content in a function area that is sent to a secondary device (namely, a second device) at anytime.

In a possible implementation, the content in the first function area and the content in the second function area of the first interface are rendered together, by the processing unit according to a preset framework template, on a virtual screen of the first electronic device in a form of one or more atomic services. In this application, because contents in the plurality of function areas are rendered together according to the preset framework template in the form of one or more atomic services, content division at a granularity of a function area is acceptable.

In a possible implementation, the processing unit is specifically configured to send, by using the transceiver unit, a standard video stream that is on the virtual screen and that corresponds to the content in the first function area to the second electronic device for display.

According to a fourth aspect, a distributed interface display method is provided. The method includes: A first electronic device displays a first interface that includes at least a first application interface, a second application interface, and a third application interface; the first electronic device detects a touch operation with a second electronic device; the first electronic device sends, in response to the touch operation, content in the first application interface to the second electronic device for display; and the first electronic device displays a second interface, where the second interface includes the second application interface and the third application interface but does not include the first application interface.

According to the solution provided in the fourth aspect, the first electronic device may display content in a plurality of application interfaces (for example, the first application interface, the second application interface, and the third application interface) on the first electronic device and another electronic device (for example, the second electronic device) in a distributed collaborative manner. Specifically, when the first electronic device displays the first application interface, the second application interface, and the third application interface, the first electronic device may send content in one of the application interfaces (for example, the first application interface) to the second electronic device for display. According to this solution, a user can conveniently handle different tasks by using a plurality of electronic devices, thereby facilitating a user operation.

In a possible implementation, after the first electronic device sends the content in the first application interface to the second electronic device for display, the method further includes: The first electronic device reallocates a display layout of a remaining application interface on the first electronic device. In this application, a flexible adjustment of a display layout of a plurality of application interfaces is supported.

In a possible implementation, the first application interface is determined by the first electronic device based on an application interface selection operation of a user; or the first application interface is autonomously determined by the first electronic device based on functions implemented by the first application interface, the second application interface, and the third application interface. In this application, an application interface is supported to be sent, based on actual selection of a user, to another electronic device for display, or an application interface is supported to be sent, based on specific functions implemented by different application interfaces, to another electronic device for display.

In a possible implementation, windows in the first application interface, the second application interface, and the third application interface support an adjustment to an adaptability; and the adaptability includes a stretching capability, a scaling capability, a hiding capability, a line wrapping capability, an equalization capability, a proportion capability, and an extension capability.

In a possible implementation, the method further includes: The first electronic device withdraws, in response to an operation of the user for triggering to withdraw collaborative display, the first application interface from the second electronic device; and the first electronic device displays the first interface after the first electronic device withdraws the first application interface from the second electronic device, where the first interface includes at least the first application interface, the second application interface, and the third application interface. In this application, a primary device (namely, a first device) may withdraw an application interface that is sent to a secondary device (namely, a second device) at any time.

According to a fifth aspect, a first electronic device is provided. The first electronic device includes: a memory, configured to store computer program code, where the computer program code includes instructions; a radio frequency circuit, configured to send and receive a radio signal; and a processor, configured to: execute the instructions, so that the first electronic device displays a first interface that includes at least a first application interface, a second application interface, and a third application interface; send, in response to a detected touch operation when the touch operation with a second electronic device is detected, content in the first application interface to the second electronic device for display, where after the first electronic device sends the content in the first application interface to the second electronic device for display, the first electronic device displays a second interface, where the second interface includes the second application interface and the third application interface but does not include the first application interface.

According to the solution provided in the fifth aspect, the first electronic device may display content in a plurality of application interfaces (for example, the first application interface, the second application interface, and the third application interface) on the first electronic device and another electronic device (for example, the second electronic device) in a distributed collaborative manner. Specifically, when the first electronic device displays the first application interface, the second application interface, and the third application interface, the first electronic device may send content in one of the application interfaces (for example, the first application interface) to the second electronic device for display. According to this solution, a user can conveniently handle different tasks by using a plurality of electronic devices, thereby facilitating a user operation.

In a possible implementation, the processor is further configured to execute the instructions, so that the first electronic device reallocates, after sending the content in the first application interface to the second electronic device for display, a display layout of a remaining application interface on the first electronic device. In this application, a flexible adjustment of a display layout of a plurality of application interfaces is supported.

In a possible implementation, the first application interface is determined by the processor executing the instructions, based on an application interface selection operation of a user; or is autonomously determined based on functions implemented by the first application interface, the second application interface, and the third application interface. In this application, an application interface is supported to be sent, based on actual selection of a user, to another electronic device for display, or an application interface is supported to be sent, based on specific functions implemented by different application interfaces, to another electronic device for display.

In a possible implementation, windows in the first application interface, the second application interface, and the third application interface support an adjustment to an adaptability; and the adaptability includes a stretching capability, a scaling capability, a hiding capability, a line wrapping capability, an equalization capability, a proportion capability, and an extension capability.

In a possible implementation, the processor is further configured to execute the instructions and withdraw, in response to an operation of the user for triggering to withdraw collaborative display, the first application interface from the second electronic device; and the first electronic device displays the first interface after the first electronic device withdraws the first application interface from the second electronic device, where the first interface includes at least the first application interface, the second application interface, and the third application interface. In this application, a primary device (namely, a first device) may withdraw an application interface that is sent to a secondary device (namely, a second device) at any time.

According to a sixth aspect, a first electronic device is provided. The first electronic device includes: a display unit, configured to display a first interface that includes at least a first application interface, a second application interface, and a third application interface; and a transceiver unit and a processing unit, where the processing unit is configured to send, by using the transceiver unit, in response to a detected touch operation when the touch operation with a second electronic device is detected, content in the first application interface to the second electronic device for display, where after the first electronic device sends the content in the first application interface to the second electronic device for display, the first electronic device displays a second interface, where the second interface includes the second application interface and the third application interface but does not include the first application interface.

According to the solution provided in the sixth aspect, the first electronic device may display content in a plurality of application interfaces (for example, the first application interface, the second application interface, and the third application interface) on the first electronic device and another electronic device (for example, the second electronic device) in a distributed collaborative manner. Specifically, when the first electronic device displays the first application interface, the second application interface, and the third application interface, the first electronic device may send content in one of the application interfaces (for example, the first application interface) to the second electronic device for display. According to this solution, a user can conveniently handle different tasks by using a plurality of electronic devices, thereby facilitating a user operation.

In a possible implementation, the processing unit is further configured to reallocate, after sending the content in the first application interface to the second electronic device for display, a display layout of a remaining application interface on the first electronic device. In this application, a flexible adjustment of a display layout of a plurality of application interfaces is supported.

In a possible implementation, the first application interface is determined by the processing unit based on an application interface selection operation of a user; or is autonomously determined based on functions implemented by the first application interface, the second application interface, and the third application interface. In this application, an application interface is supported to be sent, based on actual selection of a user, to another electronic device for display, or an application interface is supported to be sent, based on specific functions implemented by different application interfaces, to another electronic device for display.

In a possible implementation, windows in the first application interface, the second application interface, and the third application interface support an adjustment to an adaptability; and the adaptability includes a stretching capability, a scaling capability, a hiding capability, a line wrapping capability, an equalization capability, a proportion capability, and an extension capability.

In a possible implementation, the processing unit is further configured to withdraw, in response to an operation of the user for triggering to withdraw collaborative display, the first application interface from the second electronic device; and the first electronic device displays the first interface after the first electronic device withdraws the first application interface from the second electronic device, where the first interface includes at least the first application interface, the second application interface, and the third application interface. In this application, a primary device (namely, a first device) may withdraw an application interface that is sent to a secondary device (namely, a second device) at any time.

According to a seventh aspect, a communication system is provided. The communication system includes a first electronic device as that described in any one of the possible implementations of the second aspect, the third aspect, the fifth aspect, or the sixth aspect, and a second electronic device.

According to an eighth aspect, a distributed interface display method is provided. The method includes: A first electronic device displays a first interface, where the first interface includes an electronic document list, and the electronic document list includes at least one unread electronic document and at least one read electronic document; the first electronic device detects a touch operation with a second electronic device, and determines that the second electronic device is a secondary device of the first electronic device; and the first electronic device searches for a latest unread electronic document in the at least one unread electronic document, and displays a detail interface for the latest unread electronic document on the second electronic device; and the first electronic device continues displaying the electronic document list, where the latest unread electronic document in the electronic document list is marked as read.

According to the solution provided in the eighth aspect, the first electronic device may display the electronic document list and a detail interface for an unread electronic document (for example, the latest unread electronic document) on the first electronic device and another electronic device (for example, the second electronic device) in a distributed collaborative manner. Specifically, when the first electronic device displays the electronic document list, the first electronic device may display the detail interface for the latest unread electronic document on the second electronic device. According to this solution, a user can conveniently handle different tasks by using a plurality of electronic devices, thereby facilitating a user operation.

In a possible implementation, that the first electronic device searches for the latest unread electronic document in the at least one unread electronic document, and displays the detail interface for the latest unread electronic document on the second electronic device includes: In response to the touch operation, the first electronic device searches for the latest unread electronic document in the at least one unread electronic document, and sends the detail interface for the latest unread electronic document to the second electronic device for display. In this application, when displaying the electronic document list, the first electronic device may send, in response to a received preset operation (for example, the touch operation between the second electronic device and the first electronic device), the detail interface for the latest unread electronic document to the second electronic device for display, so that the user can conveniently handle different tasks by using a plurality of electronic devices, thereby facilitating a user operation.

In a possible implementation, the electronic document list is any one of the following: an email list, a short message list, or a memo list. In the solutions provided in this application, distributed collaborative display of a listing interface and a detail interface for an electronic document, for example, an email, a short message, or a memo, on different electronic devices is supported, so that a user can conveniently handle different tasks by using a plurality of electronic devices, thereby facilitating a user operation.

In a possible implementation, the electronic document list is the email list or the short message list; and the method further includes: The second electronic device sends, in response to a received editing operation of a user on the detail interface for the latest unread electronic document, an input keyboard to the first electronic device for display, where the second electronic device displays only an editing interface for the latest unread electronic document. In this application, when the second electronic device displays an editing interface for an electronic document in the electronic document list on the first electronic device in a distributed collaborative manner, the second electronic device may further display the input keyboard on the first electronic device in a distributed collaborative manner, so that a user can conveniently edit the electronic document by using the first electronic device, thereby facilitating a user operation.

In a possible implementation, the electronic document list is the email list or the short message list; and the method further includes: The second electronic device floats or overlaps, in response to a received editing operation of a user on the detail interface for the latest unread electronic document, an input keyboard for display in an editing interface for the latest unread electronic document; and the second electronic device sends, in response to the detected touch operation with the first electronic device, the input keyboard to the first electronic device for display, where the second electronic device displays only the editing interface for the latest unread electronic document. In this application, when the second electronic device displays an editing interface for an electronic document in the electronic document list on the first electronic device in a distributed collaborative manner, the second electronic device may further display the input keyboard, floating or overlapped for display, on the first electronic device in a distributed collaborative manner, so that a user can conveniently edit the electronic document by using the first electronic device, thereby facilitating a user operation.

In a possible implementation, the electronic document list is the email list or the short message list; and the method further includes: The second electronic device sends, in response to a received reply operation of a user to the latest unread electronic document, an input keyboard to the first electronic device for display, where the second electronic device displays only a reply interface for the latest unread electronic document. In this application, when the second electronic device displays a reply interface for an electronic document in the electronic document list on the first electronic device in a distributed collaborative manner, the second electronic device may further display the input keyboard on the first electronic device in a distributed collaborative manner, so that a user can conveniently reply to the electronic document by using the first electronic device, thereby facilitating a user operation.

In a possible implementation, the electronic document list is the email list or the short message list; and the method further includes: The second electronic device floats or overlaps, in response to a received reply operation of a user to the latest unread electronic document, an input keyboard for display in a reply interface for the latest unread electronic document; and the second electronic device sends, in response to the detected touch operation with the first electronic device, the input keyboard to the first electronic device for display, where the second electronic device displays only the reply interface for the latest unread electronic document. In this application, when the second electronic device displays a reply interface for an electronic document in the electronic document list on the first electronic device in a distributed collaborative manner, the second electronic device may further display the input keyboard, floating or overlapped for display, on the first electronic device in a distributed collaborative manner, so that a user can conveniently reply to the electronic document by using the first electronic device, thereby facilitating a user operation.

In a possible implementation, the electronic document list is the memo list. The method further includes: The second electronic device sends, in response to a received editing operation of a user on a latest unsettled memo note, an input keyboard to the first electronic device for display, where the second electronic device displays only an editing interface for the latest unsettled memo note. In this application, when the second electronic device displays an editing interface for an electronic document (for example, the latest unsettled memo note) in the electronic document list on the first electronic device in a distributed collaborative manner, the second electronic device may further display the input keyboard, floating or overlapped for display, on the first electronic device in a distributed collaborative manner, so that a user can conveniently handle the latest unsettled memo note by using the first electronic device, thereby facilitating a user operation.

In a possible implementation, the electronic document list is the memo list; and the method further includes: The second electronic device, floats or overlaps, in response to a received editing operation of a user on a latest unsettled memo note, an input keyboard for display in an editing interface for the latest unsettled memo note; and the second electronic device sends, in response to the detected touch operation with the first electronic device, the input keyboard to the first electronic device for display, where the second electronic device displays only the editing interface for the latest unsettled memo note. In this application, when the second electronic device displays an editing interface for an electronic document (for example, the latest unsettled memo note) in the electronic document list on the first electronic device in a distributed collaborative manner, the second electronic device may further display the input keyboard, floating or overlapped for display, on the first electronic device in a distributed collaborative manner, so that a user can conveniently handle the electronic document by using the first electronic device, thereby facilitating a user operation.

In a possible implementation, that the first electronic device determines that the second electronic device is the secondary device of the first electronic device includes: The first electronic device determines, according to a second operation of the user, that the second electronic device is the secondary device of the first electronic device, where the second operation is a selection operation of the user on a prompt box; and the prompt box is displayed by the first electronic device on a display of the first electronic device in response to the touch operation, and the prompt box is used by the user to select a primary device and a secondary device. In this application, the first electronic device may determine, based on selection of the user, the second electronic device (that is, the secondary device) used in distributed collaborative display with the first electronic device.

In a possible implementation, that the first electronic device determines that the second electronic device is the secondary device of the first electronic device includes: The first electronic device determines, according to a second operation of the user, that the second electronic device is the secondary device of the first electronic device, where the second operation is a selection operation of the user on a prompt box; and the prompt box is displayed by the first electronic device on a display of the first electronic device in response to a drag operation of the user on a draggable icon, the prompt box is used by the user to select a primary device and a secondary device, and the draggable icon is displayed by the first electronic device on the display of the first electronic device in response to the touch operation. In this application, the first electronic device may determine, based on selection of the user, the second electronic device (that is, the secondary device) used in distributed collaborative display with the first electronic device.

In a possible implementation, that the first electronic device determines that the second electronic device is the secondary device of the first electronic device includes: The first electronic device determines, based on motion data of the first electronic device, that the second electronic device is the secondary device of the first electronic device, where the motion data of the first electronic device indicates that the first electronic device is stationary or a movement acceleration is less than a preset threshold. In this application, the first electronic device may determine, based on the motion data of the first electronic device, the second electronic device (that is, the secondary device) used in distributed collaborative display with the first electronic device.

According to a ninth aspect, a communication system is provided. The communication system includes: a first electronic device, configured to: display a first interface, where the first interface includes an electronic document list, and the electronic document list includes at least one unread electronic document and at least one read electronic document; determine that a second electronic device is a secondary device of the first electronic device when a touch operation with the second electronic device is detected by the first electronic device; and search, by using the first electronic device, for a latest unread electronic document in the at least one unread electronic document, and display a detail interface for the latest unread electronic document on the second electronic device; and a second electronic device, configured to display the detail interface for the latest unread electronic document from the first electronic device, where the first electronic device continues displaying the electronic document list after the detail interface for the latest unread electronic document is sent by the first electronic device to the second electronic device, and the latest unread electronic document in the electronic document list is marked as read.

According to the method provided in the ninth aspect, the first electronic device may display the electronic document list and a detail interface for an unread electronic document (for example, the latest unread electronic document) on the first electronic device and another electronic device (for example, the second electronic device) in a distributed collaborative manner. Specifically, when the first electronic device displays the electronic document list, the first electronic device may display the detail interface for the latest unread electronic document on the second electronic device. According to this solution, a user can conveniently handle different tasks by using a plurality of electronic devices, thereby facilitating a user operation.

In a possible implementation, the first electronic device is specifically configured to: in response to the touch operation, search for the latest unread electronic document in the at least one unread electronic document, and send the detail interface for the latest unread electronic document to the second electronic device for display. In this application, when displaying the electronic document list, the first electronic device may send, in response to a received preset operation (for example, the touch operation between the second electronic device and the first electronic device), the detail interface for the latest unread electronic document to the second electronic device for display, so that the user can conveniently handle different tasks by using a plurality of electronic devices, thereby facilitating a user operation.

In a possible implementation, the electronic document list is any one of the following: an email list, a short message list, or a memo list. In the solutions provided in this application, distributed collaborative display of a listing interface and a detail interface for an electronic document, for example, an email, a short message, or a memo, on different electronic devices is supported, so that a user can conveniently handle different tasks by using a plurality of electronic devices, thereby facilitating a user operation.

In a possible implementation, the electronic document list is the email list or the short message list; and the second electronic device is further configured to send, in response to a received editing operation of a user on the detail interface for the latest unread electronic document, an input keyboard to the first electronic device for display, where after the second electronic device sends the input keyboard to the first electronic device for display, the first electronic device displays the input keyboard, and the second electronic device displays only an editing interface for the latest unread electronic document. In this application, when the second electronic device displays an editing interface for an electronic document in the electronic document list on the first electronic device in a distributed collaborative manner, the second electronic device may further display the input keyboard on the first electronic device in a distributed collaborative manner, so that a user can conveniently edit the electronic document by using the first electronic device, thereby facilitating a user operation.

In a possible implementation, the electronic document list is the email list or the short message list; and the second electronic device is further configured to: float or overlap, in response to a received editing operation of a user on the detail interface for the latest unread electronic document, an input keyboard for display in an editing interface for the latest unread electronic document; and send, in response to the detected touch operation with the first electronic device, the input keyboard to the first electronic device for display, where after the second electronic device sends the input keyboard to the first electronic device for display, the first electronic device displays the input keyboard, and the second electronic device displays only the editing interface for the latest unread electronic document. In this application, when the second electronic device displays an editing interface for an electronic document in the electronic document list on the first electronic device in a distributed collaborative manner, the second electronic device may further display the input keyboard, floating or overlapped for display, on the first electronic device in a distributed collaborative manner, so that a user can conveniently edit the electronic document by using the first electronic device, thereby facilitating a user operation.

In a possible implementation, the electronic document list is the email list or the short message list; and the second electronic device is further configured to send, in response to a received reply operation of a user to the latest unread electronic document, an input keyboard to the first electronic device for display, where after the second electronic device sends the input keyboard to the first electronic device for display, the first electronic device displays the input keyboard, and the second electronic device displays only a reply interface for the latest unread electronic document. In this application, when the second electronic device displays a reply interface for an electronic document in the electronic document list on the first electronic device in a distributed collaborative manner, the second electronic device may further display the input keyboard on the first electronic device in a distributed collaborative manner, so that a user can conveniently reply to the electronic document by using the first electronic device, thereby facilitating a user operation.

In a possible implementation, the electronic document list is the email list or the short message list; and the second electronic device is further configured to: float or overlap, in response to a received reply operation of a user to the latest unread electronic document, an input keyboard for display in a reply interface for the latest unread electronic document; and send, in response to the detected touch operation with the first electronic device, the input keyboard to the first electronic device for display, where after the second electronic device sends the input keyboard to the first electronic device for display, the first electronic device displays the input keyboard, and the second electronic device displays only the reply interface for the latest unread electronic document. In this application, when the second electronic device displays a reply interface for an electronic document in the electronic document list on the first electronic device in a distributed collaborative manner, the second electronic device may further display the input keyboard, floating or overlapped for display, on the first electronic device in a distributed collaborative manner, so that a user can conveniently reply to the electronic document by using the first electronic device, thereby facilitating a user operation.

In a possible implementation, the electronic document list is the memo list; and the second electronic device is further configured to send, in response to a received editing operation of a user on a latest unsettled memo note, an input keyboard to the first electronic device for display, where after the second electronic device sends the input keyboard to the first electronic device for display, the first electronic device displays the input keyboard, and the second electronic device displays only an editing interface for the latest unsettled memo note. In this application, when the second electronic device displays an editing interface for an electronic document (for example, the latest unsettled memo note) in the electronic document list on the first electronic device in a distributed collaborative manner, the second electronic device may further display the input keyboard, floating or overlapped for display, on the first electronic device in a distributed collaborative manner, so that a user can conveniently handle the latest unsettled memo note by using the first electronic device, thereby facilitating a user operation.

In a possible implementation, the electronic document list is the memo list; and the second electronic device is further configured to: float or overlap, in response to a received editing operation of a user on a latest unsettled memo note, an input keyboard for display in an editing interface for the latest unsettled memo note; and send, in response to the detected touch operation with the first electronic device, the input keyboard to the first electronic device for display, where after the second electronic device sends the input keyboard to the first electronic device for display, the first electronic device displays the input keyboard, and the second electronic device displays only the editing interface for the latest unsettled memo note. In this application, when the second electronic device displays an editing interface for an electronic document (for example, the latest unsettled memo note) in the electronic document list on the first electronic device in a distributed collaborative manner, the second electronic device may further display the input keyboard, floating or overlapped for display, on the first electronic device in a distributed collaborative manner, so that a user can conveniently handle the electronic document by using the first electronic device, thereby facilitating a user operation.

In a possible implementation, that the first electronic device determines that the second electronic device is the secondary device of the first electronic device includes: The first electronic device determines, according to a second operation of the user, that the second electronic device is the secondary device of the first electronic device, where the second operation is a selection operation of the user on a prompt box; and the prompt box is displayed by the first electronic device on a display of the first electronic device in response to the touch operation, and the prompt box is used by the user to select a primary device and a secondary device. In this application, the first electronic device may determine, based on selection of the user, the second electronic device (that is, the secondary device) used in distributed collaborative display with the first electronic device.

In a possible implementation, that the first electronic device determines that the second electronic device is the secondary device of the first electronic device includes: The first electronic device determines, according to a second operation of the user, that the second electronic device is the secondary device of the first electronic device, where the second operation is a selection operation of the user on a prompt box; and the prompt box is displayed by the first electronic device on a display of the first electronic device in response to a drag operation of the user on a draggable icon, the prompt box is used by the user to select a primary device and a secondary device, and the draggable icon is displayed by the first electronic device on the display of the first electronic device in response to the touch operation. In this application, the first electronic device may determine, based on selection of the user, the second electronic device (that is, the secondary device) used in distributed collaborative display with the first electronic device.

In a possible implementation, that the first electronic device determines that the second electronic device is the secondary device of the first electronic device includes: The first electronic device determines, based on motion data of the first electronic device, that the second electronic device is the secondary device of the first electronic device, where the motion data of the first electronic device indicates that the first electronic device is stationary or a movement acceleration is less than a preset threshold. In this application, the first electronic device may determine, based on the motion data of the first electronic device, the second electronic device (that is, the secondary device) used in distributed collaborative display with the first electronic device.

According to a tenth aspect, a first electronic device is provided. The first electronic device includes: a memory, configured to store computer program code, where the computer program code includes instructions; a radio frequency circuit, configured to send and receive a radio signal; and a processor, configured to: execute the instructions, so that the first electronic device displays a first interface, where the first interface includes an electronic document list, and the electronic document list includes at least one unread electronic document and at least one read electronic document; detects a touch operation with a second electronic device, and determines that the second electronic device is a secondary device of the first electronic device; and searches for a latest unread electronic document in the at least one unread electronic document, and displays a detail interface for the latest unread electronic document on the second electronic device, where the first electronic device continues displaying the electronic document list after the detail interface for the latest unread electronic document is displayed on the second electronic device, and the latest unread electronic document in the electronic document list is marked as read.

According to the solution provided in the tenth aspect, the first electronic device may display the electronic document list and a detail interface for an unread electronic document (for example, the latest unread electronic document) on the first electronic device and another electronic device (for example, the second electronic device) in a distributed collaborative manner. Specifically, when the first electronic device displays the electronic document list, the first electronic device may display the detail interface for the latest unread electronic document on the second electronic device. According to this solution, a user can conveniently handle different tasks by using a plurality of electronic devices, thereby facilitating a user operation.

In a possible implementation, the processor is specifically configured to execute the instructions, so that the first electronic device searches, in response to the touch operation, for the latest unread electronic document in the at least one unread electronic document, and sends, by using the radio frequency circuit, the detail interface for the latest unread electronic document to the second electronic device for display. In this application, when displaying the electronic document list, the first electronic device may send, in response to a received preset operation (for example, the touch operation between the second electronic device and the first electronic device), the detail interface for the latest unread electronic document to the second electronic device for display, so that the user can conveniently handle different tasks by using a plurality of electronic devices, thereby facilitating a user operation.

In a possible implementation, the electronic document list is any one of the following: an email list, a short message list, or a memo list. In the solutions provided in this application, distributed collaborative display of a listing interface and a detail interface for an electronic document, for example, an email, a short message, or a memo, on different electronic devices is supported, so that a user can conveniently handle different tasks by using a plurality of electronic devices, thereby facilitating a user operation.

In a possible implementation, the processor is specifically configured to execute the instructions, so that the first electronic device determines, according to a second operation of the user, that the second electronic device is the secondary device of the first electronic device, where the second operation is a selection operation of the user on a prompt box; and the prompt box is displayed by the first electronic device on a display of the first electronic device in response to the touch operation, and the prompt box is used by the user to select a primary device and a secondary device. In this application, the first electronic device may determine, based on selection of the user, the second electronic device (that is, the secondary device) used in distributed collaborative display with the first electronic device.

In a possible implementation, the processor is specifically configured to execute the instructions, so that the first electronic device determines, according to a second operation of the user, that the second electronic device is the secondary device of the first electronic device, where the second operation is a selection operation of the user on a prompt box; and the prompt box is displayed by the first electronic device on a display of the first electronic device in response to a drag operation of the user on a draggable icon, the prompt box is used by the user to select a primary device and a secondary device, and the draggable icon is displayed by the first electronic device on the display of the first electronic device in response to the touch operation. In this application, the first electronic device may determine, based on selection of the user, the second electronic device (that is, the secondary device) used in distributed collaborative display with the first electronic device.

In a possible implementation, the processor is specifically configured to execute the instructions, so that the first electronic device determines, based on motion data of the first electronic device, that the second electronic device is the secondary device of the first electronic device, where the motion data of the first electronic device indicates that the first electronic device is stationary or a movement acceleration is less than a preset threshold. In this application, the first electronic device may determine, based on the motion data of the first electronic device, the second electronic device (that is, the secondary device) used in distributed collaborative display with the first electronic device.

According to an eleventh aspect, a first electronic device is provided. The first electronic device includes: a display, configured to display a first interface, where the first interface includes an electronic document list, and the electronic document list includes at least one unread electronic document and at least one read electronic document; a processing unit, configured to: detect, at the first electronic device, a touch operation with the second electronic device, and determine that the second electronic device is a secondary device of the first electronic device; and search for a latest unread electronic document in the at least one unread electronic document, and display a detail interface for the latest unread electronic document on the second electronic device, where the first electronic device continues displaying the electronic document list after the detail interface for the latest unread electronic document is displayed on the second electronic device, and the latest unread electronic document in the electronic document list is marked as read.

According to the solution provided in the eleventh aspect, the first electronic device may display the electronic document list and a detail interface for an unread electronic document (for example, the latest unread electronic document) on the first electronic device and another electronic device (for example, the second electronic device) in a distributed collaborative manner. Specifically, when the first electronic device displays the electronic document list, the first electronic device may display the detail interface for the latest unread electronic document on the second electronic device. According to this solution, a user can conveniently handle different tasks by using a plurality of electronic devices, thereby facilitating a user operation.

In a possible implementation, the first electronic device further includes a transceiver unit; and the processing unit is specifically configured to enable the first electronic device to search, in response to the touch operation, for the latest unread electronic document in the at least one unread electronic document, and send, by using the transceiver unit, the detail interface for the latest unread electronic document to the second electronic device for display. In this application, when displaying the electronic document list, the first electronic device may send, in response to a received preset operation (for example, the touch operation between the second electronic device and the first electronic device), the detail interface for the latest unread electronic document to the second electronic device for display, so that the user can conveniently handle different tasks by using a plurality of electronic devices, thereby facilitating a user operation.

In a possible implementation, the electronic document list is any one of the following: an email list, a short message list, or a memo list. In the solutions provided in this application, distributed collaborative display of a listing interface and a detail interface for an electronic document, for example, an email, a short message, or a memo, on different electronic devices is supported, so that a user can conveniently handle different tasks by using a plurality of electronic devices, thereby facilitating a user operation.

In a possible implementation, the processing unit is specifically configured to enable the first electronic device to determine, according to a second operation of the user, that the second electronic device is the secondary device of the first electronic device, where the second operation is a selection operation of the user on a prompt box; and the prompt box is displayed by the first electronic device on a display of the first electronic device in response to the touch operation, and the prompt box is used by the user to select a primary device and a secondary device. In this application, the first electronic device may determine, based on selection of the user, the second electronic device (that is, the secondary device) used in distributed collaborative display with the first electronic device.

In a possible implementation, the processing unit is specifically configured to enable the first electronic device to determine, according to a second operation of the user, that the second electronic device is the secondary device of the first electronic device, where the second operation is a selection operation of the user on a prompt box; and the prompt box is displayed by the first electronic device on a display of the first electronic device in response to a drag operation of the user on a draggable icon, the prompt box is used by the user to select a primary device and a secondary device, and the draggable icon is displayed by the first electronic device on the display of the first electronic device in response to the touch operation. In this application, the first electronic device may determine, based on selection of the user, the second electronic device (that is, the secondary device) used in distributed collaborative display with the first electronic device.

In a possible implementation, the processing unit is specifically configured to enable the first electronic device to determine, based on motion data of the first electronic device, that the second electronic device is the secondary device of the first electronic device, where the motion data of the first electronic device indicates that the first electronic device is stationary or a movement acceleration is less than a preset threshold. In this application, the first electronic device may determine, based on the motion data of the first electronic device, the second electronic device (that is, the secondary device) used in distributed collaborative display with the first electronic device.

According to a twelfth aspect, a computer-readable storage medium is provided. The computer-readable storage medium stores computer-executable instructions, and when the computer-executable instructions are executed by a processor, the method according to any one of the possible implementations of the first aspect, the fourth aspect, or the eighth aspect is implemented.

According to a thirteenth aspect, a chip system is provided. The chip system includes a processor and a memory, where the memory stores instructions, and when the instructions are executed by the processor, the method according to any one of the possible implementations of the first aspect, the fourth aspect, or the eighth aspect is implemented. The chip system may include a chip, or may include a chip and another discrete component.

According to a fourteenth aspect, a computer program product is provided. When the computer program product runs on a computer, the method according to any one of the possible implementations of the first aspect, the fourth aspect, or the eighth aspect is implemented.

BRIEF DESCRIPTION OF THE DRAWINGS

FIG. 5 is a second example diagram of two application scenarios of distributed interface display according to an embodiment of this application;

FIG. 6 is a third example diagram of two application scenarios of distributed interface display according to an embodiment of this application;

FIG. 9(a) to FIG. 9(c) are an example diagram of three other first operations according to an embodiment of this application;

FIG. 10(a)(1) to FIG. 10(b)(2) are a schematic diagram of a method for an electronic device to determine a primary device and a secondary device according to an embodiment of this application;

FIG. 12(a)(1) to FIG. 12(b)(2) are a schematic diagram of a method for an operation of removing a draggable icon according to an embodiment of this application;

FIG. 14A and FIG. 14B are a second example diagram of distributed interface display according to an embodiment of this application;

FIG. 15A(1) and FIG. 15A(2) are a third example diagram of distributed interface display according to an embodiment of this application;

FIG. 15B(1) and FIG. 15B(2) are a fourth example diagram of distributed interface display according to an embodiment of this application;

FIG. 15C(1) and FIG. 15C(2) are a fifth example diagram of distributed interface display according to an embodiment of this application;

FIG. 16(a) and FIG. 16(b) are a sixth example diagram of distributed interface display according to an embodiment of this application;

FIG. 17(a) and FIG. 17(b) are a seventh example diagram of distributed interface display according to an embodiment of this application;

FIG. 18(a) and FIG. 18(b) are an eighth example diagram of distributed interface display according to an embodiment of this application;

FIG. 19(a) and FIG. 19(b) are a ninth example diagram of distributed interface display according to an embodiment of this application;

FIG. 20(a) and FIG. 20(b) are a tenth example diagram of distributed interface display according to an embodiment of this application;

FIG. 23(a) and FIG. 23(b) are a thirteenth example diagram of distributed interface display according to an embodiment of this application;

FIG. 27A to FIG. 27C are another schematic diagram of withdrawing a distributed interface according to an embodiment of this application;

DETAILED DESCRIPTION OF ILLUSTRATIVE EMBODIMENTS

Technical solutions in embodiments of this application are described below with reference to the accompanying drawings in embodiments of this application. In the descriptions of embodiments of this application, "/" means "or" unless otherwise stated. For example, A/B may represent A or B. In this specification, "and/or" describes only an association relationship between associated objects and represents that three relationships may exist. For example, A and/or B may represent the following three cases: Only A exists, both A and B exist, and only B exists. In addition, in the descriptions of embodiments of this application, "a plurality of" means two or more.

The terms "first" and "second" used below are merely intended for a purpose of description, and shall not be understood as an indication or implication of relative importance or an implicit indication of a quantity of indicated technical features. Therefore, a feature limited by using "first" or "second" may explicitly indicate or implicitly include one or more such features. In the descriptions of embodiments, unless otherwise stated, "a plurality of" means two or more.

An embodiment of this application provides a distributed interface display method. The method can be used to display different content in one interface on different electronic devices in a distributed collaborative manner.

In this application, an electronic device includes one or more displays. For example, the electronic device may be a smartphone, a netbook, a tablet computer, a smart camera, a palmtop computer, a personal digital assistant (PDA), a portable multimedia player (PMP), an augmented reality (AR)/virtual reality (VR) device, a laptop computer, a personal computer (PC), an ultra-mobile personal computer (UMPC), or the like. Alternatively, the electronic device may be an electronic device that includes a display and that is of another type or has another structure. This is not limited in this application.

Figure 1:
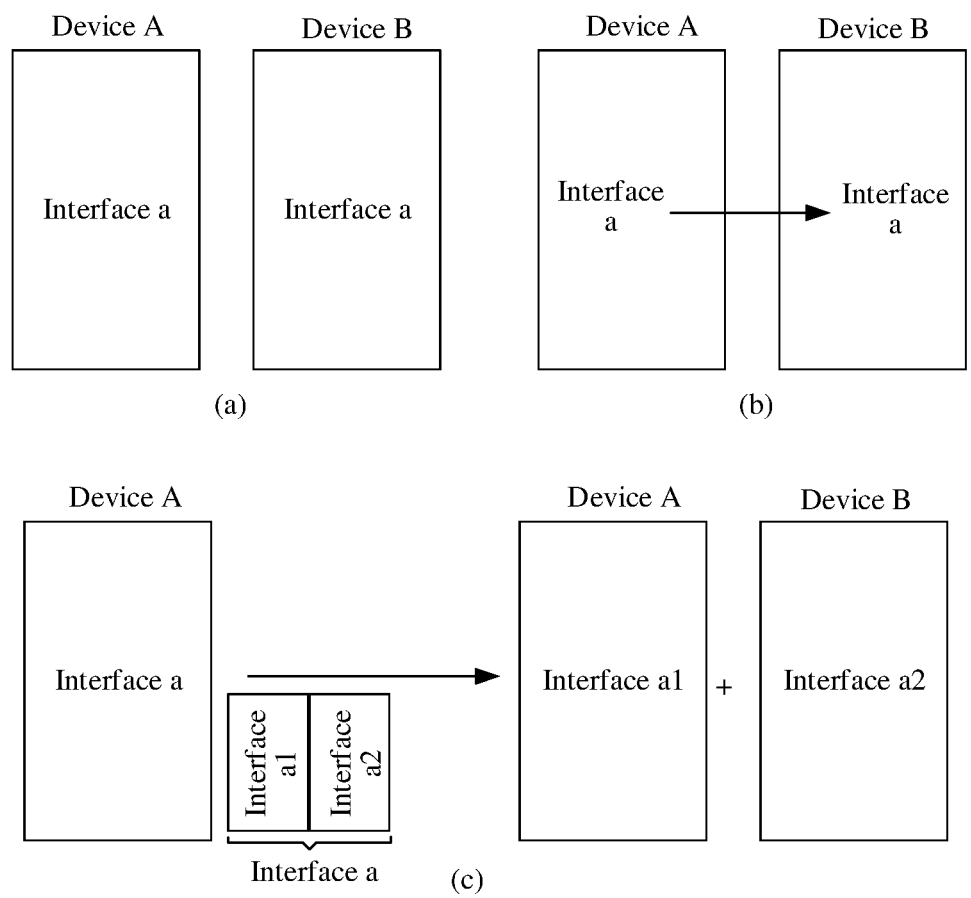
FIG. 1 is a schematic diagram of three multi-device display manners.
Figure 2:
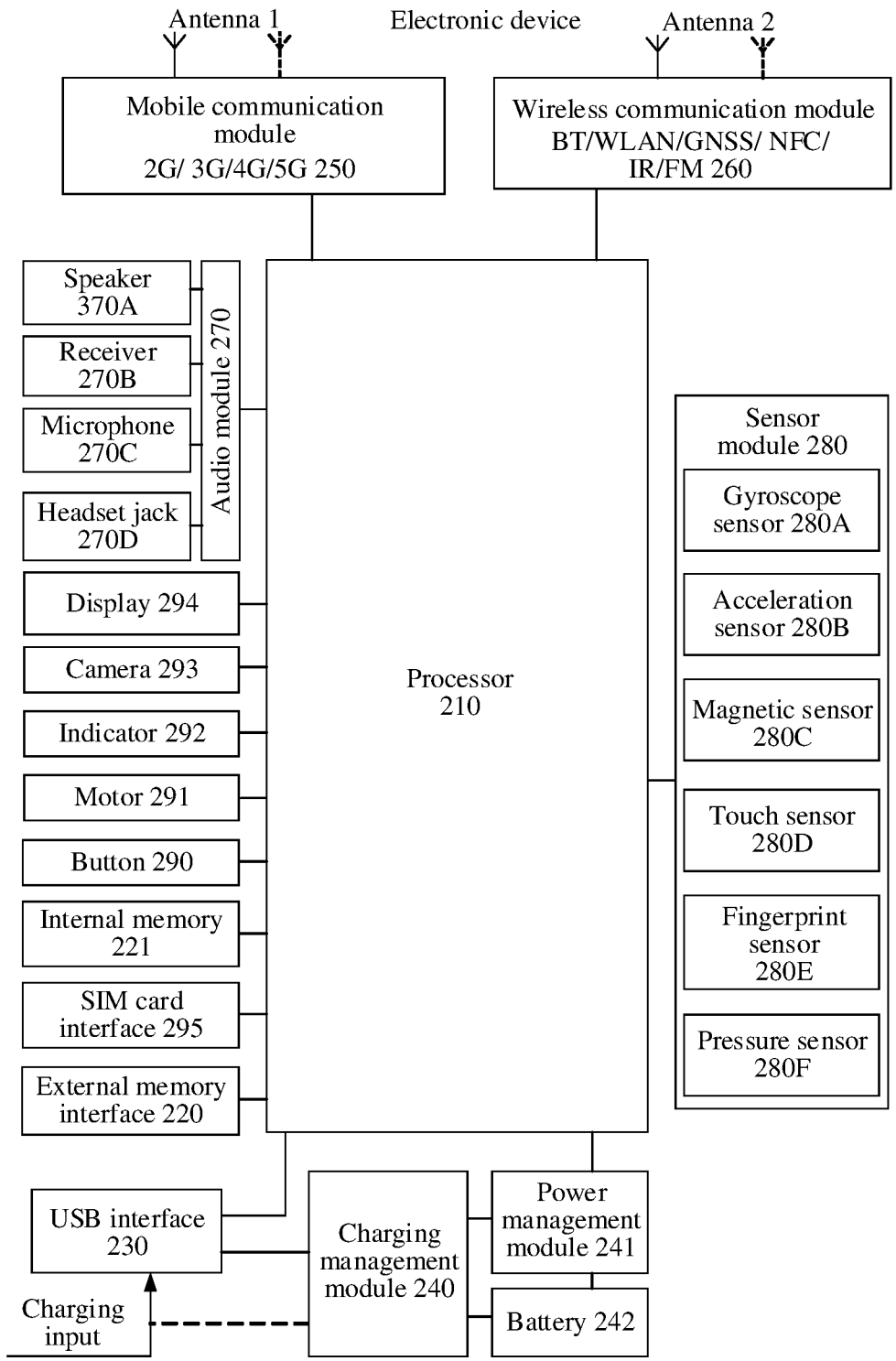
FIG. 2 is a schematic diagram of a hardware structure of an electronic device according to an embodiment of this application.

Refer to FIG. 2. FIG. 2 is a schematic diagram of a hardware structure of an electronic device according to an embodiment of this application by using a smartphone as an example. As shown in FIG. 2, the electronic device may include a processor 210, a memory (including an external memory interface 220 and an internal memory 221), a universal serial bus (USB) interface 230, a charging management module 240, a power management module 241, a battery 242, an antenna 1, an antenna 2, a mobile communication module 250, a wireless communication module 260, an audio module 270, a speaker 270A, a receiver 270B, a microphone 270C, a headset jack 270D, a sensor module 280, a button 290, a motor 291, an indicator 292, a camera 293, a display 294, a subscriber identification module (SIM) card interface 295, and the like. The sensor module 280 may include a gyroscope sensor 280A, an acceleration sensor 280B, a magnetic sensor 280C, a touch sensor 280D, a fingerprint sensor 280E, and a pressure sensor 280F. In some embodiments, the sensor module 280 may further include a barometric pressure sensor, a distance sensor, an optical proximity sensor, a temperature sensor, an ambient light sensor, a bone conduction sensor, and the like.

It can be understood that the structure shown in this embodiment of the present invention does not constitute a specific limitation on the electronic device. In some other embodiments of this application, the electronic device may include more or fewer components than those shown in the figure, or some components may be combined, or some components may be split, or different component arrangements may be used. The components shown in the figure may be implemented by using hardware, software, or a combination of software and hardware.

The processor 210 may include one or more processing units. For example, the processor 210 may include an application processor (AP), a modem processor, a graphics processing unit (GPU), an image signal processor (ISP), a flight controller, a video codec, a digital signal processor (DSP), a baseband processor, and/or a neural-network processing unit (NPU). Different processing units may be independent components, or may be integrated into one or more processors.

A memory may be further disposed in the processor 210, and is configured to store instructions and data. In some embodiments, the memory in the processor 210 is a cache memory. The memory may store instructions or data just used or cyclically used by the processor 210. If the processor 210 needs to use the instructions or the data again, the processor may directly invoke the instructions or the data from the memory. This avoids repeated access, reduces waiting time of the processor 210, and improves system efficiency.

In some embodiments, the processor 210 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The charging management module 240 is configured to receive a charging input from a charger. The charger may be a wireless charger or a wired charger. In some embodiments of wired charging, the charging management module 240 may receive a charging input from a wired charger through the USB interface 230. In some embodiments of wireless charging, the charging management module 240 may receive a wireless charging input through a wireless charging coil of the electronic device. The charging management module 240 may further supply power to the electronic device through the power management module 241 while charging the battery 242.

The power management module 241 is configured to connect the battery 242, the charging management module 240, and the processor 210. The power management module 241 receives an input from the battery 242 and/or the charging management module 240, and supplies power to the processor 210, the internal memory 221, the display 294, the camera 293, the wireless communication module 260, and the like. The power management module 241 may be further configured to monitor parameters such as a battery capacity, a battery cycle count, and a battery health status (electric leakage or impedance). In some embodiments, the power management module 241 may alternatively be disposed in the processor 210. In some other embodiments, the power management module 241 and the charging management module 240 may be alternatively disposed in a same component.

A wireless communication function of the electronic device may be implemented by using the antenna 1, the antenna 2, the mobile communication module 250, the wireless communication module 260, the modem processor, the baseband processor, and the like.

The antenna 1 and the antenna 2 are configured to transmit and receive an electromagnetic wave signal. Each antenna in the electronic device may be configured to cover one or more communication frequency bands. Different antennas may be further multiplexed, to improve antenna utilization. For example, the antenna 1 may be multiplexed as a diversity antenna in a wireless local area network. In some other embodiments, the antenna may be used in combination with a tuning switch.

The mobile communication module 250 may provide a wireless communication solution including 2G/3G/4G/5G that is applied to the electronic device. The mobile communication module 250 may include at least one filter, a switch, a power amplifier, a low noise amplifier (low noise amplifier, LNA), and the like. The mobile communication module 250 may receive an electromagnetic wave through the antenna 1, perform processing, for example, filtering or amplification on the received electromagnetic wave, and transmit the electromagnetic wave to the modem processor for demodulation. The mobile communication module 250 may further amplify a signal modulated by the modem processor, and convert the signal into an electromagnetic wave for radiation through the antenna 1. In some embodiments, at least a part of functional modules of the mobile communication module 250 may be disposed in the processor 210. In some embodiments, at least a part of functional modules of the mobile communication module 250 and at least a part of modules of the processor 210 may be disposed in a same component.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal that is then transferred to the application processor. The application processor outputs a sound signal through an audio device (that is not limited to the speaker 270A, the receiver 270B, and the like), or displays an image or a video by using the display 294. In some embodiments, the modem processor may be an independent component. In some other embodiments, the modem processor may be independent of the processor 210, and is disposed together with the mobile communication module 250 or another functional module in the same device.

The wireless communication module 260 may provide a wireless communication solution that is applied to the electronic device and that includes a wireless local area network (WLAN) (for example, a Wi-Fi network), Bluetooth (BT), a global navigation satellite system (GNSS), frequency modulation (FM), a near field communication (NFC) technology, an infrared (IR) technology, and the like.

The wireless communication module 260 may be one or more components integrating at least one communication processor module. The wireless communication module 260 receives an electromagnetic wave through the antenna 2, performs frequency modulation and filtering on an electromagnetic wave signal, and sends a processed signal to the processor 210. The wireless communication module 260 may further receive a to-be-sent signal from the processor 210, perform frequency modulation and amplification on the signal, and convert the signal into an electromagnetic wave for radiation through the antenna 2.

In some embodiments, the antenna 1 and the mobile communication module 250 in the electronic device are coupled, and the antenna 2 and the wireless communication module 260 in the electronic device are coupled, so that the electronic device can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The electronic device may implement a display function by using the GPU, the display 294, the application processor, and the like. The GPU is a microprocessor for image processing, and is connected to the display 294 and the application processor. The GPU is configured to: perform mathematical and geometric calculation, and render an image. The processor 210 may include one or more GPUs that execute program instructions to generate or change display information.

The display 294 is configured to display an image, a video, or the like. The display 294 includes a display panel. The display panel may use a liquid crystal display (LCD), an organic light-emitting diode (OLED), an active-matrix organic light-emitting diode (AMOLED), a flexible light-emitting diode (FLED), a mini-LED, a micro-LED, a micro-OLED, a quantum dot light-emitting diode (QLED), and the like. In some embodiments, the electronic device may include one or N displays 294, and N is a positive integer greater than 1.

The electronic device can implement a photographing function by using the ISP, the camera 293, the video codec, the GPU, the display 294, the application processor, and the like.

The external memory interface 220 may be used to connect to an external storage card, for example, a micro SD card, to extend a storage capability of the electronic device. The external storage card communicates with the processor 210 through the external memory interface 220, to implement a data storage function. For example, files such as music and a video are stored in the external storage card.

The internal memory 221 may be configured to store computer-executable program code. The executable program code includes instructions. The internal memory 221 may include a program storage area and a data storage area. The program storage area may store an operating system, an application required for at least one function (for example, a sound playback function or an image play function), and the like. The data storage area may store data (for example, audio data and an address book) and the like that are created during use of the electronic device. In addition, the internal memory 221 may include a high-speed random access memory, and may further include a non-volatile memory, for example, at least one magnetic disk storage device, a flash memory device, or a universal flash storage (UFS). The processor 210 runs instructions stored in the internal memory 221 and/or instructions stored in the memory disposed in the processor, to perform various functional applications and data processing of a portable device.

The gyroscope sensor 280A may be configured to determine a posture of the electronic device in motion. In some embodiments, an angular velocity of the electronic device in a preset coordinate system may be determined by using the gyroscope sensor 280A.

The acceleration sensor 280B may detect a movement direction and a movement acceleration of the electronic device. When the electronic device is stationary, a magnitude and a direction of gravity may be detected. The acceleration sensor 280B may be further configured to identify a posture of the electronic device, and is used in a pedometer or another application.

The magnetic sensor 280C is a component configured to convert a magnetic performance change of a sensitive element caused by external factors, such as a magnetic field, an electric current, stress-strain, a temperature, and lights, into an electrical signal, to detect a corresponding physical quantity in this manner. In some embodiments, included angles between the electronic device and four directions, east, south, west, and north, may be measured by using the magnetic sensor.

The touch sensor 280D may also be referred to as a "touch panel". The touch sensor 280D may be disposed on the display 294. The touch sensor 280D and the display 294 form a touchscreen, which is also referred to as a "touch screen". The touch sensor 280D is configured to detect a touch operation performed on or near the touch sensor. The touch sensor 280D may transfer a detected touch operation to the application processor to determine a type of a touch event. A visual output and the like related to the touch operation may be provided by the electronic device through the display 294. In some other embodiments, the touch sensor 280D may alternatively be disposed on a surface of the electronic device at a position different from that of the display 294.

The fingerprint sensor 280E is configured to collect a fingerprint. The electronic device may use a feature of the collected fingerprint to implement fingerprint-based unlocking, application lock access, fingerprint-based photographing, fingerprint-based call answering, and the like.

The pressure sensor 280F is configured to: sense a pressure signal, and convert the pressure signal into an electrical signal. For example, the pressure sensor 280F may be disposed on the display 294. Touch operations that are performed at a same touch position but have different touch operation intensity may correspond to different operation instructions.

The electronic device may implement an audio function, for example, music playback and recording, by using the audio module 270, the speaker 270A, the receiver 270B, the microphone 270C, the application processor, and the like. For specific operating principles and functions of the audio module 270, the speaker 270A, the receiver 270B, and the microphone 270C, refer to descriptions in a conventional technology.

The button 290 includes a power button, a volume button, and the like. The button 290 may be a mechanical button, or may be a touch button. The electronic device may receive a button input, and generate a button signal input related to user settings and function control of the electronic device.

The motor 291 may generate a vibration prompt. The motor 291 may be configured to produce an incoming call vibration prompt, and may be configured to provide touch vibration feedback. For example, touch operations performed for different applications (for example, photographing and audio playback) may correspond to different vibration feedback effects. For touch operations performed on different areas of the display 294, the motor 291 may also correspond to different vibration feedback effects. Different application scenarios (for example, a time reminder, information receiving, an alarm clock, and a game) may also correspond to different vibration feedback effects. A touch vibration feedback effect may be further customized.

The indicator 292 may be an indicator light, may be configured to indicate a charging status and a power change, and may be configured to indicate a message, a missed call, a notification, and the like.

The SIM card interface 295 is used to connect a SIM card. The SIM card may be inserted into the SIM card interface 295 or removed from the SIM card interface 295, to implement contact with or separation from the electronic device. The electronic device may support one or N SIM card interfaces, and N is a positive integer greater than 1. The SIM card interface 295 may support a nano-SIM card, a micro-SIM card, a SIM card, and the like. A plurality of cards may be inserted into a same SIM card interface 295 at the same time. The plurality of cards may be of a same type or of different types. The SIM card interface 295 is compatible with different types of SIM cards. The SIM card interface 295 is also compatible with an external storage card. The electronic device interacts with a network by using the SIM card, to implement functions such as calling and data communication. In some embodiments, the electronic device uses an eSIM, that is, an embedded SIM card. The eSIM card may be embedded into the electronic device, and cannot be separated from the electronic device.

It should be noted that the hardware modules included in the electronic device shown in FIG. 2 is merely described as an example, and does not limit a specific structure of the electronic device. For example, the electronic device may further include another functional module.

In this application, an operating system of the electronic device may include, but is not limited to, Symbian®, Android®, Windows®, Apple® (iOS), Blackberry®, Harmony, and another operating system. This is not limited in this application.

Figure 3:
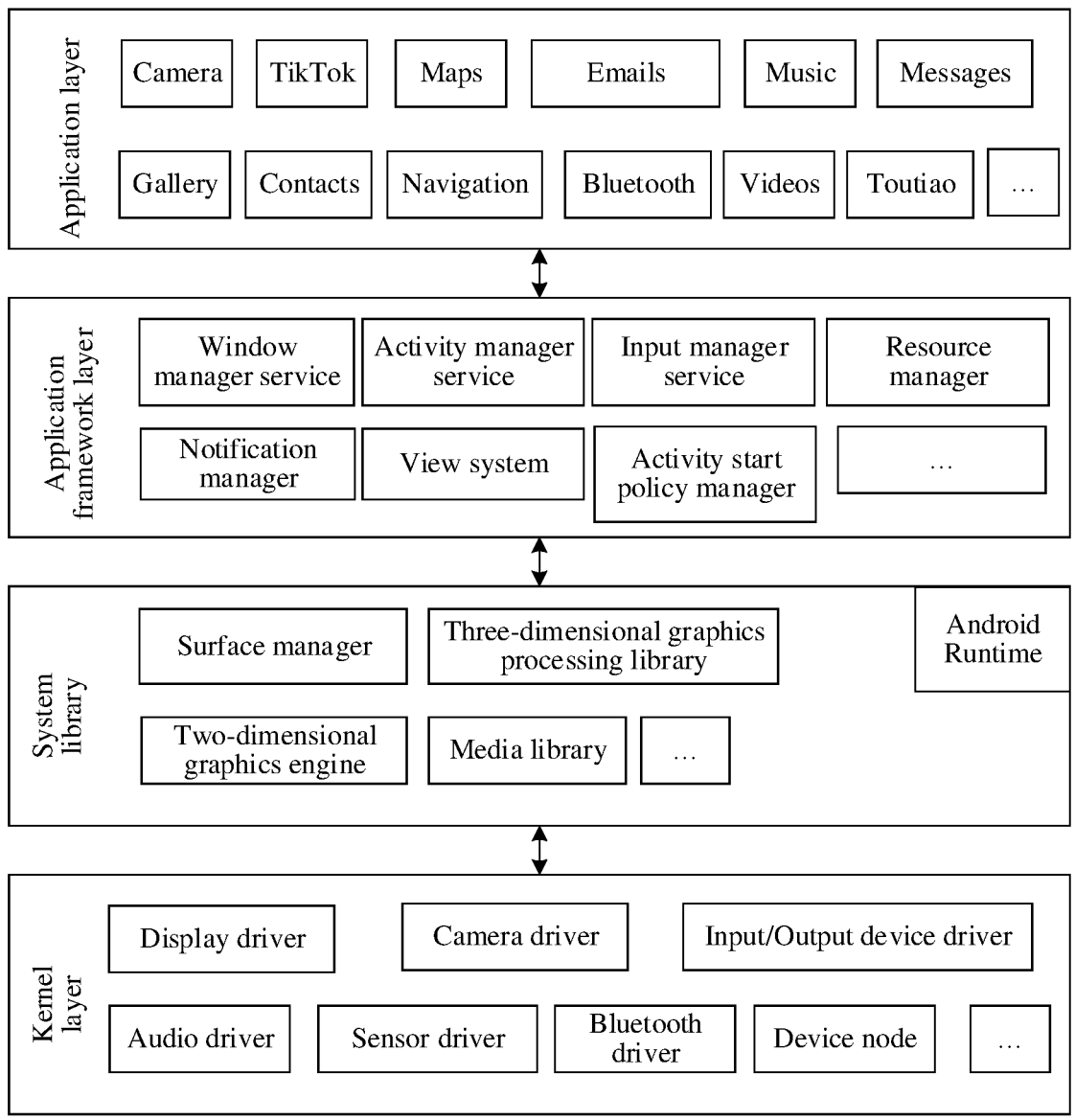
FIG. 3 is a schematic diagram of a software structure of an electronic device according to an embodiment of this application.

Refer to FIG. 3. FIG. 3 is a schematic diagram of a software structure of an electronic device according to an embodiment of this application by using an Android operating system as an example.

As shown in FIG. 3, the Android operating system may include an application layer, an application framework (FWK) layer, a system library and Android Runtime, and a kernel layer.

The application layer may provide some core applications. For ease of description, an application program is referred to as an application for short below. An application in the application layer may include a native application (for example, an application installed on the electronic device when an operating system is installed before the electronic device is delivered from a factory), for example, Camera, Maps, Music, Messages, Gallery, Contacts, and Bluetooth shown in FIG. 3. An application in the application layer may further include a third-party application (for example, an application downloaded and installed by a user from the App Store), for example, TikTok, Emails, Toutiao, and Videos shown in FIG. 3.

The application framework layer provides an application programming interface (API) and a programming framework for an application in the application layer. The application framework layer includes some predefined functions.

The application framework layer provides an application programming interface (API) and a programming framework to an application in the application layer. As shown in FIG. 3, the application framework layer may include a window manager service (VMS), an activity manager service (AMS), and an input manager service (IMS). In some embodiments, the application framework layer may further include a content provider, a view system, a phone manager, a resource manager, a notification manager, and the like (not shown in FIG. 3).

As shown in FIG. 3, the application framework layer may include the window manager service (VMS), the activity manager service (AMS), the input manager service (IMS), the content provider, the view system, the phone manager, the resource manager, the notification manager, and the like.

The window manager service is used to manage a window program. The window manager service may obtain a size of a display, determine whether there is a status bar, lock the screen, take a screenshot, and the like.

The activity manager service (AMS) is used to manage an activity, and is responsible for starting, switching, and scheduling each component in the system, managing and scheduling an application, and the like.

The input manager service (IMS) may be used to perform processing, for example, translating and encapsulating an original input event, to obtain an input event including more information; and send the input event to the window manager service. The window manager service stores a clickable area (for example, a control) of each application, position information of a focus window, and the like. Therefore, the window manager service can distribute the input event to a specified control or focus window correctly.

The content provider is used to store and obtain data, and enable the data to be accessed by an application. The data may include a video, an image, audio, outgoing and incoming calls, browsing history and bookmarks, an address book, and the like.

The view system includes a visual control, for example, a control for displaying a text and a control for displaying a picture. The view system may be used to construct an application. A display interface may include one or more views. For example, a display interface including a notification icon of Messages may include a text display view and a picture display view.

The phone manager is used to provide a communication function of the electronic device, for example, management of a call status (including answering, hanging up, and the like).

The resource manager provides, to an application, various resources, such as a localized character string, an icon, a picture, a layout file, and a video file.

The notification manager enables an application to display notification information in the status bar, and may be used to transmit a notification-type message. The displayed information may automatically disappear after a short pause without user interaction. For example, the notification manager is used to notify download completion, provide a message notification, and the like. The notification manager may alternatively be a notification that appears in a status bar atop the system in a form of a graph or a scroll bar text, for example, a notification of an application running in the background, or may be a notification that appears on the screen in a form of a dialog window. For example, text information is prompted in the status bar, a prompt tone is played, the electronic device vibrates, or the indicator light blinks.

The system library and Android Runtime include performance functions that need to be invoked by the FWK, an Android core library, and an Android virtual machine. The system library may include a plurality of functional modules, for example, a browser kernel, three-dimensional (3D) graphics, and a font library.

The system library may include a plurality of functional modules, for example, a surface manager, a media library, a three-dimensional graphics processing library (for example, OpenGL ES), and a 2D graphics engine (for example, SGL)

The surface manager is used to manage a display subsystem and provide fusion of 2D and 3D layers for a plurality of applications.

The media library supports playback and recording of a plurality of commonly used audio and video formats, static image files, and the like. The media library may support a plurality of audio and video encoding formats, for example, MPEG-4, H.264, MP3, AAC, AMR, JPG, and PNG.

The three-dimensional graphics processing library is used to implement three-dimensional graphics drawing, image rendering, composition, layer processing, and the like.

The 2D graphics engine is a drawing engine for 2D drawing.

The kernel layer is the basis of the Android operating system. Final functions of the Android operating system are implemented in the kernel layer. The kernel layer may include a display driver, an input/output device driver (for example, a keyboard, a touchscreen, a headset, a speaker, or a microphone), a device node, a Bluetooth driver, a camera driver, an audio driver, a sensor driver, and the like. A user performs an input operation by using the input device, and the kernel layer may generate a corresponding original input event according to the input operation, and store the input event in the device node.

As described above, it can be understood that conventional multi-device display may implement mirror display, transfer display, or extended display in a tiled manner. For example, based on a Sidecar (Sidecar) function of the macOS, a display of an iPad may be used as an extended screen of a Mac to implement mirror display (that is, the iPad mirrors an interface displayed on the macOS device), transfer display (that is, an interface displayed on the macOS device is transferred to the iPad), or extended display in a tiled manner (that is, an interface displayed on the macOS device is extended by using the iPad in a tiled manner). Simply speaking, the Sidecar function enables the iPad to become an external display of the Mac. In a process of implementing the Sidecar function, the iPad and the Mac need to have a wireless connection in a same network environment, or have a connection by using a USB-C data cable.

However, none of mirror display, transfer display, and extended display in a tiled manner relates to distributed display of different content in an interface. For example, extended display described above may tile a plurality of devices for displaying a same interface, but still cannot implement distributed collaborative display of and collaborative operations on different content in a same interface on different devices. However, in some scenarios, distributed collaborative display of and collaborative operations on different content in one interface can usually bring great convenience to a user and are very important for providing better user experience.

For example, refer to FIG. 4(*a*) and FIG. 4(*b*). FIG. 4(*a*) and FIG. 4(*b*) are an example diagram of two application scenarios of distributed interface according to an embodiment of this application. As shown in FIG. 4(*a*), in an electronic classroom, an electronic device simultaneously displays a live video showing a teacher, an electronic lecture note, and a class communication group interface. In some scenarios, as shown in FIG. 4(*a*), the electronic device may further display a memo of a student. During live streaming of the electronic classroom, the student may refer to content in the electronic lecture note when watching the live video showing the teacher. In some scenarios, the student may take in-class notes such as knowledge and questions in the memo conveniently. In some scenarios, the student may view a message, for example, information related to a notice or a question, from the teacher or another student in the class communication group interface.

In the multi-task interfaces shown in FIG. 4(*a*), the teacher needs to switch between a plurality of task interfaces on a same electronic device, to complete live video streaming, electronic lecture note presentation or annotation, group message sending, and the like. Students also need to switch between a plurality of task interfaces on a same electronic device to complete live video viewing, electronic lecture note viewing or annotation, group message checking or sending, in-class note taking, and the like. If a plurality of task interfaces are displayed on one display, task interfaces (for example, a group message interface and a memo interface) are not completely displayed. In addition, switching between the multi-task interfaces is a complex operation for a user (for example, a teacher or a student).

In addition, to facilitate clear display of the plurality of task interfaces and provide convenience for the user to view, the plurality of task interfaces are usually displayed on a larger-screen device (for example, a computer). However, because the user (for example, the teacher or the student) needs to control the larger-screen device (for example, the computer) at any time, a relatively close distance from the larger-screen device needs to be maintained. If the user stays close to the larger-screen device for a long time, eyesight of the user is affected.

Further, as shown in FIG. 4(*b*), an electronic device simultaneously displays a memo interface and a short message interface on split screens. The user may use the electronic device to process a memo-related task and a short message-related task simultaneously. However, on some smaller-screen devices, such as a smartphone, in the multi-task interfaces shown in FIG. 4(*b*), display areas for the memo interface and the short message interface are small, and screen areas that can be used by the user to process the memo-related task and the short message-related task are also small, greatly affecting efficiency of the user of processing the memo-related task and the short message-related task, and affecting eyesight of the user.

Further, as shown in (a) in FIG. 5, an electronic device displays a video play interface. The video play interface includes a video play box, a video episode selection area, a quick processing area (used for commenting, adding to favorites, downloading, or sharing), an area for more videos, and the like. A user may perform another operation related to the video play interface while watching a video in the video play box on the electronic device, for example, posting a comment or browsing through more videos. However, on some smaller-screen devices, such as a smartphone, in the multi-task interfaces shown in (a) in FIG. 5, if the user posts a comment or browses through more videos, the user cannot maximize the video play box. If the video play box cannot be maximized, user experience of watching videos is greatly affected.

Further, as shown in (b) in FIG. 5, the electronic device displays a short video interface of TikTok. The short video interface of TikTok includes a video play box and a comment area. As shown in (b) in FIG. 5, when the user posts a comment in the comment area, the application TikTok invokes an input keyboard. The input keyboard is displayed in the short video interface in a floating or overlapping manner. The user may input a comment by using the input keyboard while watching a short video and browsing through comments on the electronic device. However, the input keyboard displayed in the floating or overlapping manner blocks most of the comment area. As a result, user experience of browsing through comments is affected.

Further, as shown in (a) in FIG. 6, an electronic device displays a picture list, and the picture list includes thumbnails of a plurality of pictures. A user may select a picture from the picture list to enter a detail interface for the selected picture and browse through details of the picture. However, operations in the foregoing method for viewing a detail interface for a picture are complex. The user needs to select pictures one by one, view a detail interface for a picture, return to the picture list, select another picture to enter a detail interface for the picture, and so on. In addition, the foregoing method for viewing a detail interface for a picture affects efficiency of the user of viewing a detail interface for a picture.

Further, as shown in (b) in FIG. 6, the electronic device displays an email list, and the email list includes a thumbnail list of a plurality of emails (including unread emails and/or read emails). A user may select an email from the email list to enter a detail interface for the selected email to browse through details of the email. However, operations in the foregoing method for viewing a detail interface for an email is complex. The user needs to select emails one by one, process an email in a detail interface for the email, return to the email list, and select another email to enter a detail interface for the email, and so on. In addition, the foregoing method for viewing a detail interface for an email affects efficiency of the user of processing an email in a detail interface.

Based on the foregoing considerations, this application provides a distributed interface display method. A distributed interface display method provided in this application is specifically used to display content displayed on a first electronic device on a plurality of different electronic devices (for example, the first electronic device and a second electronic device) in a distributed collaborative manner. The user can conveniently handle different tasks by using the plurality of electronic devices, thereby facilitating a user operation.

For example, the interface is a first interface. The first interface may be an interface of any application. For example, the first interface is an interface of an application (that is, a native application) installed on the first electronic device when an operating system is installed before the first electronic device is delivered from a factory, for example, an interface of Messages, Contacts, or Gallery shown in FIG. 3. For another example, the first interface is an interface of an application (that is, a third-party application) downloaded and installed by the user from the App Store, for example, an interface of TikTok®, Emails, Toutiao®, or Videos shown in FIG. 3. A specific application corresponding to the first interface and specific content displayed in the interface are not limited in this application. In some embodiments, the first electronic device may display, on the second electronic device, in a distributed collaborative manner, a part of content in the first interface in response to an operation (for example, a first operation) of the user for triggering distributed collaborative display. For example, the first electronic device displays the video episode selection area, the quick processing area (used for commenting, adding to favorites, downloading, or sharing), and the area for more video shown in (a) in FIG. 5; and the second electronic device displays the video play box shown in (a) in FIG. 5. For another example, the first electronic device displays the video play box and the comment area shown in (b) in FIG. 5; and the second electronic device displays the input keyboard shown in (b) in FIG. 5.

Further, in some embodiments, the first interface may include a plurality of task interfaces. In some embodiments, the first electronic device may display, on the second electronic device, in a distributed collaborative manner, the plurality of task interfaces in response to an operation (for example, a first operation) of the user for triggering distributed collaborative display. For example, the first electronic device displays a first interface of a first application, where the first interface includes at least a first function area and a second function area. Content in the first function area is a first task interface, and content in the second function area is a second task interface. The first electronic device may send the first task interface in the first function area to the second electronic device for display. After the first electronic device may send the first task interface in the first function area to the second electronic device for display, the first electronic device displays a second interface of the first application, where the second interface includes the second function area but does not include the first function area. For example, the first electronic device displays the live video shown in FIG. 4(*a*); and the second electronic device displays the electronic lecture note, the class communication group interface, and the memo shown in FIG. 4(*a*). For another example, the first electronic device displays the memo interface shown in FIG. 4(*b*); and the second electronic device displays the short message interface shown in FIG. 4(*b*).

It should be noted that the first electronic device and the second electronic device in this application may be electronic devices that include a display and that are of any type or have any structure. For example, the first electronic device and the second electronic device may be smartphones, netbooks, tablet computers, smart cameras, palmtop computers, PDAs, PMPs, AR/VR devices, laptop computers, PCs, UMPCs, or the like described above. This is not limited in this application.

In addition, in this application, the first electronic device and the second electronic device may be a same type of electronic devices. For example, the first electronic device is a smartphone 1, and the second electronic device is a smartphone 2. The first electronic device and the second electronic device may alternatively be different types of electronic devices. For example, the first electronic device is a smartphone, and the second electronic device is a tablet computer.

In addition, it should be noted that, in this application, a quantity n of electronic devices for distributed collaborative display is greater than or equal to 2, where n is an integer. For example, that n=2 indicates that different content in one interface displayed on the first electronic device is displayed on the first electronic device and the second electronic device in a distributed collaborative manner, that is, on two electronic devices in total. For another example, that n=3 indicates that different content on one interface displayed on the first electronic device is displayed on the first electronic device and two second electronic devices in a distributed collaborative manner, that is, on three electronic devices in total.

With reference to the accompanying drawings, a distributed interface display method provided in an embodiment of this application is described in detail below.

In this embodiment of this application, a first interface may include a plurality of function areas (for example, include a first function area and a second function area). Content in different function areas is used to implement different functions. A first electronic device may also be referred to as a primary device. The primary device may transfer one or more of a plurality of task interfaces displayed on the primary device to a device in one or more other devices. For example, a task interface in one or more function areas is transferred to a second electronic device for display. With the primary device, there is a secondary device (that is, the second electronic device).

As shown in (a) in FIG. 5, the video play interface (that is, the first interface) includes a function area for playing a video, that is, the video play box, and further includes a function area for commenting, adding to favorites, downloading, sharing, or the like, that is, the video episode selection area and the quick processing area. For another example, as shown in (b) in FIG. 5, the short video interface (that is, the first interface) of TikTok includes a function area for playing a video, that is, the video play box, and further includes a function area for commenting, that is, the comment area. When the user posts a comment in the comment area, the short video interface (that is, the first interface) of TikTok further includes a function area for inputting a comment, that is, the input keyboard.

For another example, the first interface may include a plurality of application interfaces or a plurality of mini program interfaces, as shown in FIG. 4(*a*) or FIG. 4(*b*). The plurality of application interfaces may include task interfaces of a plurality of applications, or may include different task interfaces of a same application. The plurality of mini program interfaces may include task interfaces of a plurality of mini programs, or may include different task interfaces of a same mini program. A specific source of a plurality of task interfaces displayed on the first electronic device is not limited in this application.

In some embodiments, the plurality of task interfaces displayed on the first electronic device may be interfaces of different applications. For example, the plurality of task interfaces may be interfaces of any plurality of applications installed on the first electronic device.

In some other embodiments, the plurality of task interfaces displayed on the first electronic device may be interfaces of a same application. It can be understood that the same application may include different application interfaces at different levels. The different levels may have a hierarchical relationship, or may not have any hierarchical relationship. An interface may invoke a next-level interface for the interface in response to an operation of the user on the interface. Therefore, the plurality of task interfaces displayed on the first electronic device may be application interfaces at a same level or different levels of the same application. For example, two application interfaces are displayed on the first electronic device, one is a WeChat® Moments interface, and the other is an Official Accounts interface.

In some other embodiments, the plurality of task interfaces displayed on the first electronic device may be mini program interfaces, for example, mini program interfaces of an application (for example, WeChat® or Alipay®).

The plurality of task interfaces in this embodiment of this application may be displayed in a same window, or may be separately displayed in a plurality of windows. This is not limited in this application.

Figure 4A:
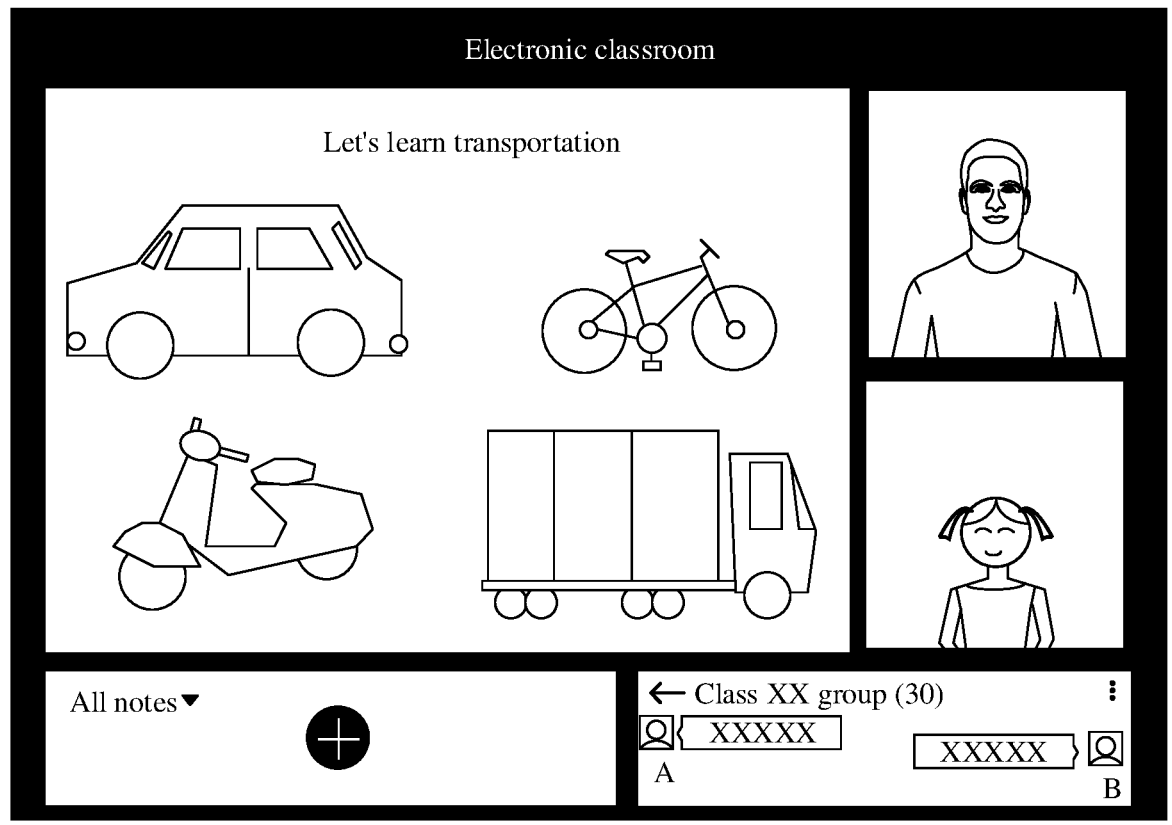
FIG. 4(a) and FIG. 4(b) are a first example diagram of two application scenarios of distributed interface display according to an embodiment of this application.

In some embodiments, the plurality of task interfaces in this embodiment of this application may be displayed in one window. For example, if the plurality of task interfaces in this embodiment of this application are a combination of a plurality of mini program interfaces, the plurality of task interfaces may be displayed in one window. As shown in FIG. 4(a), a live video interface, an electronic lecture note interface, a class communication group interface, and a memo interface are displayed in one application (the electronic classroom application shown in FIG. 4(a)) window.

Figure 4B:
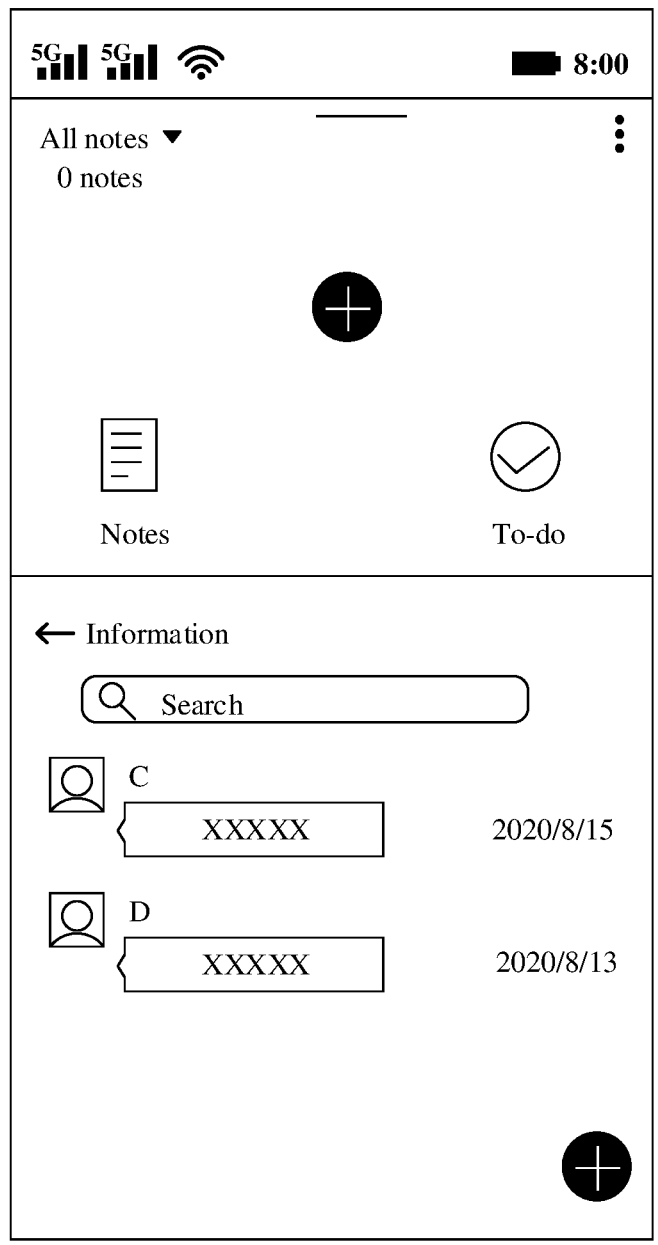

In some other embodiments, the plurality of task interfaces in this embodiment of this application may be separately displayed in a plurality of windows. For example, if the plurality of task interfaces in this embodiment of this application include a plurality of application interfaces, the plurality of task interfaces may be displayed in a plurality of windows. As shown in FIG. 4(b), the memo interface is displayed in a memo application window, and the short message interface is displayed in a short message application window.

In some embodiments, a plurality of task interfaces in a plurality of function areas (for example, the first function area and the second function area) of the first interface may be laid out on a display of the first electronic device according to a preset relative position relationship. For example, a plurality of framework templates are preset on the first electronic device, and the plurality of framework templates are used to specify a quantity of function areas, a position of each function area, a shape and a size of each function area, and the like; or are used to specify a quantity of task interfaces that can be displayed, a position for displaying each task interface, a shape and a size of each task interface, and the like. This is not limited in this application. The plurality of task interfaces may be laid out on the display of the first electronic device according to an appropriate framework template.

For example, in this embodiment of this application, the first interface may be rendered together, by the first electronic device according to a preset framework template, on a virtual screen of the first electronic device in a form of one or more atomic abilities (atomic ability, AA, also referred to as an atomic service), and sent to the display of the first electronic device for display. For example, the first interface includes the first function area and the second function area. According to the preset framework template, the first electronic device may render first content in a first function area of the virtual screen in a form of one atomic service, render second content in a second function area of the virtual screen in a form of another atomic service, and send the first content and the second content that are rendered together on the virtual screen to the display of the first electronic device for display.

It can be understood that, in this embodiment of this application, a service logic of an application may be decoupled, and divided into atomic abilities that can be used alone on any device. Based on different atomic abilities, cross-device transfer can be implemented with a distributed basic structure. Each atomic ability may implement one program function. In addition, an interface may be opened to developers and directly invoked by the system or another system. In addition, different atomic abilities may support flexible construction to form an interface of an application, for example, the first interface in this embodiment of this application. In some embodiments, the first electronic device may determine, based on a quantity of function areas, functions, and the like, a framework template to be used. For example, if the first interface includes two function areas, the two function areas are displayed by using a framework template for top-bottom split-screen display or left-right split-screen display. For another example, if the first interface includes five function areas, one function area is used to implement a core function, and the remaining four function areas are used to implement non-core functions, the five function areas are displayed by using a framework template of one larger function area plus four smaller function areas.

In some other embodiments, the first electronic device may determine, based on a quantity of task interfaces, attributes, and the like, a framework template to be used. For example, if there are two task interfaces, the two task interfaces are displayed by using the framework template for top-bottom split-screen display or left-right split-screen display, as shown in FIG. 4(b). For another example, if there are five task interfaces, one task interface is a core task interface, and the remaining four task interfaces are non-core task interfaces, the five task interfaces are displayed by using the framework template of one larger interface plus four smaller interfaces shown in FIG. 4(a), as shown in FIG. 4(a).

In this embodiment of this application, when the first electronic device displays the first interface, the first electronic device may transfer a part of content in the first interface to the second electronic device in response to a first operation of the user. For example, one or more task interfaces in the first function area are sent to the second electronic device for display. The first function area is any function area in a function area of the first interface on the first electronic device, for example, a function area selected by the user or a function area autonomously determined by the first electronic device.

In this embodiment of this application, that the first electronic device transfers a part of content in the first interface to the second electronic device may specifically include: The first electronic device sends a standard video stream corresponding to the part of content in the first interface to the second electronic device for display. For example, the first electronic device sends a standard video stream corresponding to content in the one or more function areas to the second electronic device for display. Content in different function areas corresponds to different task interfaces.

In some embodiments, the first operation may include, but is not limited to, a touch operation between the first electronic device and the second electronic device (for example, an operation that the user holds the second electronic device to touch (that is, "tap") the first electronic device), an operation that user "shakes" the first electronic device and the second electronic device at the same time, an operation that the user "shakes" the first electronic device, a preset gesture of the user on the first electronic device, or a preset operation of the user for a physical button on the first electronic device (for example, a preset operation for a power button, a volume-up ("+") button, and a volume-down ("−") button), an operation of the user for a virtual button on the first electronic device (including a tap operation, a double-tap operation, a touch and hold operation, or another operation), an operation that the user selects an option displayed on the display of the first electronic device (including an operation of selecting one or more options), or the like. Alternatively, the first operation may be another preset operation for triggering distributed interface display. A specific form of the operation is not limited in this application.

Figure 7:
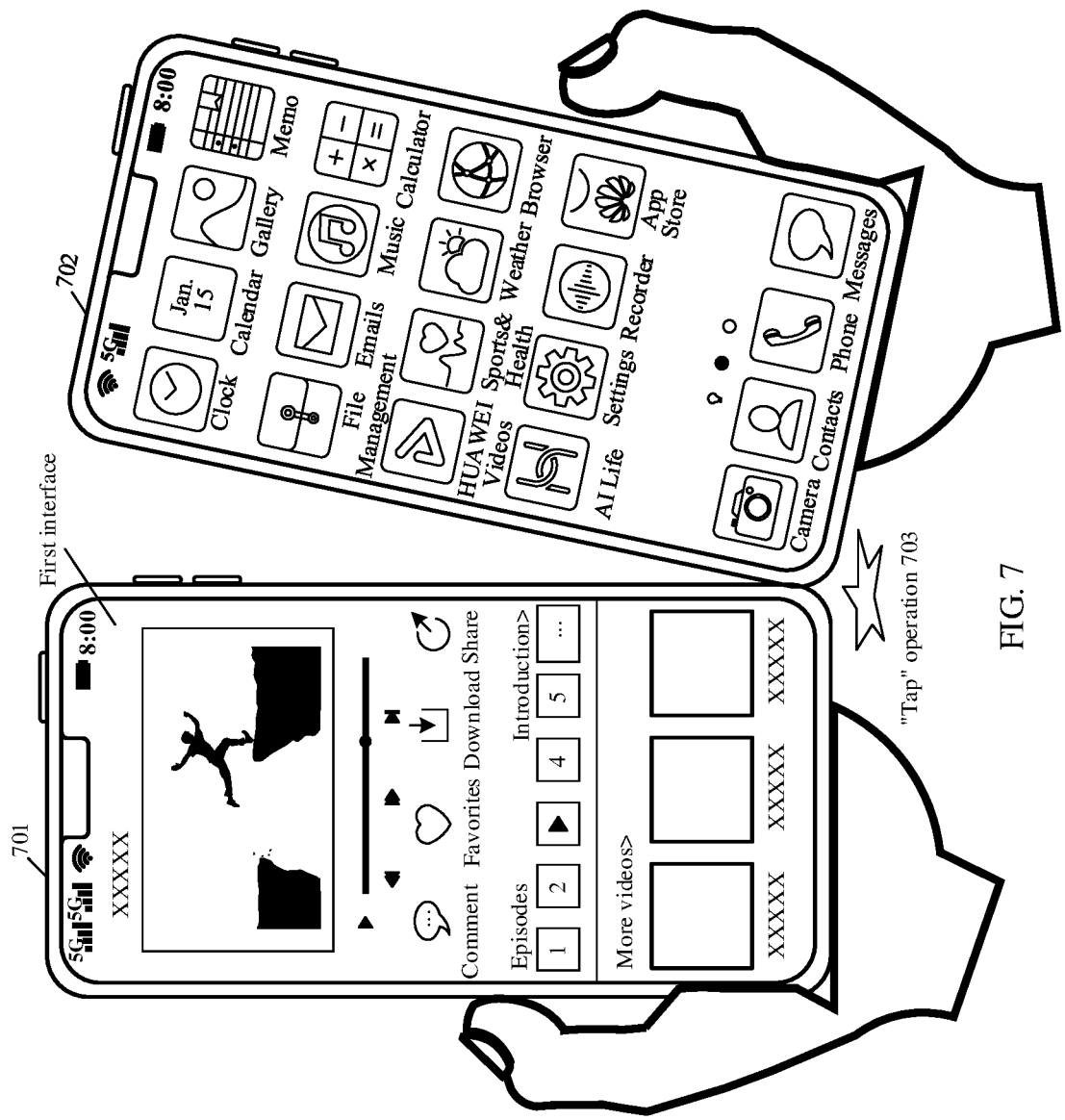
FIG. 7 is an example diagram of a first operation according to an embodiment of this application.

Refer to FIG. 7. FIG. 7 is an example diagram of a first operation according to an embodiment of this application. It is assumed that a smartphone 701 (that is, a first electronic device) displays the first interface shown in (a) in FIG. 5. As shown in FIG. 7, the first operation is an operation 703 that a user holds a smartphone 702 to "tap" the smartphone 701.

It should be noted that a "tap" between one corner of the smartphone 701 and one corner of the smartphone 702 is merely used as an example in FIG. 7. In this embodiment of this application, a "tap" may be performed between any part of the first electronic device and any part of a second electronic device.

In this embodiment of this application, an electronic device (for example, the smartphone 701 or the smartphone 702 shown in FIG. 7) may collect a movement direction, a movement acceleration, and a moving velocity of the electronic device in real time by using an acceleration sensor and/or a gravity sensor, to determine whether a "tap" operation has been performed on the electronic device. For example, if the electronic device suddenly stops moving when moving at a specific velocity, the electronic device infers that the electronic device may have touched another electronic device.

In some other embodiments, the electronic device may collect a direction of rotation, an angular velocity in rotation, an angle of rotation, and the like of the electronic device in real time by using a gyroscope sensor, to determine whether a "tap" operation has been performed on the electronic device. For example, if the electronic device suddenly stops moving when moving at a specific angular velocity in rotation, the electronic device infers that the electronic device may have touched another electronic device.

In some other embodiments, the electronic device may determine, by analyzing audio data collected by using a microphone, whether a "tap" operation has been performed on the electronic device. For example, if audio data received by the microphone satisfies a specific pitch, a specific loudness, and a specific impact timbre, the electronic device infers that the electronic device may have touched another electronic device. For a basis for the electronic device to determine whether a touch operation with another electronic device occurs, refer to a conventional technology. Details are not listed herein.

For another example, FIG. 8(*a*) to FIG. 8(*c*) are an example diagram of three first operations according to an embodiment of this application. It is assumed that a smartphone 701 (that is, a first electronic device) displays a first interface. As shown in FIG. 8(*a*), the first operation is a preset gesture 801 of a user on a touchscreen (that is, a display) of the smartphone 701. As shown in FIG. 8(*b*), the first operation is an operation 802 that a user simultaneously presses a power button and a volume-up ("+") button on the smartphone 701. As shown in FIG. 8(*c*), the first operation is a tap operation 803 (including a tap operation, a double-tap operation, a touch and hold operation, and another operation) of the user on a virtual button in the first interface.

In FIG. 8(*a*), a preset "dash-shaped" gesture of a user on the middle of the touchscreen of the smartphone 701 is used as an example. In this embodiment of this application, a specific track of the preset gesture is not limited. For example, the preset gesture may alternatively be in any shape, for example, "○", "∠", or, "[". A specific form of the gesture is not limited in this embodiment of this application either. For example, the gesture may alternatively be a multi-finger (for example, three-finger) slide gesture. Further, an input position of the preset gesture is not limited in this application either. For example, the preset gesture is still an inward slide of a user from an edge of the touchscreen of the smartphone 701. In addition, in FIG. 8(*b*), that the power button is on a short side atop the screen of the smartphone 701, and the volume-up ("+") button and the volume-down ("−") button are on a long side at the right side of the screen of the smartphone 701 is used as an example, illustrating the first operation that a user presses the power button and the volume-up ("+") button on the smartphone 701 simultaneously. In this embodiment of this application, a specific position of each physical button on the electronic device is not limited. In addition, in FIG. 8(*c*), that the virtual button is displayed in a lower left corner of the touchscreen of the smartphone 701 is used an example. In this embodiment of this application, the virtual button may alternatively be displayed in any other position on the touchscreen. This is not limited in this application.

For another example, showing an example of a multi-task scenario of the electronic classroom shown in FIG. 4(*a*), FIG. 9(*a*) to FIG. 9(*c*) are an example diagram of three other first operations according to an embodiment of this application.

As shown in FIG. 9(*a*), a display of a first electronic device displays a virtual button 901 for triggering distributed multi-task display. In response to an operation that a user taps the virtual button 901, the first electronic device triggers distributed multi-task display, and transfers one or more of a plurality of task interfaces displayed on the display to a second electronic device.

As shown in FIG. 9(*b*)(1) and FIG. 9(*b*)(2), a display of a first electronic device displays a virtual button 901 for triggering distributed multi-task display. The first electronic device displays an option box 902 in response to the operation that the user taps the virtual button 901. As shown in FIG. 9(*b*)(2), the option box 902 includes a second electronic device list for the user to select a second electronic device that is needed for distributed display with the first electronic device, for example, "My smartphone", "My tablet computer", and "My television" as shown in FIG. 9(*b*)(2). In response to an operation that the user selects the second electronic device (for example, "My tablet computer") from the second electronic device list, the first electronic device triggers distributed multi-task display, and transfers the one or more of the plurality of task interfaces displayed on the display to the second electronic device (for example, "My tablet computer") that is selected by the user.

Further, as shown in FIG. 9(*c*), the display of the first electronic device displays the option box 902 for triggering distributed multi-task display. As shown in FIG. 9(*b*)(2), the option box 902 includes a second electronic device list for the user to select a second electronic device that is needed for distributed display with the first electronic device, for example, "My smartphone", "My tablet computer", and "My television" as shown in FIG. 9(*b*)(2). In response to an operation that the user selects the second electronic device (for example, "My tablet computer") from the second electronic device list, the first electronic device triggers distributed multi-task display, and transfers the one or more of the plurality of task interfaces displayed on the display to the second electronic device (for example, "My tablet computer") that is selected by the user.

In some examples, as shown in FIG. 9(*b*)(1) to FIG. 9(*c*), the option box 902 may further display an option of a multi-device display manner, for example, mirror display, transfer display, or distributed collaborative display. In response to an operation of the user of tapping and confirming an option after the operation that the user selects the second electronic device (for example, "My tablet computer") from the second electronic device list and an operation that the user selects collaborative multi-task display, the first electronic device triggers distributed collaborative multi-task display, and transfers the one or more of the plurality of task interfaces displayed on the display to the second electronic device (for example, "My tablet computer") that is selected by the user.

Figure 9C:
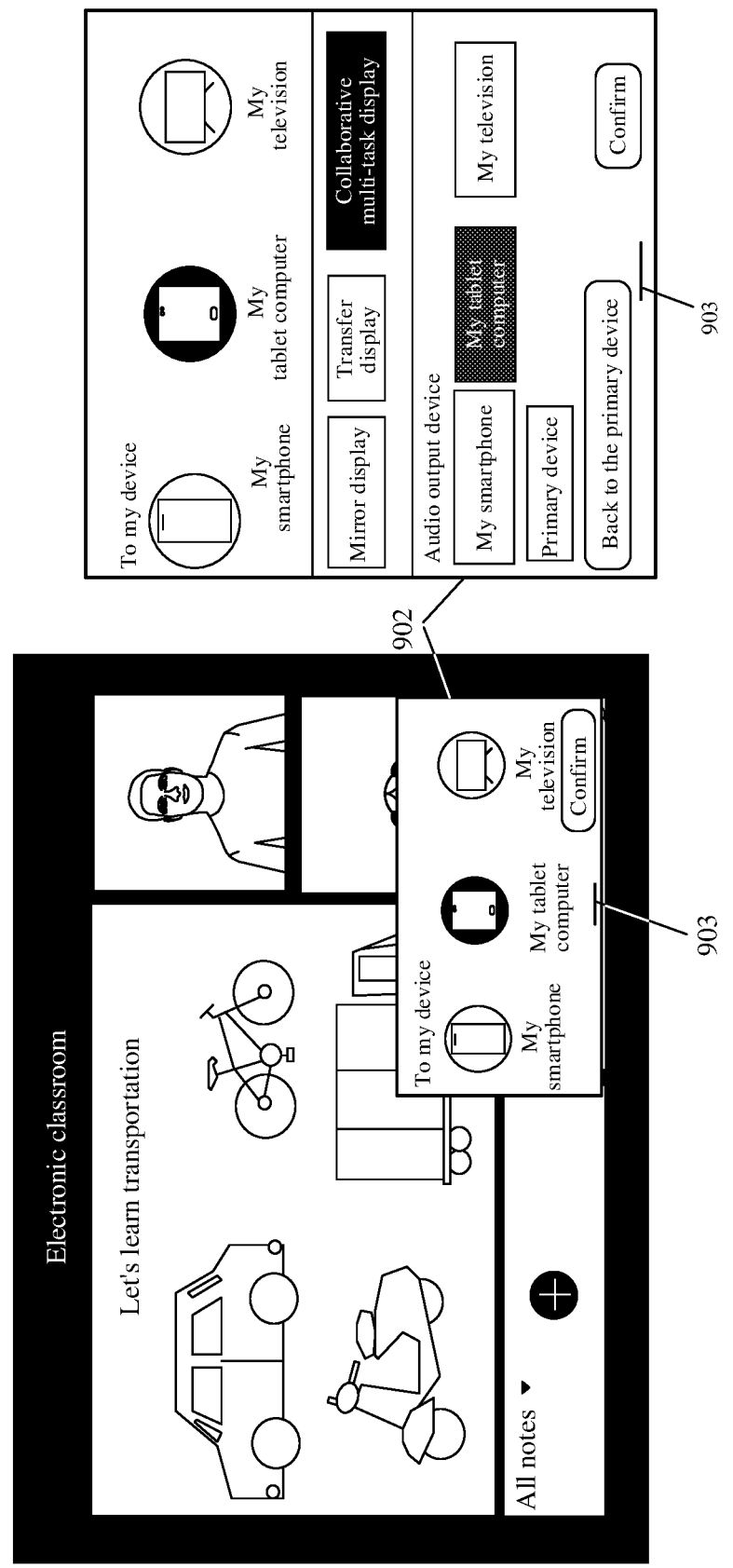

In some other examples, as shown in FIG. 9(b)(1) to FIG. 9(c), the option box 902 may further display an option of an audio output device. The option is used for the user to select a device for audio output. For example, in response to the operation of the user of tapping and conforming the option after the operation that the user selects the second electronic device (for example, "My tablet computer") from the second electronic device list, the operation that the user selects collaborative multi-task display, and an operation of selecting "My tablet computer" for audio output, the first electronic device triggers distributed collaborative multi-task display, and transfers the one or more of the plurality of task interfaces displayed on the display to the second electronic device (for example, "My tablet computer") that is selected by the user. That is, "My tablet computer" is used for audio output.

It should be noted that FIG. 9(a), FIG. 9(b)(1) and FIG. 9(b)(2), and FIG. 9(b) show several possible first operations in this embodiment of this application by using a first operation in a form of tapping a virtual button or selecting an option merely as an example. A specific form and display position of a virtual button icon are not limited in this application, and a specific form of display, display position, specific included content, or the like of an option is not limited either. For example, the option box 902 may further display an option of a device as a camera that collects a user profile picture, an option of a device as a microphone that collects a user voice, and the like.

In addition, in FIG. 9(a), FIG. 9(b)(1) and FIG. 9(b)(2), and FIG. 9(b), the multi-task scenario of the electronic classroom shown in FIG. 4(a) is used as an example, and the first operations by using a virtual button or an option shown in FIG. 9(a), FIG. 9(b)(1) and FIG. 9(b)(2), and FIG. 9(b) are applicable to any multi-task scenario. Details are not listed in this embodiment of this application.

In some embodiments, the virtual button or option may be displayed on the first electronic device in a floating manner all along. As shown in FIG. 9(a) to FIG. 9(b)(2), the virtual button 901 is displayed in an interface on the first electronic device in a floating manner all along.

In some other embodiments, the virtual button or option may alternatively be hidden on the first electronic device for display. For example, in response to a tap operation of a user on a folding key 903 shown in FIG. 9(b)(2) or FIG. 9(c), the first electronic device hides the option box 902 in the interface for display.

It should be noted that, in this application, the second electronic device used for distributed collaborative display with the first electronic device may be determined by the first electronic device according to the first operation of the user, or may be determined autonomously by the first electronic device in response to the first operation of the user. This is not limited in this application.

For a case in which the first electronic device determines the second electronic device according to the first operation of the user, for example, it is assumed that the first operation is the operation that the user holds and "taps" the first electronic device against the second electronic device, and in this case, the first electronic device may detect a device from which a distance to the first electronic device is less than a preset threshold (for example, 5 cm), to determine the second electronic device. For another example, it is assumed that the first operation is the operation that the user "shakes" the first electronic device and the second electronic device at the same time, and in this case, the first electronic device may detect a device that is "shaking" near the first electronic device, to determine the second electronic device.

For another example, it is assumed that the first operation is the operation that the user selects an option displayed on the display of the first electronic device (including an operation of selecting one or more options) as shown in FIG. 9(a), and in this case, the second electronic device may alternatively be determined by the first electronic device according to the operation of the user selecting the option displayed on the display of the first electronic device. For example, for the example shown in FIG. 9(b)(1) and FIG. 9(b)(2) or FIG. 9(c), the second electronic device is determined by the first electronic device according to the option selected by the user.

For a case in which the first electronic device autonomously determines the second electronic device in response to the first operation of the user, for example, it is assumed that the first operation is the operation that the user "shakes" the first electronic device, or the preset gesture of the user on the first electronic device, the preset operation of the user on the physical button on the first electronic device, or the operation of the user on the virtual button on the first electronic device, and in this case, the first electronic device may obtain, in response to the first operation of the user, information about an electronic device that displays interface content with the first electronic device in a distributed manner within a preset time period, to determine the second electronic device based on information about the electronic device. For example, the second electronic device may be an electronic device that displays interface content with the first electronic device in a distributed manner for a largest quantity of times within the preset time period. For another example, the second electronic device may be an electronic device that displays interface content with the first electronic device in a distributed manner most recently. The preset time period may include the last three days, the last week, the last month, the last three months, and the like. This is not limited in this application.

For another example, the first operation is the operation that the user selects the option displayed on the display of the first electronic device (including the operation of selecting one or more options) as shown in FIG. 9(a). In this case, the second electronic device may be determined by the first electronic device based on information about an electronic device that displays multi-task interfaces with the first electronic device in a distributed collaborative manner within a preset time period. For example, the second electronic device may be an electronic device that displays multi-task interfaces with the first electronic device in a distributed collaborative manner for a largest quantity of times within the preset time period. For another example, the second electronic device may be an electronic device that displays multi-task interfaces with the first electronic device in a distributed collaborative manner most recently. The preset time period may include the last three days, the last week, the last month, the last three months, and the like. This is not limited in this application.

In some embodiments of this application, a primary device and a secondary device need to be determined first. For first operations in different forms, the primary device and the secondary device may be determined in at least the following two manners.

Manner 1: The primary device and the secondary device are determined according to user selection.

In some embodiments, the primary device and the secondary device may be determined according to a selection operation (that is, a second operation) of a user, in response to the first operation of the user, in an interface (for example, a second interface) displayed on the electronic device. The method is applicable to all first operations in any one of the foregoing forms.

In some examples, in response to the first operation of the user, the electronic device may display a prompt box for the user to select the primary device and the secondary device.

For example, it is assumed that the first operation is the operation that the user holds and "taps" the first electronic device against the second electronic device (for example, the operation 703 shown in FIG. 7), and in this case, in response to the first operation of the user, an interface (for example, the second interface) displayed on the first electronic device may be an interface 1001 (that is, the second interface) as shown in FIG. 10(a)(2). In some examples, a prompt box 1002 is displayed in the interface 1001, and is used to provide to the user a model (or may be a device identifier or a customized device name that is not shown in FIG. 10(a)(1) to FIG. 10(b)(2), and is not limited in this application) of a device that "taps" against the device. In some other embodiments, as shown in the interface 1001, the prompt box 1002 is further used for the user to select whether to extend interface content on the local device (that is, the first electronic device) to the second electronic device or extend interface content on the second electronic device to the local device (that is, the first electronic device).

By using the prompt box 1002 in the interface 1001 shown in FIG. 10(a)(2), if the user selects an option "Extend from this device is to the second electronic device" (that is, the second operation), the first electronic device determines the first electronic device to be the primary device and the second electronic device to be the secondary device. That is, the first electronic device determines to display a part of content in the first interface on the first electronic device on the second electronic device in a distributed manner.

If the user selects an option "Extend from the second electronic device to this device" (that is, the second operation), the first electronic device determines the second electronic device to be the primary device and the first electronic device to be the secondary device. That is, the first electronic device determines that the first electronic device displays a part of content in the first interface on the second electronic device in a distributed manner.

For another example, it is assumed that the first operation is the operation that the user holds and "taps" the first electronic device against the second electronic device (for example, the operation 703 shown in FIG. 7), and in this case, in response to the first operation of the user, an interface (for example, the second interface) displayed on the second electronic device may be an interface 1003 (that is, the second interface) as shown in FIG. 10(b)(2). In some examples, a prompt box 1004 is displayed in the interface 1003, and is used to provide to the user a model (or may be a device identifier or a customized device name that is not shown in FIG. 10(a)(1) to FIG. 10(b)(2), and is not limited in this application) of a device that "taps" against the device. In some other embodiments, as shown in the interface 1003, the prompt box 1004 is further used for the user to select whether to extend interface content on the local device (that is, the second electronic device) to the first electronic device or extend interface content on the first electronic device to the local device (that is, the second electronic device).

By using the prompt box 1004 in the interface 1003 shown in FIG. 10(b)(2), if the user selects an option "Extend from this device is to the first electronic device" (that is, the second operation), the second electronic device determines the second electronic device to be the primary device and the first electronic device to be the secondary device. That is, the second electronic device determines to display a part of content in the first interface on the second electronic device on the first electronic device in a distributed manner.

If the user selects an option "Extend from the first electronic device to this device" (that is, the second operation), the second electronic device determines the first electronic device to be the primary device and the second electronic device to be the secondary device. That is, the second electronic device determines that the second electronic device displays a part of content in the first interface on the first electronic device in a distributed manner.

It should be noted that, in some embodiments, it is assumed that the first operation is the operation that the user holds and "taps" the first electronic device against the second electronic device (for example, the operation 703 shown in FIG. 7), and in this case, in response to the first operation of the user, both the first electronic device and the second electronic device may display a prompt box. For example, the first electronic device displays the interface 1001 shown in FIG. 10(a)(2), and the second electronic device displays the interface 1003 shown in FIG. 10(b)(2). In this case, the user may select, by using the prompt box in the interface 1001 or the interface 1003, whether to extend the interface content on the local device (that is, the second electronic device) to the first electronic device or extend the interface content on the first electronic device to the local device (that is, the second electronic device). A response of a device that first receives a selection operation of the user is used as a final result.

In another example, in response to the first operation of the user, an electronic device may display a draggable icon, so that the primary device and the secondary device are determined according to a drag action of the user and a selection operation of the user on the third interface displayed by the electronic device in response to the drag action of the user.

Figure 8A:
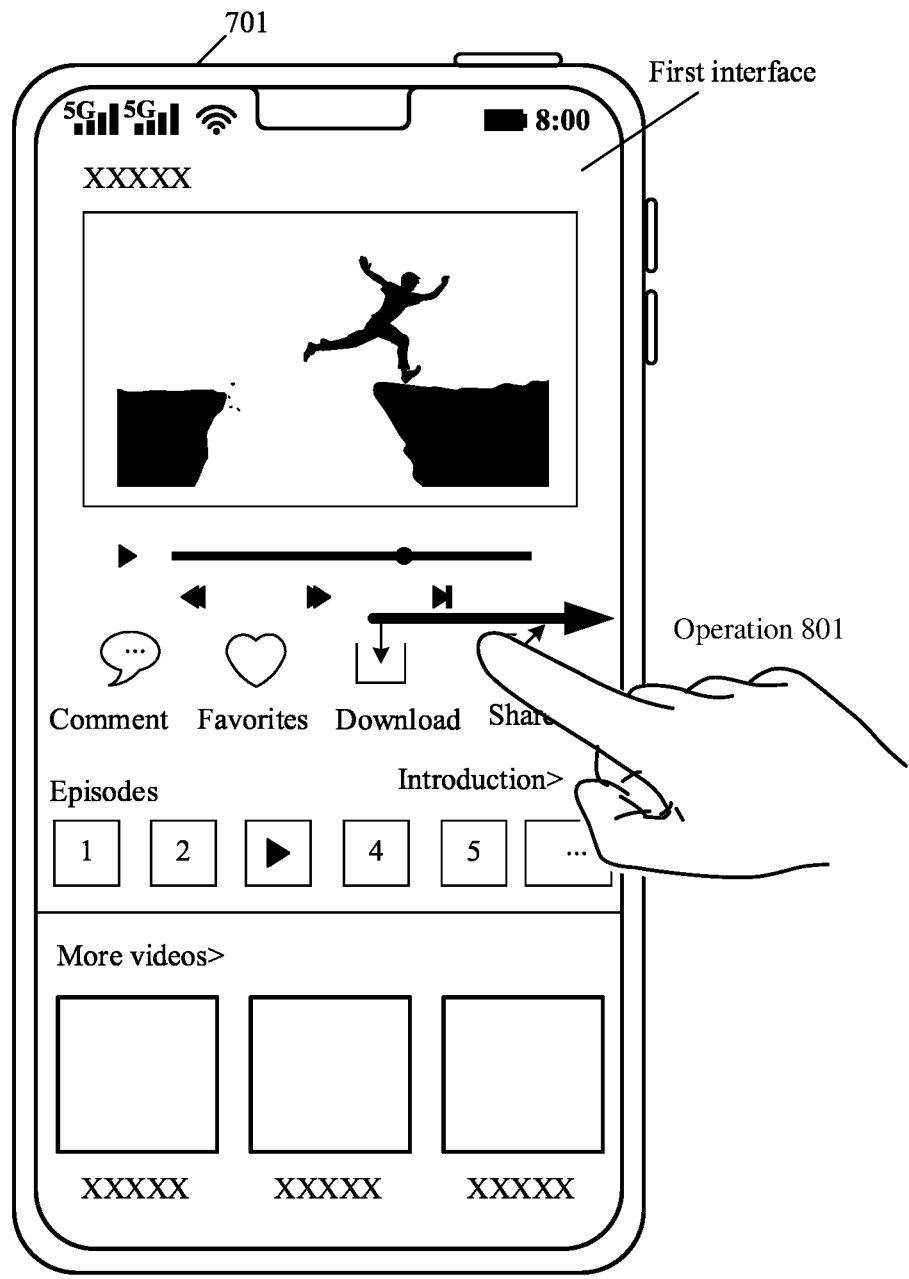
FIG. 8(a) to FIG. 8(c) are an example diagram of three first operations according to an embodiment of this application.
Figure 8B:
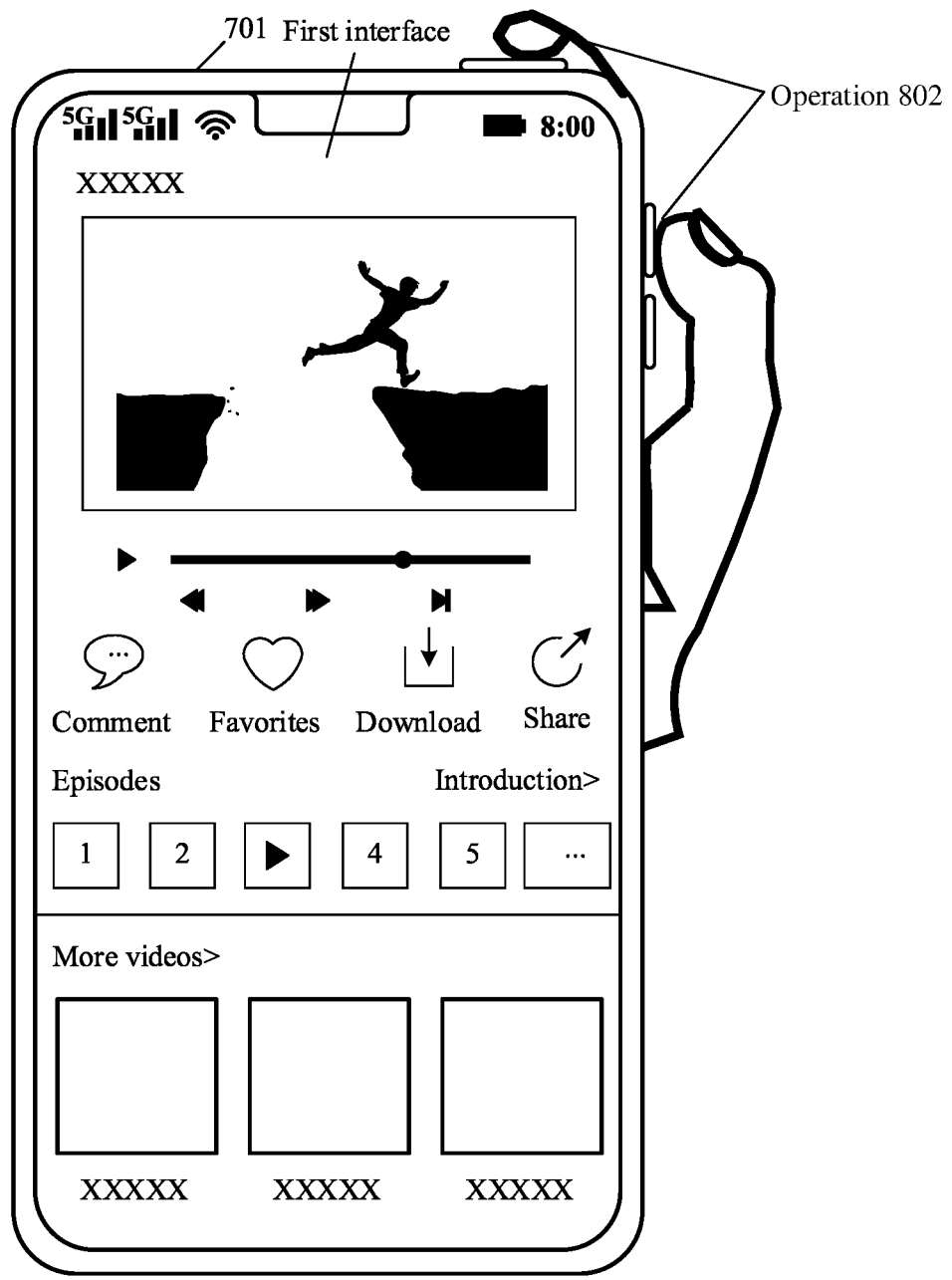
Figure 8C:
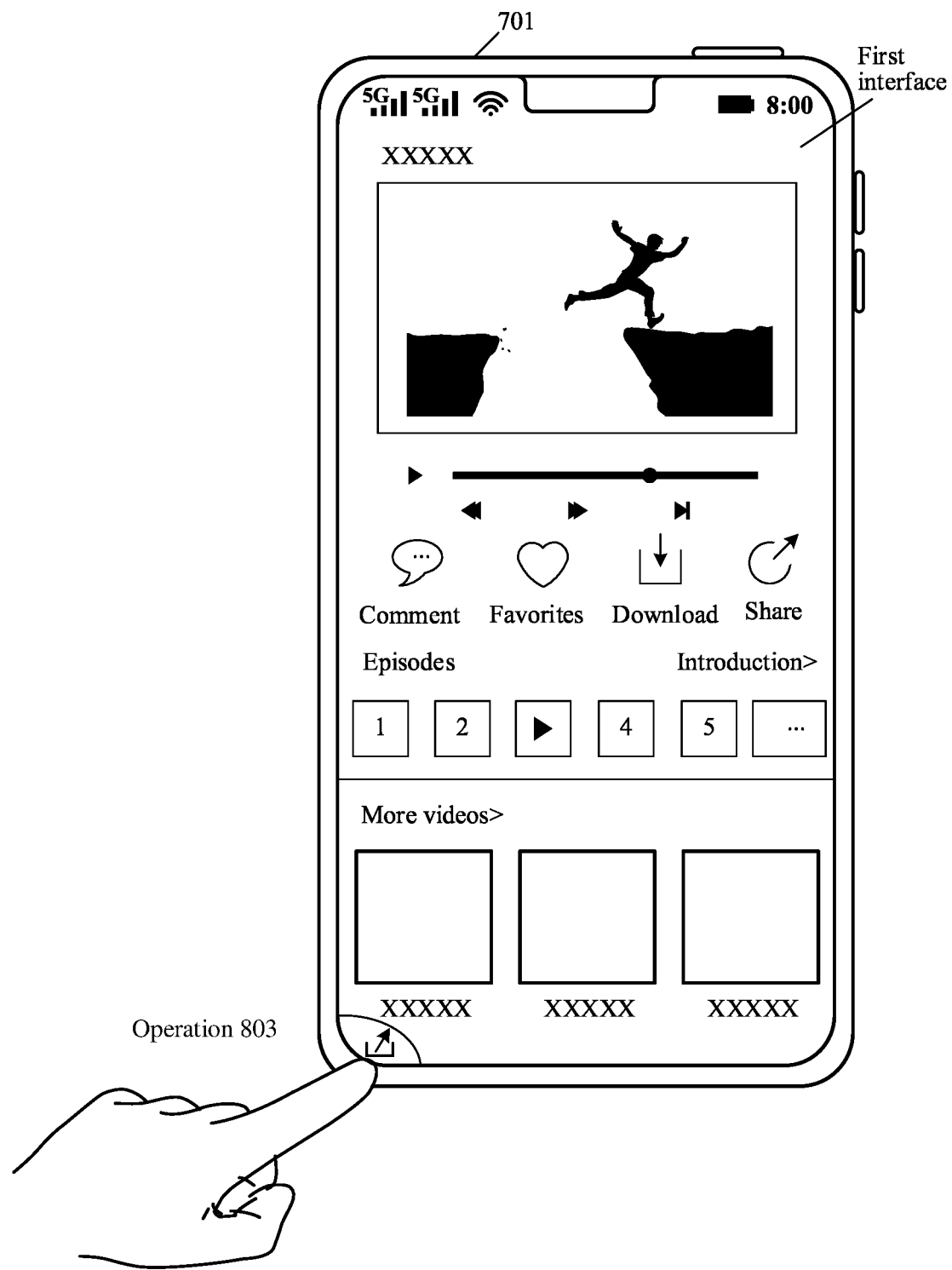
Figure 11A:
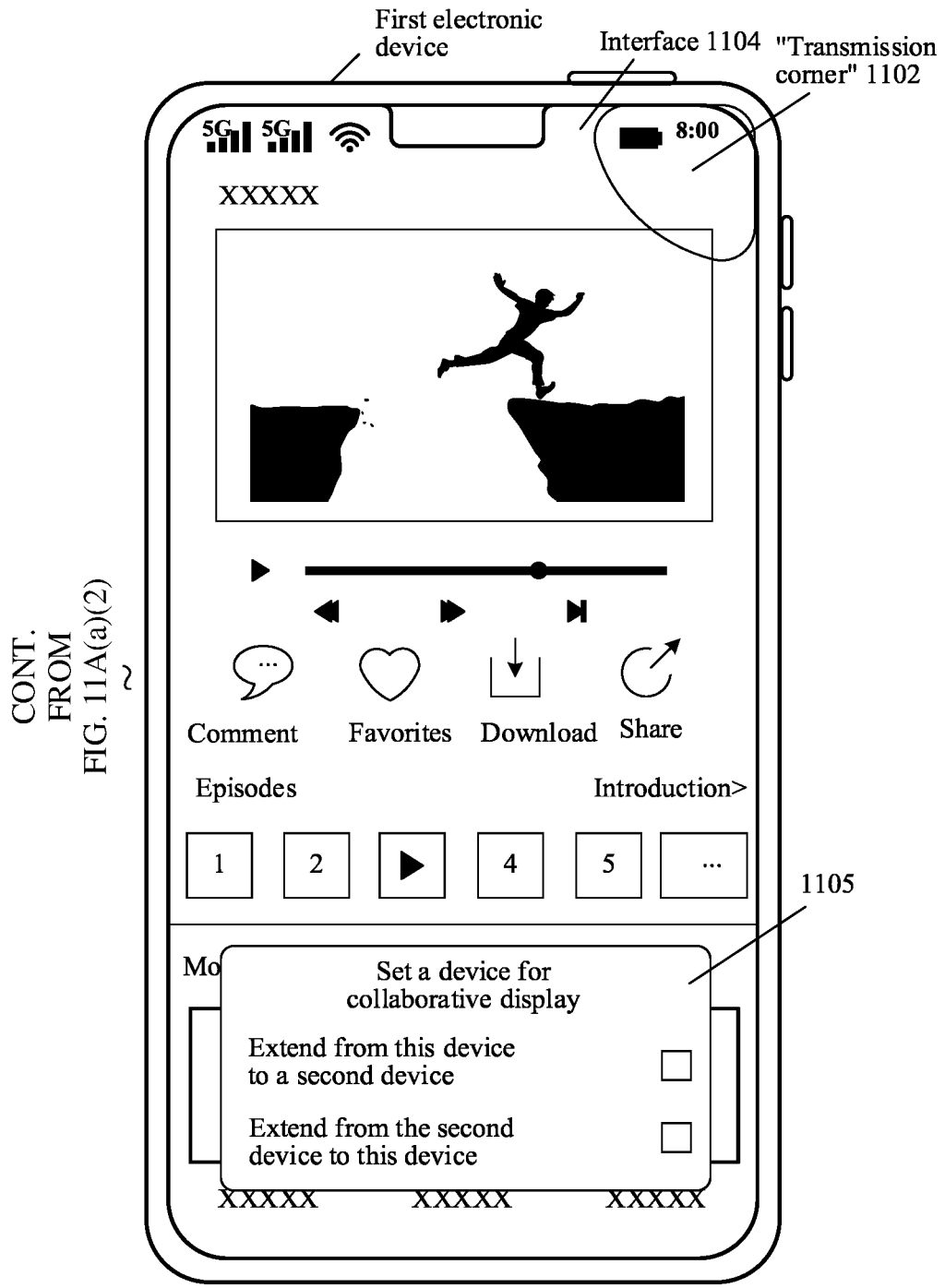
FIG. 11A(a)(1) to FIG. 11A(b) are a schematic diagram of another method for an electronic device to determine a primary device and a secondary device according to an embodiment of this application.
Figure 11B:
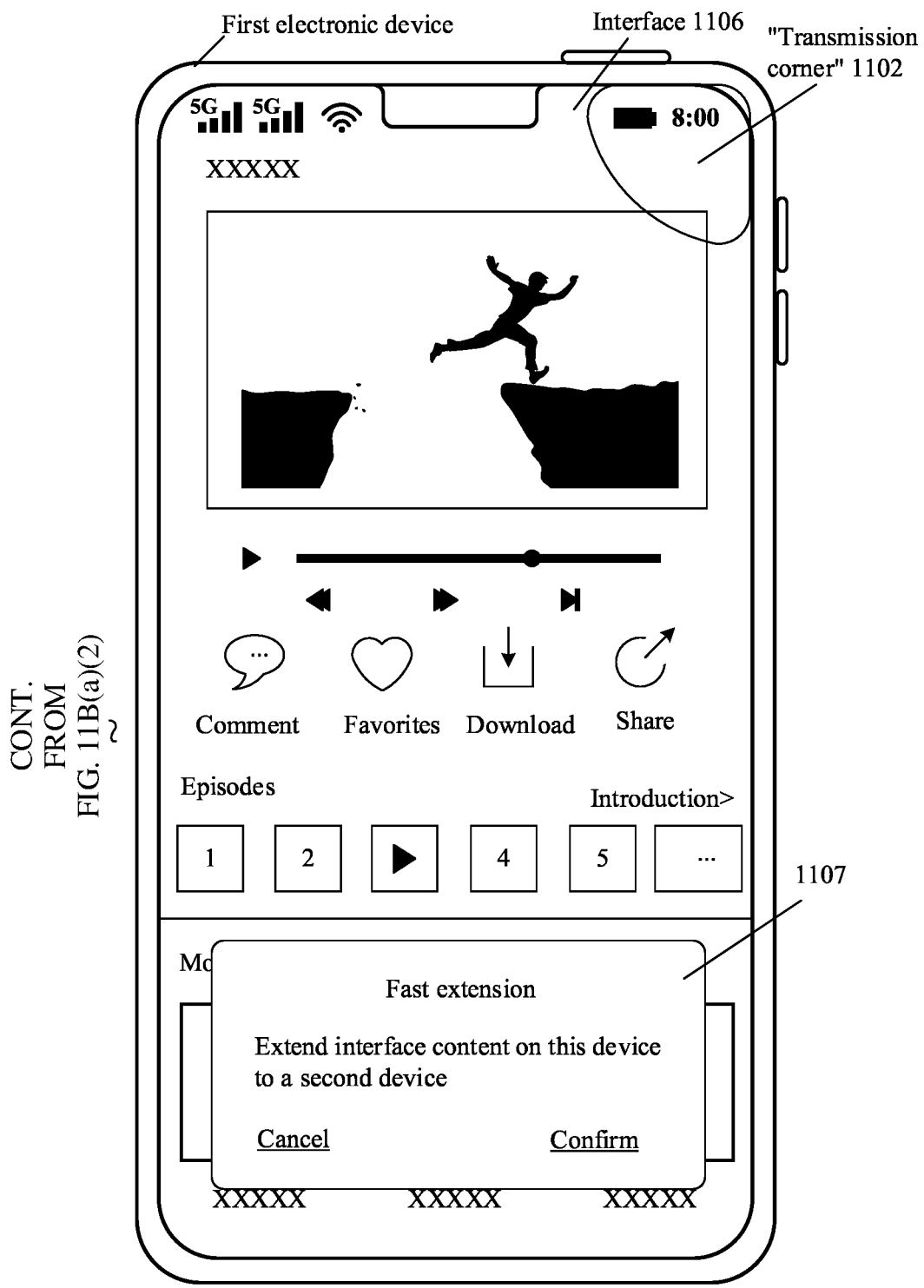
FIG. 11B(a)(1) to FIG. 11B(b) are a schematic diagram of a third method for an electronic device to determine a primary device and a secondary device according to an embodiment of this application.

For example, in response to the first operation (for example, the operation 703 shown in FIG. 7, an operation 801 shown in FIG. 8(a), an operation 802 shown in FIG. 8(b), or an operation 803 shown in FIG. 8(c)) of the user on the first electronic device, the first electronic device displays an interface 1101 (that is, the second interface) shown in FIG. 11A(a)(2) or FIG. 11B(a)(2). An icon "Transmission corner" 1102 is displayed in the interface 1101. "Transmission corner" 1102 is used for the user to determine, with a drag action, interface content to be displayed on another device in a distributed manner.

By using "Transmission corner" 1102 in the interface 1101 shown in FIG. 11A(a)(2) or FIG. 11B(a)(2), if the first electronic device receives a drag operation of the user on "Transmission corner" 1102, it may be preliminarily determined that the first electronic device is the primary device. The drag operation of the user on "Transmission corner" 1102 may include, but is not limited to, that the user drags "Transmission corner" 1102 to an area including content that is to be extended to another device for distributed display, or that the user drags content that is to be extended to another device for distributed display to "Transmission corner" 1102. This is not limited in this application.

In some embodiments, when "Transmission corner" 1102 appears for the first time, a usage instruction for "Transmission corner" 1102, for example, a guide box 1103 shown in FIG. 11A(a)(2) or FIG. 11B(a)(2), may be further displayed in the interface 1101 (that is, the second interface).

In some embodiments, the first electronic device may determine the second electronic device to be the secondary device of the first electronic device according to the second operation of the user. The second operation is a selection operation of the user in the prompt box. The prompt box is displayed on the first electronic device by the first electronic device in response to the user dragging the draggable icon. The prompt box is used for the user to select the primary device and the secondary device, and the draggable icon is displayed on the first electronic device by the first electronic device in response to a touch operation. For example, in response to a drag operation of the user on "Transmission corner" 1102, the first electronic device displays an interface 1104 (that is, a third interface) as shown in FIG. 11A(b). A prompt box 1105 is displayed in the interface 1104. In some embodiments, as shown in FIG. 11A(b), the prompt box 1105 is used for the user to select whether to extend interface content on the local device (that is, the first electronic device) to the second electronic device or extend interface content on the second electronic device to the local device (that is, the first electronic device).

By using the prompt box 1105 in the interface 1104 shown in FIG. 11A(b), if the user selects an option "Extend from this device is to the second electronic device" (that is, the third operation), it may be further determined that the first electronic device is the primary device and that the second electronic device is the secondary device. That is, the first electronic device determines to display a part of content in the first interface on the first electronic device on the second electronic device in a distributed manner.

If the user selects an option "Extend from the second electronic device to this device" (that is, the third operation), it may be further determined that the second electronic device is the primary device and that the first electronic device is the secondary device. That is, the first electronic device determines that the first electronic device displays a part of content in the first interface on the second electronic device in a distributed manner.

In some other embodiments, in response to the drag operation (that is, the second operation) of the user on "Transmission corner" 1102, the first electronic device displays an interface 1106 (that is, a third interface) as shown in FIG. 11B(b). A prompt box 1107 is displayed in the interface 1106. In some embodiments, as shown in FIG. 11B(b), the prompt box 1107 is used for the user to determine whether to extend interface content on the local device (that is, the first electronic device) to the second electronic device.

By using the prompt box 1107 in the interface 1106 shown in FIG. 11B(b), if the user determines to extend the interface content on the local device (that is, the first electronic device) to the second electronic device, it may be determined that the second electronic device is the secondary device. That is, the first electronic device determines to display a part of content in the first interface on the first electronic device on the second electronic device in a distributed manner. If the user cancels extension of the interface content on the local device (that is, the first electronic device) to the second electronic device, a current process of distributed display is stopped.

In another example, in response to the first operation of the user, an electronic device may display a draggable icon, to determine the primary device according to a drag action (that is, the second operation) of the user, and determine the secondary device autonomously.

For example, in response to the first operation (for example, the operation 703 shown in FIG. 7, an operation 801 shown in FIG. 8(a), an operation 802 shown in FIG. 8(b), or an operation 803 shown in FIG. 8(c)) of the user on the first electronic device, the first electronic device displays an interface 1101 (that is, the second interface) shown in FIG. 11A(a)(2) or FIG. 11B(a)(2). An icon "Transmission corner" 1102 is displayed in the interface 1101. "Transmission corner" 1102 is used for the user to determine, with a drag action, interface content to be displayed on another device in a distributed manner.

By using "Transmission corner" 1102 in the interface 1101 shown in FIG. 11A(a)(2) or FIG. 11B(a)(2), if the first electronic device receives a drag operation (that is, the second operation) of the user on "Transmission corner" 1102, it may be determined that the first electronic device is the primary device.

In another example, when learning that a device has established a connection (for example, a wired connection or a wireless connection) to the device, an electronic device may further display the prompt box 1002 shown in FIG. 10(a)(2) or the prompt box 1004 shown in FIG. 10(b)(2), for the user to select the primary device and secondary device.

In some other examples, when learning that a device has established a connection (for example, a wired connection or a wireless connection) to the device, an electronic device may further display a draggable icon, to determine the primary device according to a drag action (that is, the second operation) of the user, and determine the secondary device autonomously. Alternatively, the primary device and the secondary device are determined according to a drag action (that is, the second operation) of the user and a selection operation (that is, the third operation) of the user on the third interface displayed by the electronic device in response to the drag action of the user (that is, the second operation).

Further, the first electronic device may obtain information about an electronic device that displays interface content with the first electronic device in a distributed manner within a preset time period, to determine the second electronic device based on the information about the electronic device. For example, the second electronic device may be an electronic device that displays interface content with the first electronic device in a distributed manner for a largest quantity of times within the preset time period. For another example, the second electronic device may be an electronic device that displays interface content with the first electronic device in a distributed manner most recently. This is not limited in this application.

In some embodiments, the draggable icon (for example, "Transmission corner") may be displayed on a display of the primary device in a floating manner all along during distributed display of the primary device (that is, the first electronic device) and the secondary device (that is, the second electronic device), so that user can adjust, at anytime, the interface content transferred to the secondary device.

In some other embodiments, when the primary device (that is, the first electronic device) and the secondary device (that is, the second electronic device) start distributed display, the primary device may display an option of removing the draggable icon, for user selection. In some examples, as shown in FIG. 12(a)(1), the primary device removes the draggable icon (for example, "Transmission corner" 1202) and removes the icon 1201 in response to an operation that the user taps to remove the draggable icon 1201. In some other examples, as shown in FIG. 12(b)(2), if the primary device does not receive, within a preset time (for example, within 10 seconds), an operation that the user taps the icon 1201, the primary device removes the icon 1201, but still displays "Transmission corner" 1202.

It should be noted that the prompt box 1004 shown in FIG. 10(a)(2) and FIG. 10(b)(2) in this application is merely used as an example, and a specific form of displaying the prompt box, including a display position and a size of the prompt box on the display, a specific language description in the prompt box, and the like, is not limited in this application. "Transmission corner" 1102 in FIG. 11A(a)(2), FIG. 11A(b), in FIG. 11B(a)(2), and FIG. 11B(b), and "Transmission corner" 1202 in FIG. 12(a)(1) and FIG. 12(b)(1) and FIG. 12(b)(2) in this application are merely used as examples of a draggable icon. A specific form of displaying the draggable icon, including an icon form, a display position, a size, and the like of the draggable icon on the display, is not limited in this application.

In addition, in FIG. 12(a)(1) to FIG. 12(b)(2) in this application, an example in which the option of removing the draggable icon is displayed above the draggable icon in a floating manner is used as an example. A specific form of displaying the option of removing the draggable icon is not limited in this application. For example, the option may alternatively be independent of the draggable icon and displayed in another position. In addition, the option of removing the draggable icon may alternatively be presented to the user in another icon form.

Manner 2: The primary device and the secondary device are determined based on motion data of an electronic device.

The method is applicable to an operation "tap".

An operation (that is, a first operation) that a user holds and "taps" a first electronic device against a second electronic device is used as an example. For example, in response to the first operation of the user, the first electronic device and/or the second electronic device may collect motion data of the first electronic device and/or the second electronic device. The motion data may include, but is not limited to, a movement direction, a movement acceleration, a moving velocity, a direction of rotation, an angular velocity in rotation, an angle of rotation, and the like of the device.

In some examples, it may be determined based on the motion data of the first electronic device and/or the second electronic device that a stationary device is the primary device and that a moving device is the secondary device.

In some other examples, it may be determined based on the motion data of the first electronic device and/or the second electronic device that a device with a lower movement acceleration (for example, that is less than a preset threshold) is the primary device and that a device with a higher movement acceleration (for example, that is greater than the preset threshold) is the secondary device.

In some other examples, if movement accelerations of the first electronic device and the second electronic device are the same, the primary device and the secondary device may be determined according to user selection. For example, the first electronic device and/or the second electronic device may pop up a prompt box (as shown in FIG. 10(a)(2) or in FIG. 10(b)(2)) for the user to select a device to which interface content on a device is extended, that is, for the user to select a device to be the primary device and a device to be the secondary device.

In this application, after the primary device (that is, the first electronic device) and the secondary device (that is, the second electronic device) are determined, the primary device (that is, the first electronic device) transfers a part of content in a first interface to the secondary device (that is, the second electronic device) for display.

A quantity of task interfaces displayed on each second electronic device is not limited in this embodiment of this application.

In some embodiments, when the first electronic device and the second electronic device perform distributed collaborative display, each second electronic device displays one of the plurality of task interfaces. For example, when the first electronic device and the second electronic device display the plurality of task interfaces shown in FIG. 4(a) in a distributed collaborative manner, the second electronic device may display any one of the live video interface, the electronic lecture note interface, the class communication group interface, or the memo interface shown in FIG. 4(a). For another example, when the first electronic device and the second electronic device display the plurality of task interfaces shown in FIG. 4(b) in a distributed collaborative manner, the second electronic device may display the memo interface or the short message interface shown in FIG. 4(b).

Figure 13A:
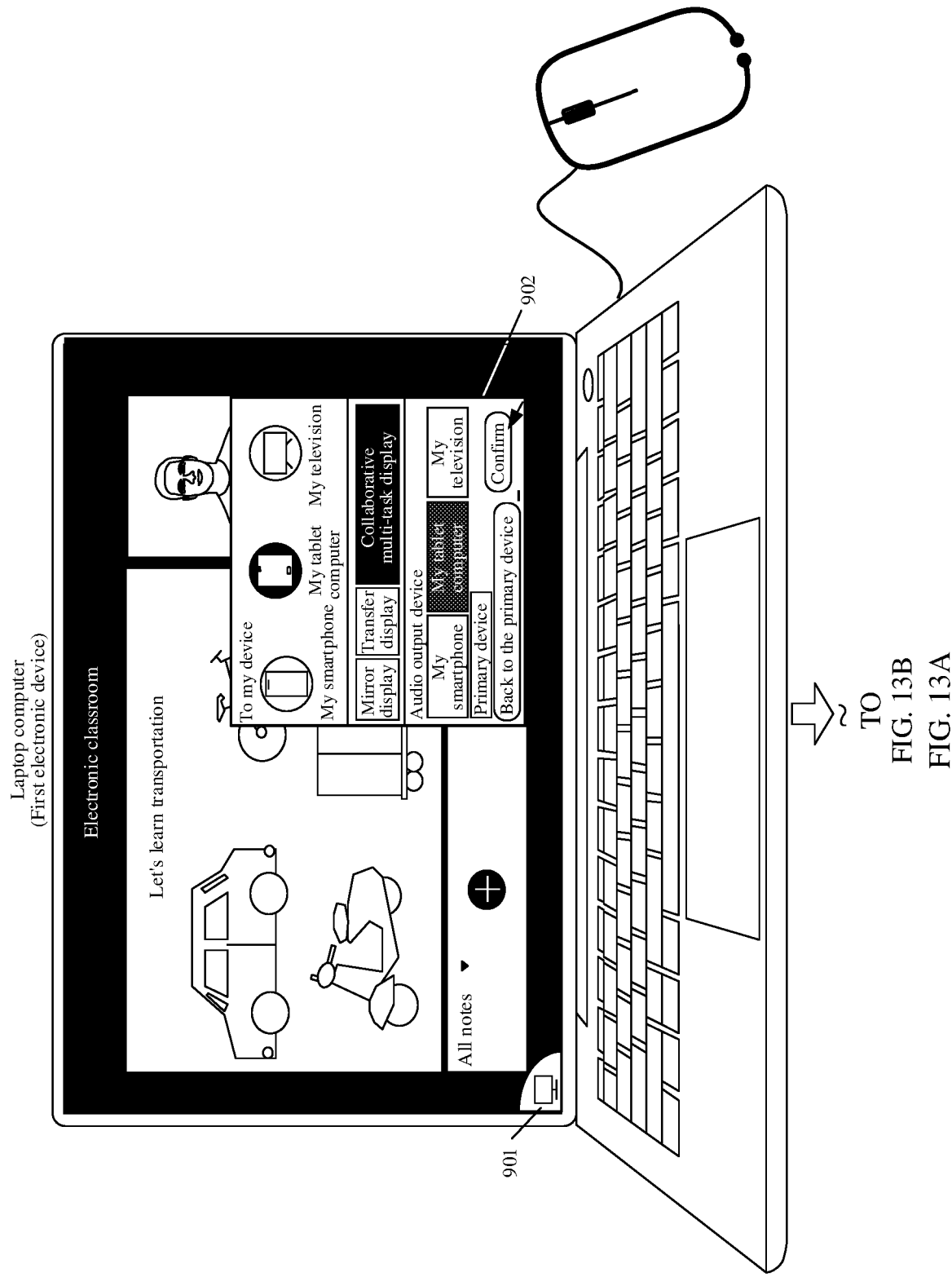
FIG. 13A and FIG. 13B are a first example diagram of distributed interface display according to an embodiment of this application.
Figure 13B:
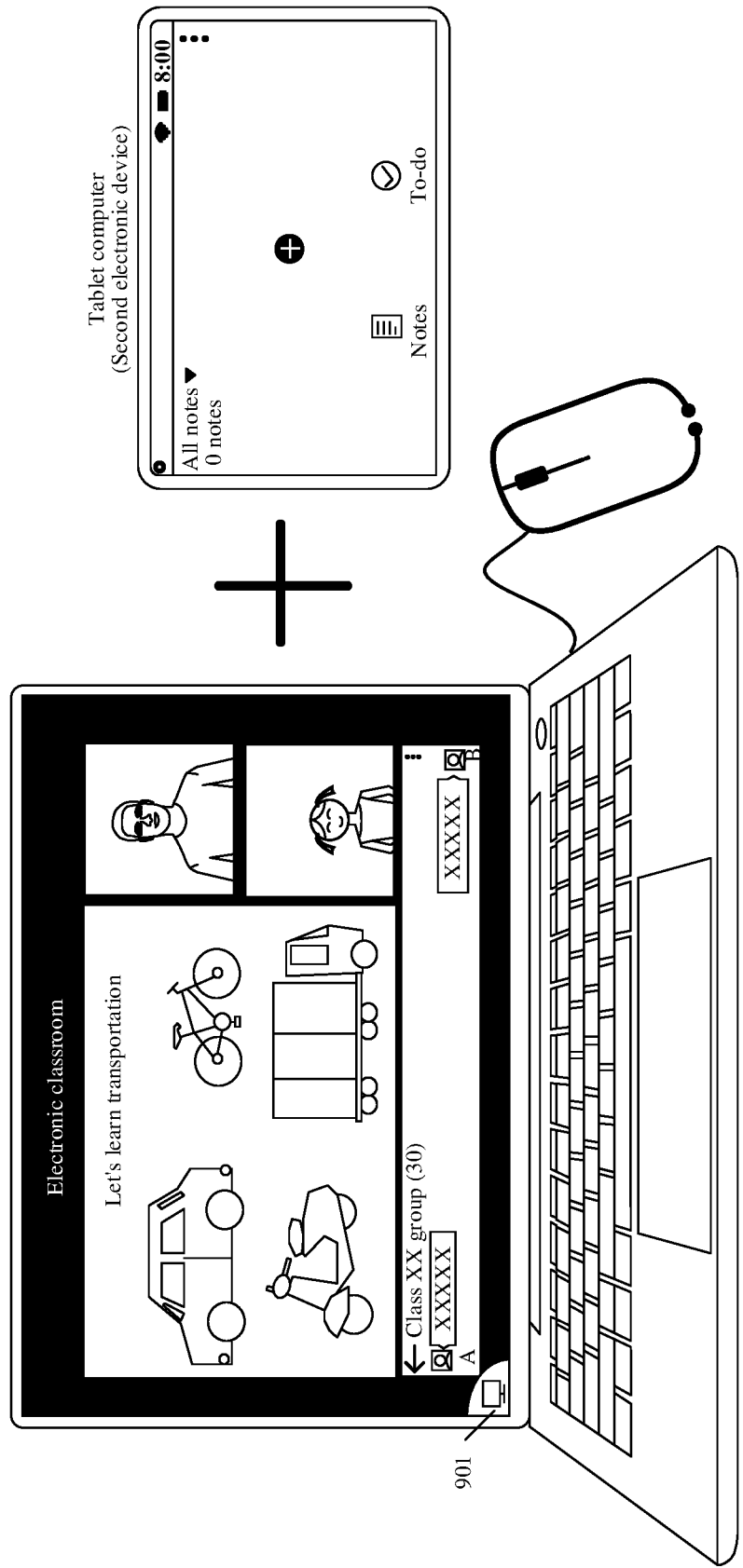

As shown in FIG. 13A and FIG. 13B, FIG. 13A and FIG. 13B are an example diagram of distributed interface display according to an embodiment of this application using an example in which a first electronic device is a laptop computer, a second electronic device is a tablet computer, and the laptop computer displays a multi-task scenario of an electronic classroom as shown in FIG. 4(a). As shown in FIG. 13A and FIG. 13B, in response to an operation of a user of tapping and confirming an option after an operation that the user selects "My tablet computer" from a second electronic device list in an option box 902 by moving a mouse cursor, an operation that the user selects collaborative multi-task display, and an operation of selecting "My tablet computer" for audio output, the laptop computer triggers distributed collaborative multi-task display. As shown in FIG. 13A and FIG. 13B, the laptop computer transfers a memo interface to the tablet computer for display, and the laptop computer displays a live video interface, an electronic lecture note interface, and a class communication group interface.

In the example of distributed collaborative display shown in FIG. 13A and FIG. 13B, in response to the operation of the user of tapping and confirming the option after the operation that the user selects "My tablet computer" from the second electronic device list in the option box 902 by moving the mouse cursor, the operation that the user selects collaborative multi-task display, and the operation of selecting "My tablet computer" for audio output, the laptop computer may decouple a plurality of displayed task interfaces, for example, decouple the live video interface, the electronic lecture note interface, and the class communication group interface into one atomic ability (for example, a first atomic ability), and decouple the memo interface into another atomic ability (for example, a second atomic ability). The memo interface corresponding to the second atomic ability is transferred to the tablet computer for display, and the laptop computer still displays the live video interface, the electronic lecture note interface, and the class communication group interface that correspond to the first atomic ability.

Figure 14A:
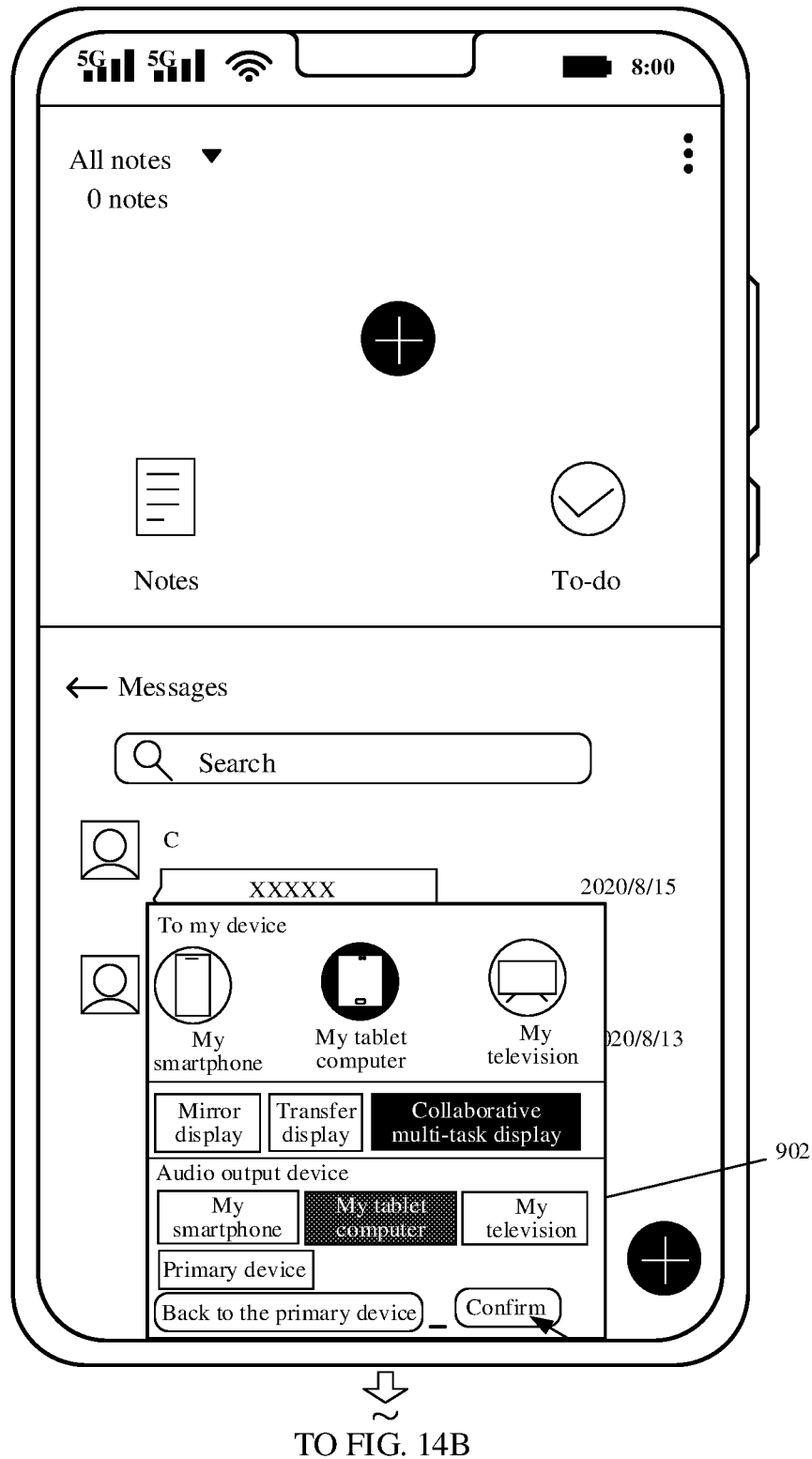

Further, as shown in FIG. 14A and FIG. 14B, FIG. 14A and FIG. 14B are an example diagram of distributed interface display according to an embodiment of this application using an example in which the first electronic device is a smartphone A, the second electronic device is a smartphone B, and the smartphone A displays a split-screen display scenario as shown in FIG. 4(b). As shown in FIG. 14A and FIG. 14B, in response to an operation of a user of tapping and confirming an option after an operation that the user selects "My smartphone" from the second electronic device list in the option box 902, the operation that the user selects collaborative multi-task display, and an operation of selecting "My smartphone" for audio output, the smartphone A triggers distributed collaborative multi-task display. As shown in FIG. 14A and FIG. 14B, the smartphone A transfers the memo interface to the smartphone B for display, and the smartphone A displays a short message interface.

In some other embodiments, each second electronic device displays more than one of the plurality of task interfaces mentioned above. For example, when the first electronic device and the second electronic device display the plurality of task interfaces shown in FIG. 4(a) in a distributed collaborative manner, the second electronic device may display two or more of the live video interface, the electronic lecture note interface, the class communication group interface, or the memo interface shown in FIG. 4(a).

As shown in FIG. 15A(i) and FIG. 15A(2), FIG. 15A(i) and FIG. 15A(2) are an example diagram of distributed interface display according to an embodiment of this application using an example in which the first electronic device is a laptop computer, the second electronic device is a tablet computer, and the laptop computer displays a multi-task scenario of an electronic classroom as shown in FIG. 4(a). As shown in FIG. 15A(i) and FIG. 15A(2), in response to an operation of a user of tapping and confirming an option after an operation that the user selects "My tablet computer" from the second electronic device list in the option box 902 by moving a mouse cursor, an operation that the user selects collaborative multi-task display, and an operation of selecting "My tablet computer" for audio output, the laptop computer triggers distributed collaborative multi-task display. As shown in FIG. 15A(1) and FIG. 15A(2), the laptop computer transfers the memo interface and the class communication group interface to the tablet computer for display, and the laptop computer displays the live video interface and the electronic lecture note interface.

Further, as shown in FIG. 15B(1) and FIG. 15B(2), FIG. 15B(1) and FIG. 15B(2) are an example diagram of distributed interface display according to an embodiment of this application using an example in which the first electronic device is a smartphone A, the second electronic device is a smartphone B, and the smartphone A displays a split-screen display scenario. It is assumed that the smartphone A displays the memo interface, the short message interface, and the video interface in a split-screen manner. In response to an operation of a user of tapping and confirming an option after an operation that the user selects "My smartphone" from the second electronic device list in the option box 902, the operation that the user selects collaborative multi-task display, and an operation of selecting "My smartphone" for audio output, the smartphone A triggers distributed collaborative multi-task display. As shown in FIG. 15B(1) and FIG. 15B(2), the smartphone A transfers the video interface to the smartphone B for display, and the smartphone A displays the short message interface and the memo interface. The short message interface and the memo interface may be displayed on the smartphone A on top-bottom split screens as shown in FIG. 15B(2). In this embodiment of this application, after the plurality of task interfaces displayed on the first electronic device are displayed on the first electronic device and the second electronic device in a distributed collaborative manner, that is, after one or more of the plurality of task interfaces displayed on the first electronic device are transferred to the second electronic device, the first electronic device reallocates a display layout of a remaining function area on the first electronic device. For example, the first electronic device reallocates a function area of the display, and lays out a remaining task interface in a reallocated function area. For example, it is assumed that the first electronic device sends a task interface in a first function area to the second electronic device for display, and in this case, a remaining function area is rendered together, by the first electronic device according to a re-determined framework template, on a virtual screen of the first electronic device, and sent to a display of the first electronic device for display.

The distributed interface display method provided in embodiments of this application may support, but is not limited to, the following several specific manners of distributed display: Manner (1): The second electronic device displays key content in a first interface. Manner (2): The second electronic device displays lower-level interface information in the first interface. Manner (3): The second electronic device displays floating content or overlapped content in the first interface. Manner (4): The second electronic device displays a task interface in a function area selected by a user in the first interface. With reference to the accompanying drawings, the distributed interface display method performed in each of the foregoing four manners is described in detail below.

Manner (1): The second electronic device displays key content in the first interface.

In this application, the key content may be understood as interface content to which the user pays more attention or core content in the first interface. In some embodiments, the core content may be defined in a customized manner based on a service attribute, an application attribute, or the like.

In some examples, the first electronic device may determine, based on an application attribute corresponding to the first interface, the interface content to which the user pays more attention or the core content in the first interface. For example, for a map application interface, the interface content to which the user pays more attention is interface content corresponding to a navigation window, and core content in the map application interface is also the interface content corresponding to the navigation window. In this case, the interface content corresponding to the navigation window may be transferred from the display of the first electronic device to the second electronic device for display, and the first electronic device displays other related information that remains in the first interface (for example, another alternative route, a nearby supermarket, a bank, and other information).

For another example, for a video play interface, the interface content to which the user pays more attention is interface content corresponding to a video play box, and core content in the video play interface is also the interface content corresponding to the video play box. In this case, the interface content corresponding to the video play box may be transferred from the display of the first electronic device to the second electronic device for display, and the first electronic device displays other related information that remains in the first interface (for example, an episode and more information in a video).

Refer to FIG. 16(a) and FIG. 16(b). FIG. 16(a) and FIG. 16(b) are an example diagram of distributed interface display according to an embodiment of this application. As shown in FIG. 16(a), it is assumed that a video play interface 1601 (that is, the first interface) is displayed in a portrait orientation on a smartphone 1601 (that is, the first electronic device). Interface content corresponding to a video play box 1602 is key content in the video play interface 1601 (that is, the first interface), and remaining content is video-related content. In this case, as shown in FIG. 16(b), the smartphone 1601 may transfer the interface content corresponding to the video play box 1602 to a tablet computer 1603 (that is, the second electronic device) for play, and the remaining video-related content is still displayed on the smartphone 1601 (that is, the first electronic device).

It should be noted that, in this application, the transferred interface content to which the user pays more attention in the first interface or core content in the first interface (the video play box 1602 shown in FIG. 16(b)) may be displayed in full screen on the second electronic device (for example, the tablet computer 1603); or may be displayed on the second electronic device in a form of window display. This is not limited in this application.

For example, refer to FIG. 17(a) and FIG. 17(b). The smartphone 1601 (that is, the first electronic device) shown in FIG. 17(a) transfers the video play box 1602 in the video play interface 1601 (that is, the first interface) in the portrait orientation to the tablet computer 1603. The tablet computer 1603 displays, in a form of a video play window (for example, a video play window 1701 shown in FIG. 17(b)), the video play box 1602 transferred from the smartphone 1601. A window adjustment button, a close button, and a drag button are displayed in the video play window 1701. The window adjustment button is used to adjust a shape and a size of the video play window 1701. The close button is used to close the video play window 1701 on the smartphone 1603 (that is, the second electronic device). The drag button is used to change a position of the video play window 1701 with a drag operation.

A scenario in which the first electronic device transfers a video play box to the second electronic device as shown in FIG. 16(a) and FIG. 16(b) or FIG. 17(a) and FIG. 17(b) is applicable to any one of the foregoing embodiments of this application. According to the solution of distributed interface display shown in FIG. 16(a) and FIG. 16(b) or FIG. 17(a) and FIG. 17(b), a user may watch a video on the tablet computer 1603 while browsing through the video-related content on the smartphone 1601. This provides much more convenience to the user for watching a video and browsing through other video-related information.

For another example, in some embodiments of this application, based on functions implemented by a plurality of function areas, the first electronic device determines a first function area autonomously, and determines a task interface to be transferred from the first electronic device to the second electronic device. For example, a task interface in a function area that implements a main function (that is, an interface for content, in the first interface, to which more attention is paid) may be preferentially displayed on a larger-screen device; and a task interface in a function area that implements a minor function may be preferentially displayed on a smaller-screen device. The main function may be understood as a function that can be implemented by a task to which the user pays more attention, for example, the electronic lecture note interface and the live video interface shown in FIG. 4(a).

In some embodiments, the user may further return to a current video play interface on the smartphone 1601, and browse an upper-level interface of the interface. In some other embodiments, the user may further tap an option in the current video play interface to enter a next-level interface. In some other embodiments, the user may further exit the current video play interface and open an interface of another application.

In some embodiments, a form in which the second electronic device (that is, the secondary device) displays interface content transferred from the first electronic device (that is, the primary device) includes a form of full-screen display or a form of window display, and may be determined based on an application attribute corresponding to the first interface, or may be selected or adjusted by a user as desired. This is not limited in this application.

In some embodiments, the second electronic device may further accept a customized adjustment (for example, dragging a corner of a window), to adjust a shape and a size of the window, and the like. For details, refer to a method for adjusting an application window in a conventional technology. Details are not described herein.

Manner (2): The second electronic device displays lower-level interface information in the first interface.

The lower-level interface information in the first interface may be understood as hidden interface information in the first interface, for example, detail interface information. It can be understood that the same application may include different application interfaces at different levels. The different levels may have a hierarchical relationship, or may not have any hierarchical relationship. An interface may invoke a next-level interface for the interface in response to an operation of a user on the interface.

For example, the lower-level interface information in the first interface refers to a lower-level interface for a part of content in the first interface, for example, detail interface information. For example, the first interface includes an electronic document list, and the electronic document list includes at least one electronic document. The electronic document list may be any one of the following: an email list, a picture list, a short message list, or a memo list. In this case, the first electronic device may send a corresponding, for example, email detail interface, a picture detail interface, a short message detail interface, or a memo detail interface to the second electronic device for display. In some embodiments, the electronic document list may include at least one unread electronic document. For example, the electronic document list may be the email list, the short message list, or the like.

For example, in some embodiments, the first electronic device displays the first interface, where the first interface includes the electronic document list, and the electronic document list includes at least one unread electronic document; that the second electronic device is the secondary device of the first electronic device is determined when a touch operation with the second electronic device is detected by the first electronic device; and in this case, the first electronic device searches for a latest unread electronic document in the at least one unread electronic document, and displays a detail interface for the latest unread electronic document on the second electronic device. The first electronic device continues displaying the electronic document list after the detail interface for the latest unread electronic document is displayed on the second electronic device, and the latest unread electronic document in the electronic document list is marked as read.

In some embodiments, if the electronic document list includes the at least one unread electronic document, the electronic document list may further include at least one read electronic document.

For example, if the first interface includes the picture list, and the picture list includes thumbnails of a plurality of pictures, the lower-level interface information in the first interface may be a detail interface for a picture (for example, a picture selected by a user or a latest picture). Refer to FIG. 18(a) and FIG. 18(b). As shown in (a) in FIG. 18(a) and FIG. 18(b), it is assumed that a thumbnail interface 1802 (that is, the first interface) of a gallery application is displayed on a tablet computer 1801 (that is, the first electronic device). The thumbnail interface 1802 includes thumbnails of a plurality of pictures. In this case, it is assumed that a smartphone 1803 is determined to be the second electronic device (that is, a secondary device), and if a user selects (for example, taps) a thumbnail of a picture A in the thumbnail interface 1802, as shown in FIG. 18(b), the tablet computer 1801 (that is, the first electronic device) may transfer a next-level interface (that is, a detail interface 1104 for the picture A) for the picture A to the smartphone 1803 (that is, the second electronic device) for display, and the original thumbnail interface 1802 (that is, the first interface) is still displayed on the tablet computer 1801 (that is, the first electronic device).

According to the solution of distributed interface display shown in FIG. 18(a) and FIG. 18(b), a user may browse through thumbnails on the tablet computer 1801 while viewing a picture detail interface on the smartphone 1803. This greatly reduces complexity of operations when a user uses a gallery, and provides more convenience when the user uses the gallery.

Figure 19B:
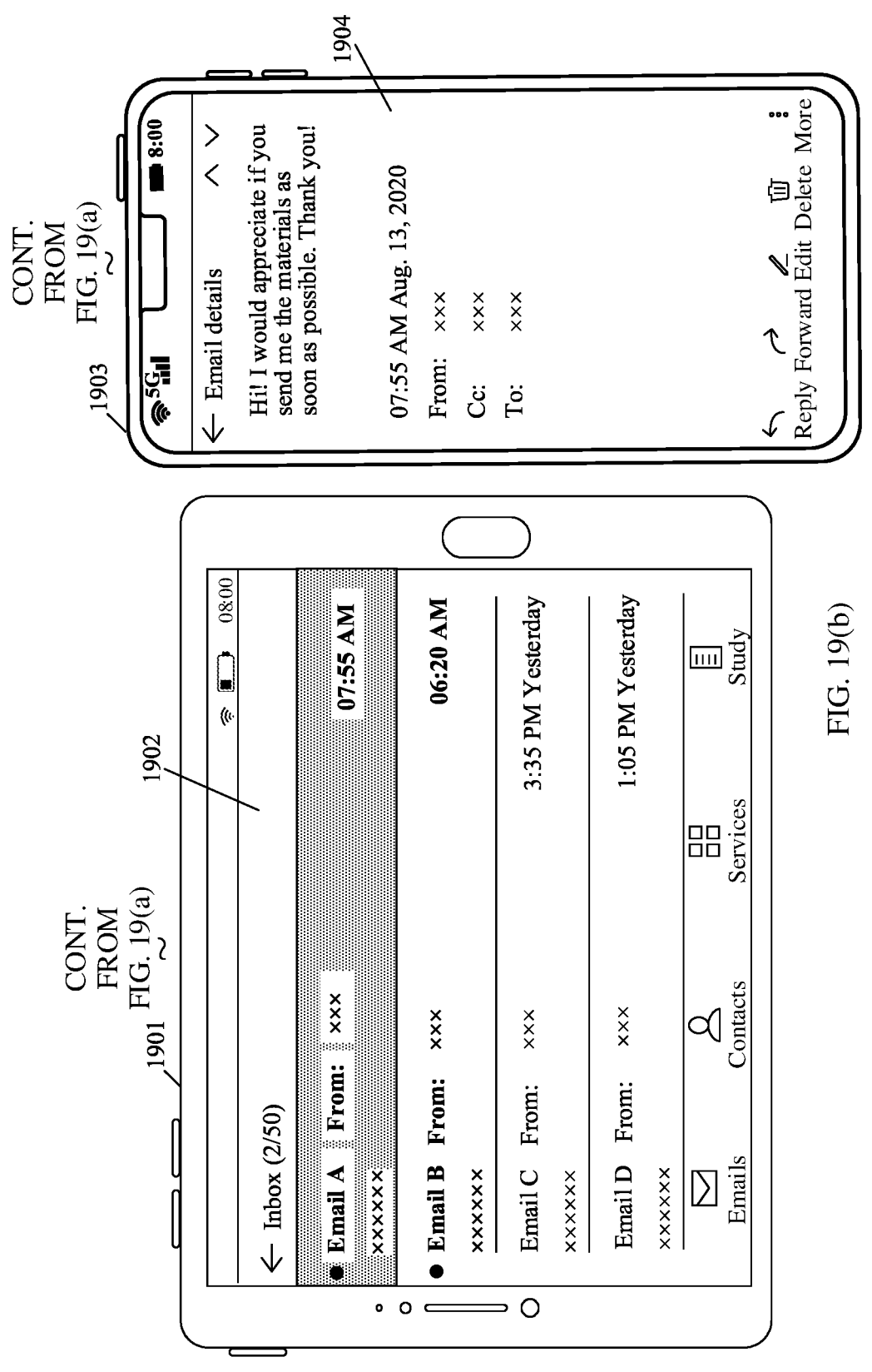

For another example, the first interface includes the email list, and the email list includes a thumbnail list of a plurality of emails (including an unread email and/or a read email), the lower-level interface information in the first interface may be a detail interface for an email (for example, an email selected by a user). Refer to FIG. 19(a) and FIG. 19(b). As shown in FIG. 19(a), it is assumed that a tablet computer 1901 (that is, the first electronic device) displays an email list interface 1902 (that is, the first interface) of an email application. The email list interface 1902 includes thumbnail information of a plurality of emails. In this case, it is assumed that a smartphone 1903 is determined to be the second electronic device (that is, the secondary device), and if a user selects (for example, taps) thumbnail information of an email A in the email list interface 1902, as shown in FIG. 19(b), the tablet computer 1901 (that is, the first electronic device) may transfer a next-level interface (that is, a detail interface 1904 for the email A) for the email A to the smartphone 1903 (that is, the second electronic device) for display, and the original email list interface 1902 (that is, the first interface) is still displayed on the tablet computer 1901 (that is, the first electronic device).

Alternatively, it is assumed that the email list interface (that is, the first interface) of the email application is displayed on the first electronic device. The email list interface includes thumbnail information of a plurality of emails. The plurality of emails include at least one unread email. In this case, if the first electronic device establishes a communication connection to the second electronic device, the second electronic device may display an email detail interface for a latest unread email by default. That is, the first electronic device transfers a next-level interface (that is, the email detail interface) for the latest unread email to the second electronic device for display, and the first electronic device still displays the original email list interface. The latest unread email in the original email list interface is marked as read. Alternatively, it is assumed that the email list interface (that is, the first interface) of the email application is displayed on the first electronic device. The email list interface includes thumbnail information of a plurality of emails. The plurality of emails include at least one unread email and at least one read email. In this case, if the first electronic device establishes a communication connection to the second electronic device, the second electronic device may display an email detail interface for a latest email by default. That is, the first electronic device transfers a next-level interface (that is, the email detail interface) for the latest email to the second electronic device for display, and the first electronic device still displays the original email list interface. If the latest email is an unread email, the latest email in the original email list interface is marked as read.

It should be noted that, in this application, if the first electronic device transfers lower-level interface information in the first interface to the second electronic device, the lower-level interface information in the first interface may be displayed on the second electronic device in full screen (as shown in FIG. 18(b) and FIG. 19(b)), or may be displayed on the second electronic device in a form of window display. If the lower-level interface information in the first interface is displayed on the second electronic device in the form of window display, in some embodiments, a shape, a size, or a position of a window may be adjusted in a customized manner (for example, implemented by dragging the window). Details are not described herein in this application.

Figure 20B:
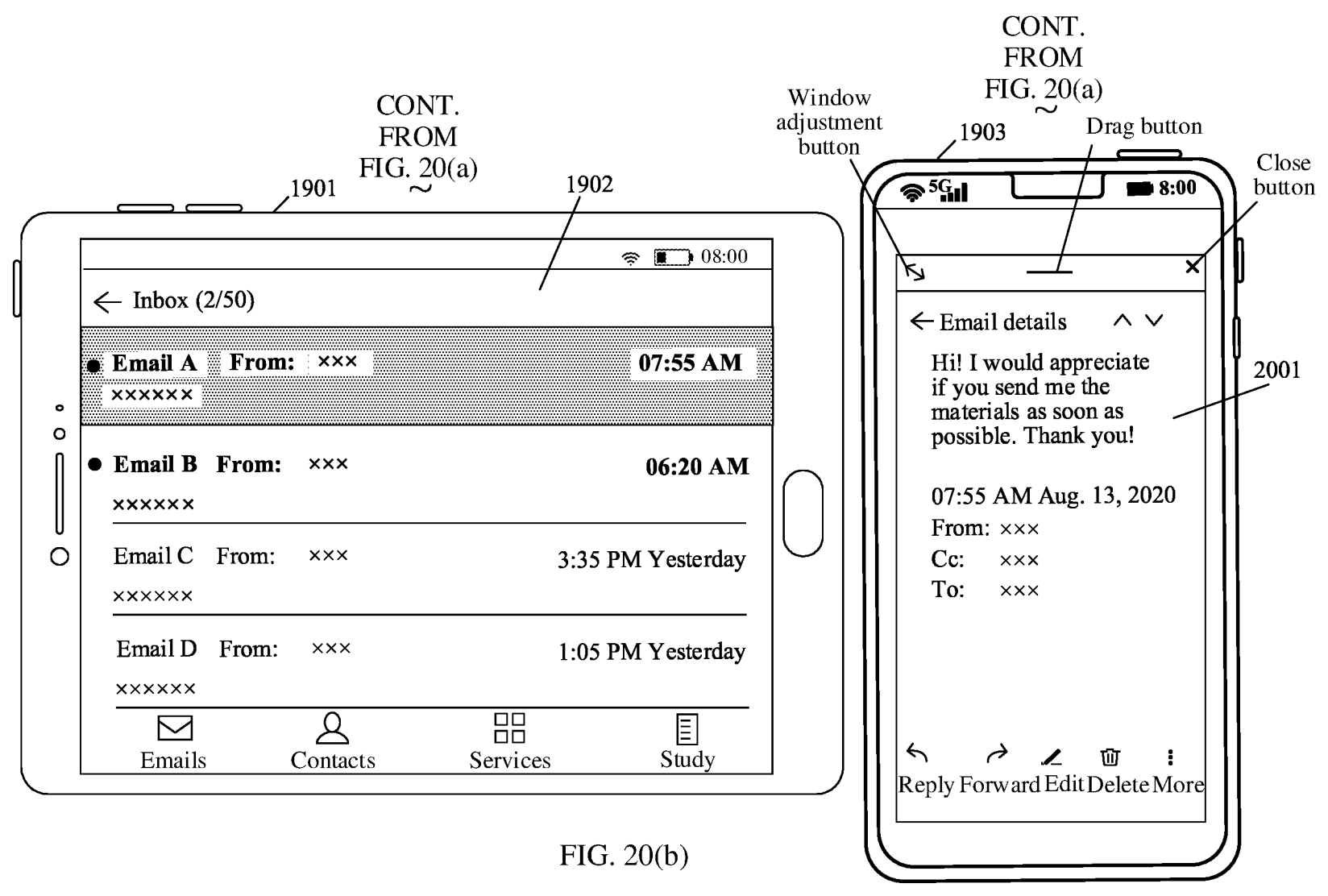

For example, a tablet computer 1901 shown in FIG. 20(a) transfers a next-level interface (that is, a detail interface 2001 for an email A) for the email A to a smartphone 1903 (that is, the second electronic device) for display. As shown in FIG. 20(b), the detail interface 2001 for the email A is displayed on the smartphone 1903 (that is, the second electronic device) in the form of window display. A window adjustment button, a close button, and a drag button are displayed in a window (for example, a window 2001 shown in FIG. 20(b)). The window adjustment button is used to adjust a shape and a size of the window 2001. The close button is used to close the window 2001 on the smartphone 1903 (that is, the second electronic device). The drag button is used to change a position of the window 2001 with a drag operation.

According to the solution of distributed interface display shown in FIG. 19(a) and FIG. 19(b) or FIG. 20(a) and FIG. 20(b), a user may browse through email thumbnail information on the tablet computer 1901 while viewing an email detail interface on the smartphone 1903. This greatly reduces complexity of operations when a user handles an email, and provides more convenience when the user handles the email.

For another example, the first interface includes the short message list. If the first electronic device establishes a communication connection to the second electronic device, and the short message list includes at least one short message, the first electronic device may send, by default, a latest short message or a short message selected by a user to the second electronic device for display, and the first electronic device still displays the original short message list. Alternatively, further, if the short message list includes at least one unread short message, the second electronic device may send, by default, a latest unread short message to the second electronic device for display, and the first electronic device still displays the original short message list, where the latest unread short message in an interface for the original short message list is marked as read.

For another example, the first interface includes the memo list. If the first electronic device establishes a communication connection to the second electronic device, and the short message list includes at least one memo note, the first electronic device may send, by default, a latest memo note or a memo note selected by a user to the second electronic device for display, the first electronic device still displays the memo list.

Manner (3): The second electronic device displays floating content or overlapped content in the first interface.

In some embodiments, the floating content or overlapped content in the first interface may be interface content corresponding to an auxiliary function, for example, an input keyboard.

Figure 21A:
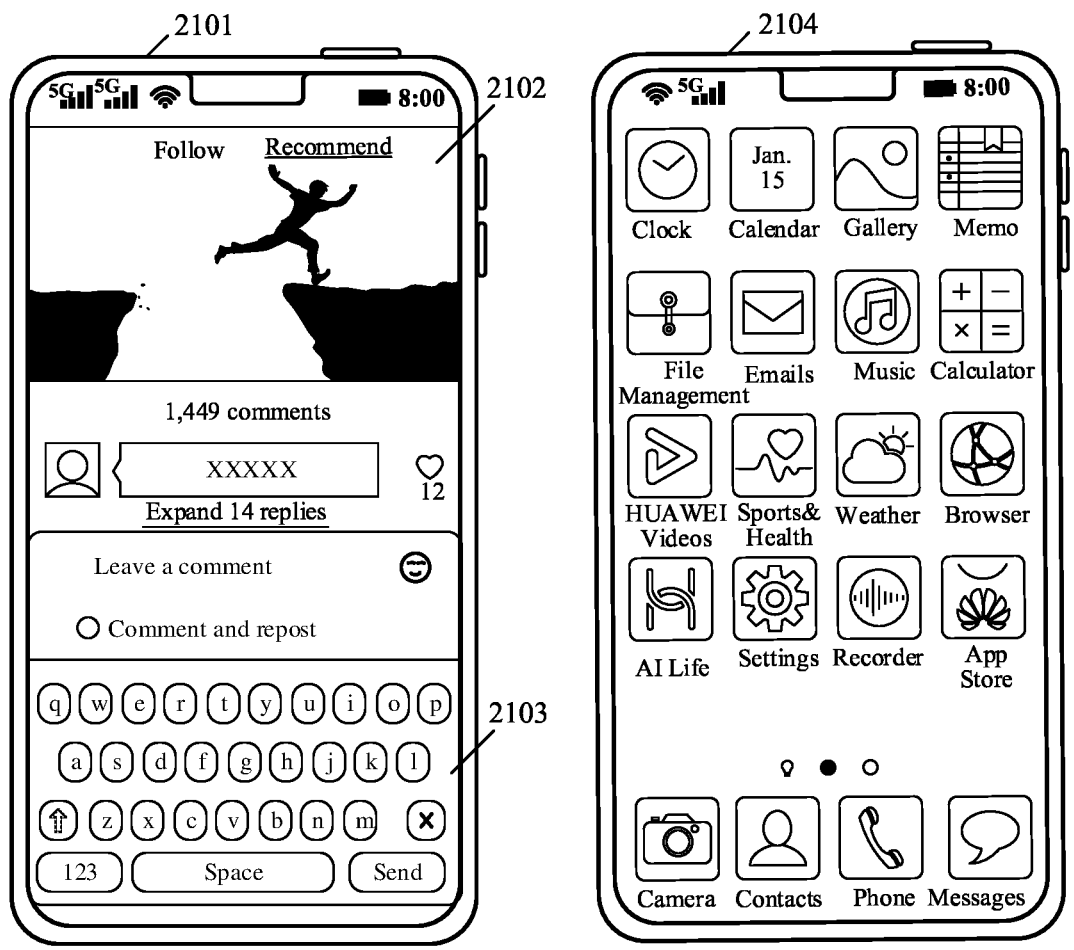
FIG. 21(a) and FIG. 21(b) are an eleventh example diagram of distributed interface display according to an embodiment of this application.
Figure 21B:
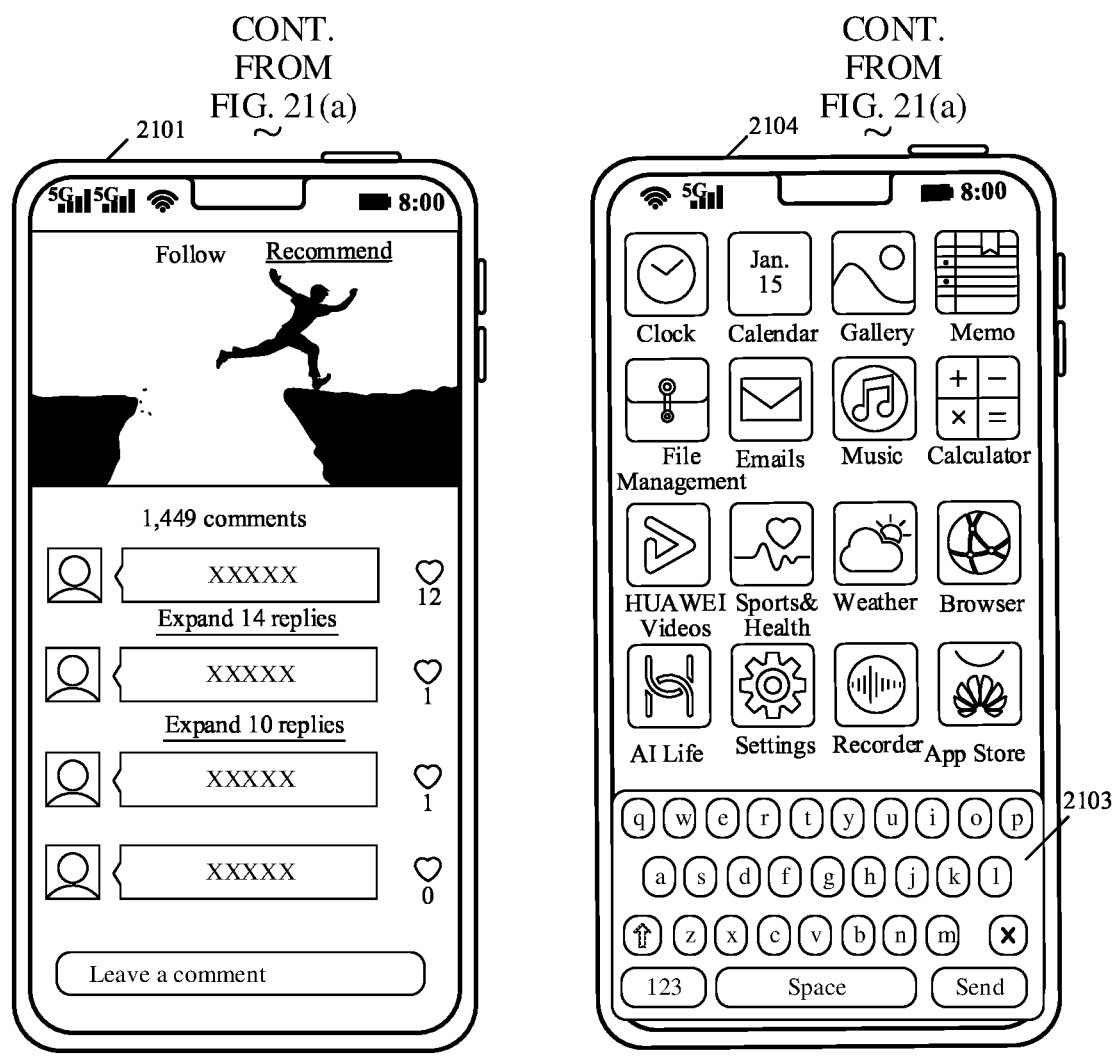

As shown in FIG. 21(a), it is assumed that a short video interface 2102 (that is, the first interface) of TikTok is displayed on a smartphone 2101 (that is, the first electronic device). The short video interface 2102 includes a video play box and a comment area. When a user posts a comment in the comment area, the application TikTok invokes an input keyboard. As shown in FIG. 21(a), the input keyboard 2103 is displayed in the short video interface 2102 in a floating or overlapping manner. In this case, it is assumed that a smartphone 2104 is determined to be the second electronic device (that is, the secondary device). As shown in FIG. 21(b), the smartphone 2101 (that is, the first electronic device) may transfer the input keyboard 2103 to the smartphone 2104 (that is, the second electronic device) for play, and remaining content related to a short video (for example, the video play box and the comment area) is still displayed on the smartphone 2101 (that is, the first electronic device).

According to the solution of distributed interface display shown in FIG. 21(a) and FIG. 21(b), a user may watch a short video and read a comment on the smartphone 2101 while posting a comment by using an input keyboard on the smartphone 2104. This provides much more convenience to the user for watching a short video and posting a comment.

In some embodiments, the second electronic device sends, in response to a received editing operation of a user on the detail interface for the latest unread electronic document, an input keyboard to the first electronic device for display, where the second electronic device displays only an editing interface for the latest unread electronic document.

For another example, in some other embodiments, the second electronic device floats or overlaps, in response to a received editing operation of a user on the detail interface for the latest unread electronic document, an input keyboard for display in an editing interface for the latest unread electronic document; and the second electronic device sends, in response to the detected touch operation with the first electronic device, the input keyboard to the first electronic device for display, where the second electronic device displays only the editing interface for the latest unread electronic document.

Figure 22A:
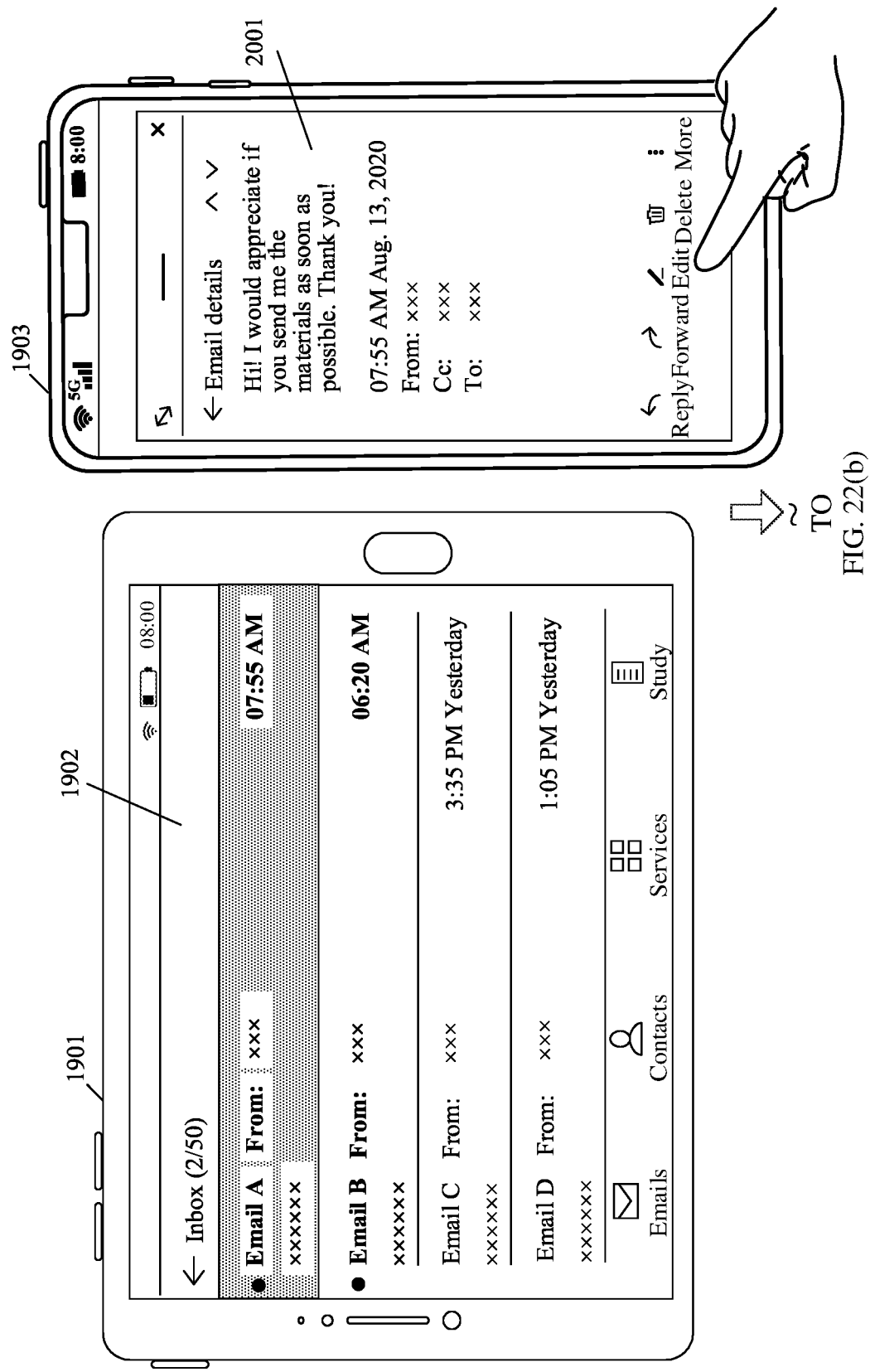
FIG. 22(a) to FIG. 22(c) are a twelfth example diagram of distributed interface display according to an embodiment of this application.

For example, it is assumed that the electronic document list is the email list or the short message list, and in this case, the second electronic device sends, in response to a received reply operation of a user to the latest unread electronic document (for example, an unread email or an unread short message), an input keyboard to the first electronic device for display, where the second electronic device displays only a reply interface for the latest unread electronic document (for example, the unread email or the unread short message). Alternatively, the second electronic device floats or overlaps, in response to a received reply operation of a user to the latest unread electronic document (for example, an unread email or an unread short message), an input keyboard for display in a reply interface for the latest unread electronic document (for example, the unread email or the unread short message); and the second electronic device sends, in response to the detected touch operation with the first electronic device, the input keyboard to the first electronic device for display, where the second electronic device displays only the reply interface for the latest unread electronic document (for example, the unread email or the unread short message). As shown in FIG. 22(a), it is assumed that a tablet computer 1901 transfers a next-level interface (that is, a detail interface 2001 for an email A) for the email A to a smartphone 1903 (that is, the second electronic device) for display, and the detail interface 2001 for the email A is displayed on the smartphone 1903 (that is, the second electronic device) in the form of window display. Further, it is assumed that a user taps an editing button below the detail interface 2001 for the email A, and in this case, the smartphone 1903 (that is, the second electronic device) sends the input keyboard to the tablet computer 1901 (that is, the first electronic device) for display.

Figure 22C:
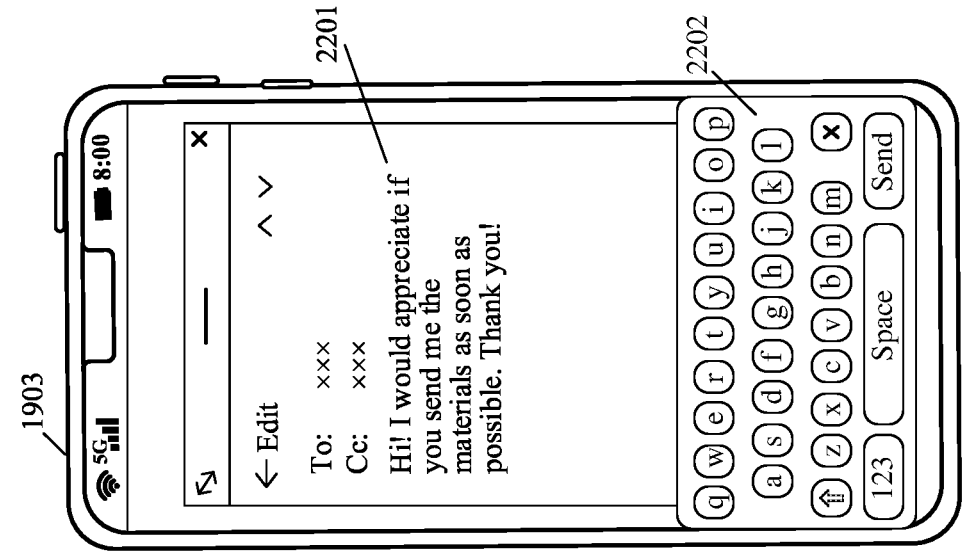
Figure 22B:
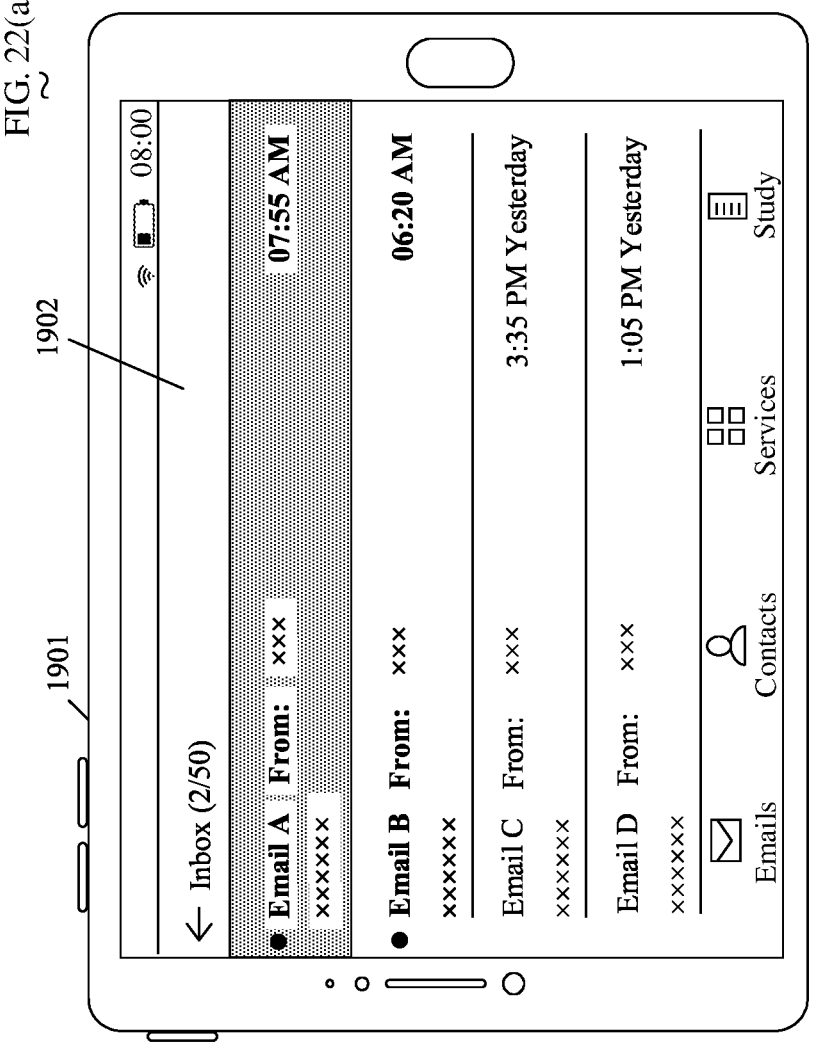

In some embodiments, it is assumed that the user taps the editing button below the detail interface 2001 for the email A, and in this case, as shown in FIG. 22(b), the smartphone 1903 (that is, the second electronic device) floats or overlaps an input keyboard 2202 for display in an editing interface 2201 for the email A.

Further, it is assumed that when the tablet computer 1901 and the smartphone 1903 are in a status as shown in FIG. 22(b), the tablet computer 1901 and/or the smartphone 1903 receive/receives a first operation (for example, "tap") of a user, and in this case, as shown in FIG. 22(c), the smartphone 1903 sends the input keyboard 2202 to the tablet computer 1901 for display, and the smartphone 1903 still displays the editing interface 2201 for the email A.

For another example, it is assumed that the first electronic device transfers a lower-level interface (that is, a short message detail interface) for a short message (for example, a default short message, a latest unread short message, or a short message selected by a user) to the second electronic device for display. Further, it is assumed that the user taps a reply button in the short message detail interface, and in this case, the second electronic device sends an input keyboard to the first electronic device for display. The second electronic device displays a short message reply interface.

In some embodiments, it is assumed that the user taps the reply button in the short message detail interface, and in this case, the second electronic device floats or overlaps an input keyboard for display in a short message editing interface. Further, it is assumed that the second electronic device receives the first operation (for example, a touch operation with the first electronic device) of the user, and in this case, the second electronic device sends the input keyboard to the first electronic device for display, and the second electronic device still displays the short message reply interface.

For another example, it is assumed that the first electronic device transfers a lower-level interface (that is, a memo note detail interface) for a memo note (for example, a latest memo note or a memo note selected by a user) to the second electronic device for display. Further, it is assumed that the user taps a reply button in the memo note detail interface, and in this case, the second electronic device sends an input keyboard to the first electronic device for display. The second electronic device displays a memo note editing interface.

In some embodiments, it is assumed that the user taps the editing button in the memo note detail interface, and in this case, the second electronic device floats or overlaps an input keyboard for display in the memo note editing interface. Further, it is assumed that the second electronic device receives the first operation (for example, a touch operation with the first electronic device) of the user, and in this case, the second electronic device sends the input keyboard to the first electronic device for display, and the second electronic device still displays the memo note editing interface.

It should be noted that, in this application, floating content or overlapped content (for example, the input keyboard 2202 shown in FIG. 22(*c*)) in the first interface that is transferred may be displayed on the tablet computer 1901 in a landscape orientation, or may be displayed on the tablet computer 1901 in a portrait orientation. This is not limited in this application.

According to the solution of distributed interface display shown in FIG. 22(*a*) to FIG. 22(*c*), a user may view an email detail interface on the smartphone 1903 while editing an email by using an input keyboard on the tablet computer 1901. This provides much more convenience when a user handles an email.

Manner (4): The second electronic device displays a task interface in a function area selected by a user in the first interface.

For example, in some other embodiments of this application, based on a function area selection operation of the user in the first interface, the first electronic device may determine a first function area, and determine a task interface to be transferred from the first electronic device to the second electronic device. For example, the first electronic device may determine a function area including a touchscreen area in which a user selection operation is received, and determine all task interfaces in the function area.

In some examples, the tablet computer 1901 may determine, according to a device orientation of the tablet computer 1901, whether to display the input keyboard 2202 in the landscape orientation or display the input keyboard 2202 in the portrait orientation. As shown in FIG. 22(*c*), the device orientation of the tablet computer 1901 is the landscape orientation, and the tablet computer 1901 displays the input keyboard 2202 in the landscape orientation. It is assumed that the device orientation of the tablet computer 1901 is the portrait orientation, the tablet computer 1901 may display the input keyboard in the portrait orientation.

Figure 23A:
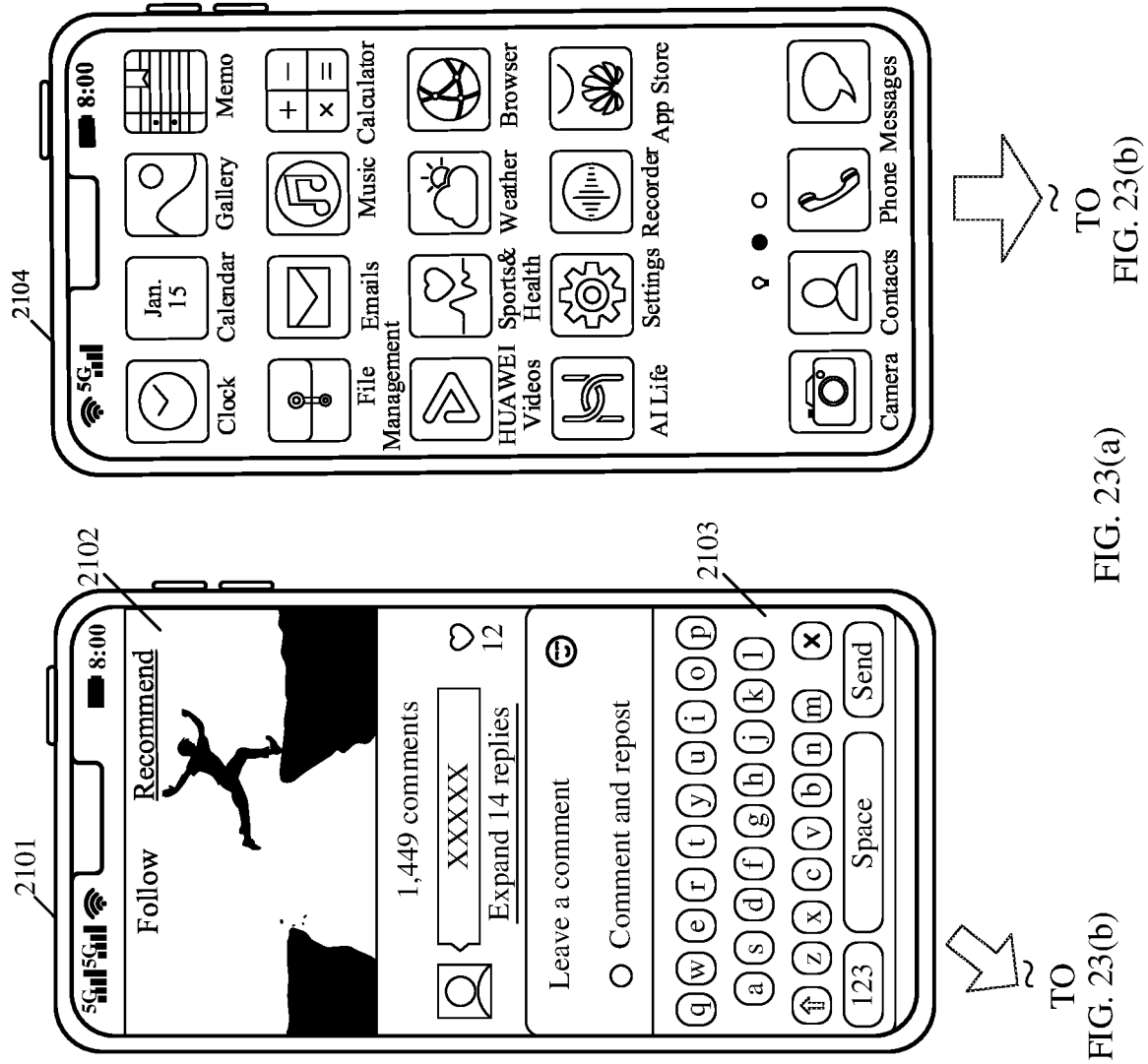

For another example, when the smartphone 2101 (that is, the first electronic device) shown in FIG. 23(*a*) transfers, to the smartphone 2104, the input keyboard 2103 displayed in the short video interface 2102 (that is, the first interface) in a floating or overlapping manner, the smartphone 2104 may determine, according to a device orientation of the smartphone 2104, to display the input keyboard transferred from the smartphone 2101 in the landscape orientation. As shown in FIG. 23(*b*), the smartphone 2104 displays the input keyboard 2301 in the landscape orientation, and remaining short video-related content (such as a video play box and a comment area) is still displayed on the smartphone 2101 (that is, the first electronic device).

According to the solution of distributed interface display shown in FIG. 23(*a*) and FIG. 23(*b*), a user may watch a short video and read a comment on the smartphone 2101 while posting a comment by using an input keyboard on the smartphone 2104. This provides much more convenience to the user for watching a short video and posting a comment.

In some embodiments, after content displayed on the first electronic device is displayed on the first electronic device and the second electronic device in a distributed collaborative manner, if there is one remaining task interface (for example, a task interface in a second function area) on the first electronic device, the first electronic device may display the remaining task interface in full screen. Alternatively, the first electronic device may display the remaining task interface in a window of a preset size. Alternatively, the first electronic device may display the interface at an optimal display ratio for the remaining task interface. This is not limited in this application.

In some other embodiments, after content displayed on the first electronic device is displayed on the first electronic device and the second electronic device in a distributed collaborative manner, if there are two remaining task interfaces (for example, a task interface in a second function area and a task interface in a third function area) on the first electronic device, the two task interfaces may be displayed on left-right split screens, or may be displayed on top-bottom split screens. This is not limited in this application. For example, as shown in FIG. 15B(2), the remaining interfaces, that is, the short message interface and the memo interface, after transfer display of the smartphone A are displayed on the smartphone A on top-bottom split screens.

In some embodiments, the first electronic device may determine a split-screen mode for a remaining content interface (for example, the task interface in the second function area and the task interface in the third function area) according to a device orientation. For example, if the first electronic device is in the portrait orientation, the remaining content interface is displayed on top-bottom split screens (as shown in FIG. 15B(2)); or if the first electronic device is in the landscape orientation, the remaining content interface is displayed on left-right split screens. In embodiments of this application, an interface transferred from the first electronic device to the second electronic device may be displayed on the second electronic device in the landscape orientation, or may be displayed on the second interface in the portrait orientation. This is not limited in this application. For example, as shown in FIG. 15B(2), the video interface transferred from the smartphone A to the smartphone B is displayed on the smartphone B in the portrait orientation. A window adjustment button, a close button, and a drag button are displayed in a video window. The window adjustment button is used to adjust a shape and a size of the video window. The close button is used to close the video window. The drag button is used to change a position of the video window with a drag operation.

In some embodiments, the second electronic device may determine, according to a device orientation, an interface transferred from the first electronic device. For example, if the second electronic device is in the portrait orientation, the interface transferred from the first electronic device is displayed in the portrait orientation (as shown in FIG. 15B(2)); or if the second electronic device is in the landscape orientation, the interface transferred from the first electronic device is displayed in the landscape orientation (as shown in FIG. 15C(2)).

In some other embodiments, after content displayed on the first electronic device is displayed on the first electronic device and the second electronic device in a distributed collaborative manner, if there are more than two remaining task interfaces (for example, a task interface in a second function area and a task interface in a third function area) on the first electronic device, the first electronic device may design a layout on the display of the first electronic device according to a preset relative position relationship. For example, the first electronic device may determine (for example, determine based on a quantity, attributes, functions, and the like of task interfaces) an appropriate framework template from a plurality of preset framework templates on the first electronic device to use, for displaying the plurality of task interfaces on the display of the first electronic device. Similarly, if more than two task interfaces (that is, a plurality of task interfaces) are displayed on the second electronic device, the second electronic device may determine (for example, determine based on a quantity, attributes, functions, and the like of task interfaces) an appropriate framework template from a plurality of preset framework templates on the second electronic device to use, for displaying the plurality of task interfaces on a display of the second electronic device.

It should be noted that, in the foregoing embodiment, an example in which the first electronic device and one second electronic device display multi-task interfaces in a distributed manner is used. A quantity of second electronic devices that display the multi-task interfaces with the first electronic device in a collaborative manner is not limited in this application.

For example, an example of a distributed collaborative scenario in which the first electronic device is a laptop computer, the second electronic devices are a tablet computer and a smartphone, and the laptop computer displays the electronic classroom shown in FIG. 4(a) is used. In response to the operation of the user of tapping and confirming the option after the operation that the user selects "My tablet computer" from the second electronic device list in the option box 502 by moving the mouse cursor, the operation that the user selects collaborative multi-task display, and the operation of selecting "My tablet computer" for audio output, the laptop computer triggers distributed collaborative multi-task display. For example, the laptop computer transfers the memo interface to the tablet computer for display and transfers the class communication group interface to the smartphone for display, and the laptop computer displays the live video interface and the electronic lecture note interface.

According to the distributed interface display method provided in embodiments of this application, content displayed on one electronic device (for example, the first electronic device) may be displayed on a plurality of different electronic devices (for example, the first electronic device and the second electronic device) in a distributed collaborative manner, so that a user can conveniently handle different tasks by using the plurality of electronic devices, thereby facilitating a user operation. In addition, problems such as incomplete display of a task interface and operation inconvenience when there are a plurality of tasks on one display can be resolved.

In some embodiments, the first electronic device and the second electronic device display a window in a task interface, or a task interface may accept an adaptability adjustment. The adaptability adjustment is performed to adapt to a display size of a device and a display effect of the task interface. The adaptability adjustment may include, but is not limited to, an automatic adjustment of the device and an adjustment of the device with a received operation (for example, a drag operation) of the user. The adaptability may include but is not limited to a stretching capability, a scaling capability, a hiding capability, a line wrapping capability, an equalization capability, a proportion capability, and an extension capability.

The stretching capability refers to a capability of changing a shape and a size of a window/interface, for example, a capability of changing the shape and the size of the window/interface by a device adaptive adjustment or with an operation of a user of stretching the window/interface. The stretching capability may include a horizontal stretching capability and a vertical stretching capability. The scaling capability refers to a capability of changing a size of a window/interface without changing a shape of the window/interface, that is, a capability of changing the size of the window/interface by a device adaptive adjustment or with an operation of a user of dragging a corner of the window/interface. The scaling capability may include a scaling-up capability and a scaling-down capability. The hiding capability refers to a capability of adjusting a form of displaying a window/interface. The hiding capability may include capabilities of hiding a window/interface and showing a window/interface, for example, a capability of hiding the window/interface or showing the window/interface by a device adaptive adjustment or with a selection operation of a user. The line wrapping capability refers to a capability of adjusting display of a plurality of windows/interfaces from one-line to multi-line, for example, a capability of adjusting display of the plurality of windows/interfaces from one-line to multi-line by a device adaptive adjustment or with an operation of a user of dragging a window/interface. The equalization capability refers to a capability of displaying a plurality of windows/interfaces in equalized function areas, for example, a capability of displaying the plurality of windows/interfaces in the equalized function areas by a device adaptive adjustment or with an operation of a user of selecting an equalization option. The proportion capability refers to a capability of adjusting ratios of a plurality of windows/interfaces in a function area of a display of a device to the display, for example, a capability of adjusting the ratios of the plurality of windows/interfaces in the function area of the display of the device to the display by a device adaptive adjustment or according to a ratio input by a user. The extension capability refers to a capability of adjusting display of a plurality of windows/interfaces from multi-line (for example, two lines) to one-line, for example, a capability of adjusting display of the plurality of windows/interfaces from multi-line (for example, the two lines) to one-line by a device adaptive adjustment or with an operation of a user of dragging a window/interface.

Figure 24:
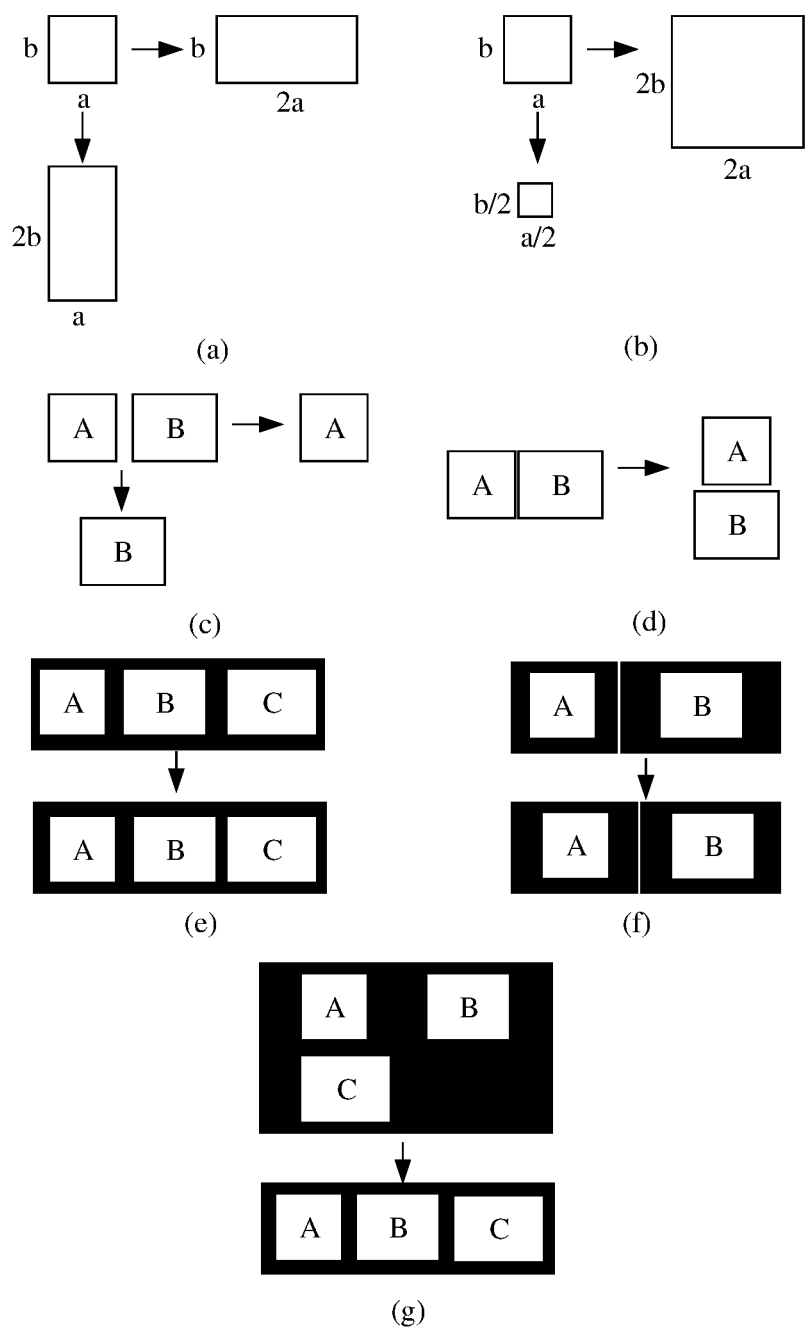
FIG. 24 is an example diagram of several adaptabilities according to an embodiment of this application.

Refer to FIG. 24. FIG. 24 is an example diagram of several adaptabilities according to an embodiment of this application. (a) in FIG. 24 shows the stretching capability, (b) in FIG. 24 shows the scaling capability, (c) in FIG. 24 shows the hiding capability, (d) in FIG. 24 shows the line wrapping capability, (e) in FIG. 24 shows the equalization capability, (f) in FIG. 24 shows a proportion capability, and (g) in FIG. 24 shows an extension capability. The several adaptabilities shown in FIG. 24 are merely examples. The adaptabilities in this embodiment of this application may further include another window/interface adjusting capability for adapting to a display size of a device and a display effect of the task interface.

In this embodiment of this application, a plurality of task interfaces may be rendered together on the virtual screen of the first electronic device, and sent to the first electronic device for display. For example, the first electronic device renders each of the different task interfaces into different function areas of the virtual screen according to a preset framework template.

In embodiments of this application, the first electronic device may determine the first function area from the plurality of function areas by using any one of the following methods: The first function area is autonomously determined based on task attributes corresponding to the plurality of task interfaces; the first function area is determined according to a selection operation of a user on one or more task interfaces, where the one or more task interfaces are in the first function area; the first function area is determined autonomously according to functions implemented by the plurality of function areas; and the first function area is determined based on a function area selection operation of a user.

In some embodiments of this application, according to a task attribute of content in a function area of the first interface, the first electronic device determines the first function area, and determines a task interface to be transferred from the first electronic device to the second electronic device autonomously. The task interface is a task interface in the function area determined by the first electronic device. For example, a key task interface or a main task interface may be preferentially displayed on a larger-screen device; and a minor task interface may be preferentially displayed on a smaller-screen device. The key task interface or the main task interface may be understood as a task interface to which a user pays more attention or a core task interface in multi-task interfaces displayed on the first electronic device, for example, the electronic lecture note interface and the live video interface shown in FIG. 4(a). For another example, it is assumed that the second electronic device is the larger-screen device (for example, a television or a laptop computer), the first electronic device may send content (for example, a video play interface in a video function area) suitable for being displayed on a larger-screen device to the second electronic device for display.

In some other embodiments of this application, based on a function area selection operation (for example, a tap operation or a drag operation) of a user in the first interface, the first electronic device determines the first function area, and determines a task interface to be transferred from the first electronic device to the second electronic device. The task interface is a task interface in a function area selected by the user.

Figure 25:
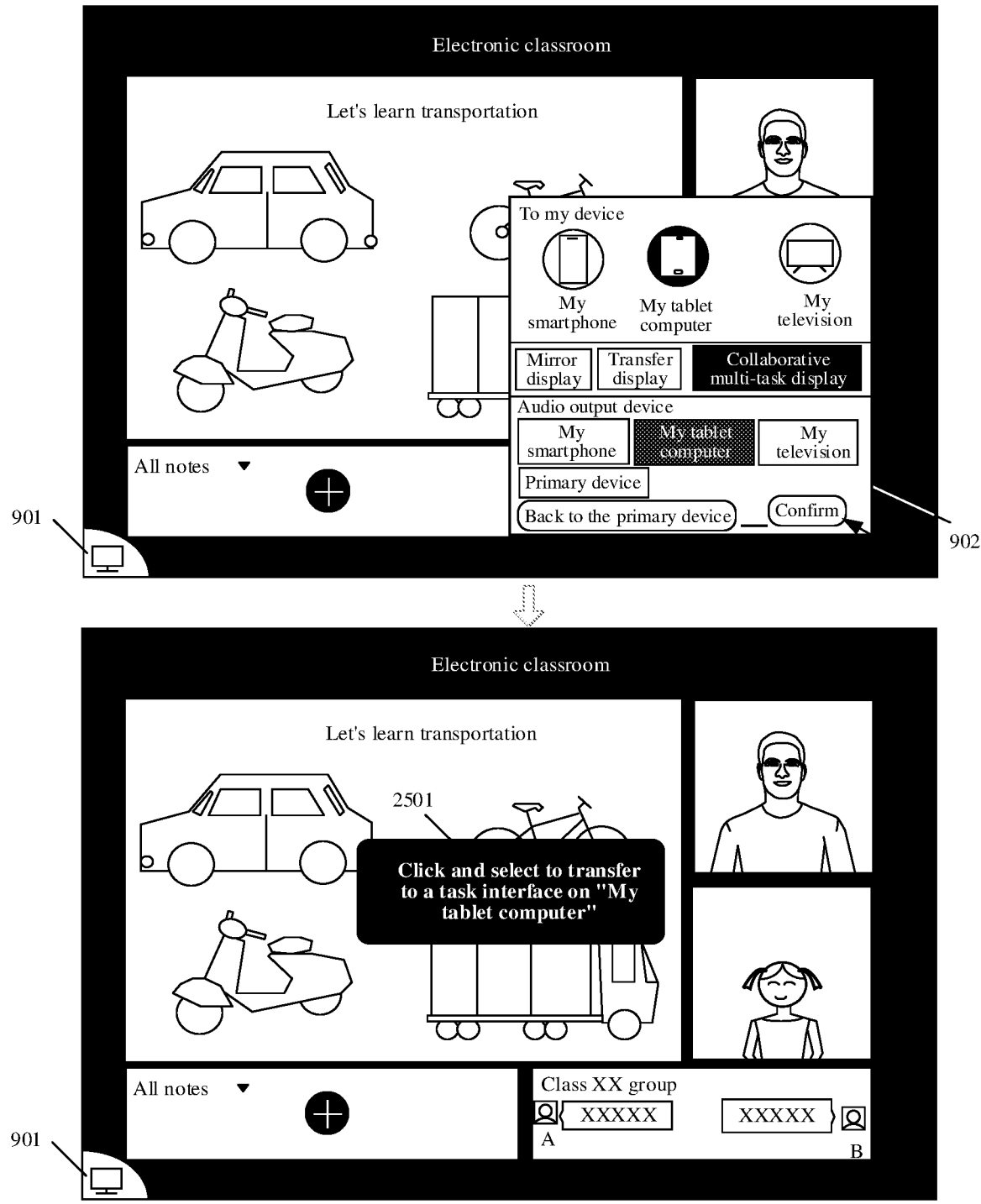
FIG. 25 is a schematic diagram of selecting a distributed interface according to an embodiment of this application.

For example, in response to an operation that the user selects an interface in the multi-task interfaces based on a prompt on the first electronic device, the first electronic device transfers the task interface selected by the user to the second electronic device for display. For example, as shown in FIG. 25, the first electronic device may display, in response to an operation of a user of tapping and confirming an option after an operation that the user selects "My tablet computer" from a second electronic device list in an option box 902, an operation that the user selects collaborative multi-task display, and an operation of selecting "My tablet computer" for audio output, a prompt box 2501 shown in FIG. 25 that is used to prompt the user to select, in the multi-task interfaces with a tap operation, a task interface to be transferred to a second electronic device (that is, "My Tablet Computer").

In some embodiments, when the first electronic device determines content to be transferred to the second electronic device, the first electronic device may transfer the corresponding content to the second electronic device, and remaining content (for example, a remaining task interface) is re-rendered onto the virtual screen of the first electronic device and re-sent to the first electronic device for display. For example, the first electronic device re-renders the remaining task interface to different areas of the virtual screen according to a re-determined framework template.

In some embodiments, during distributed collaborative display of multi-task interfaces on the first electronic device and the second electronic device, the first electronic device may withdraw, at any time, the content transferred to the second electronic device. For example, the first electronic device may respond to a user (that is, a task interface transferred to the second electronic device).

Figure 26A:
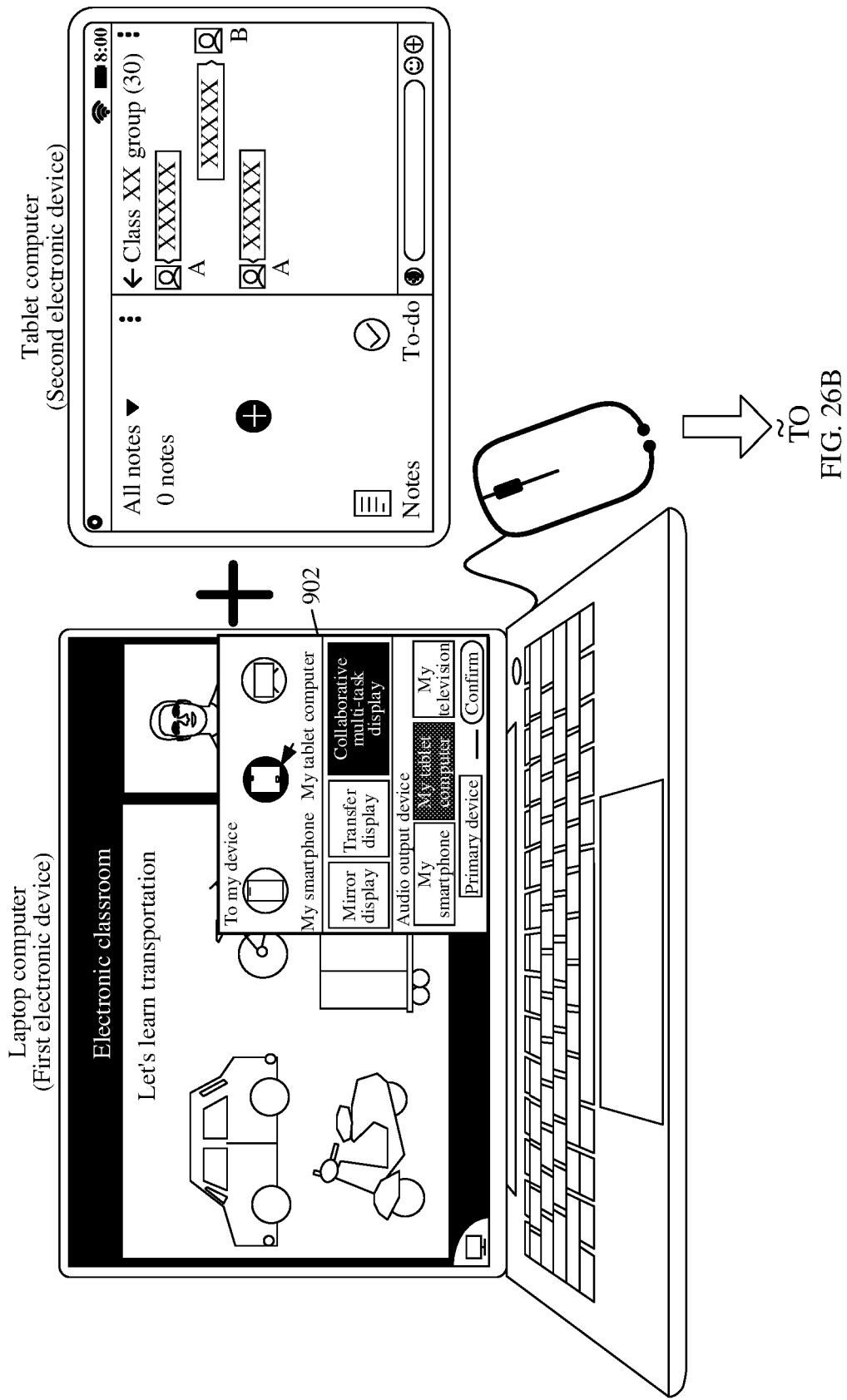
FIG. 26A and FIG. 26B are a schematic diagram of withdrawing a distributed interface according to an embodiment of this application.
Figure 26B:
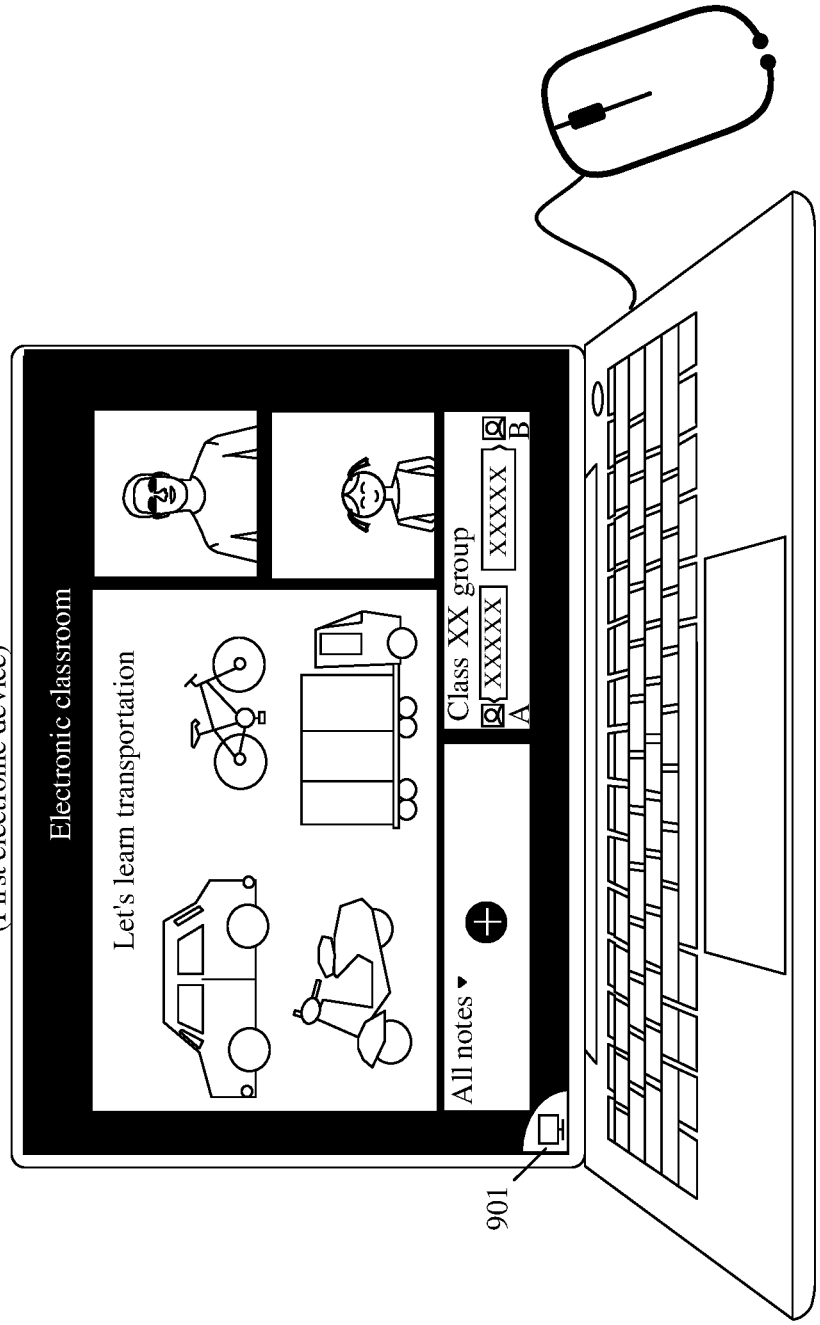

For example, the user may withdraw, by tapping a corresponding device button in the option box 902 shown in FIG. 9(c) or FIG. 9(c), the task interface transferred to the second electronic device. As shown in FIG. 26A and FIG. 26B, it is assumed that a laptop computer and a tablet computer display multi-task interfaces in a distributed collaborative manner, where the laptop computer displays a live video interface, an electronic lecture note interface, and a class communication group interface, and the tablet computer displays a memo interface. In response to an operation that the user taps "My tablet computer" in the option box 502 displayed on the laptop computer again, the laptop computer withdraws the memo interface transferred to the tablet computer. After the laptop computer withdraws the memo interface transferred to the tablet computer, the laptop computer displays the live video interface, the electronic lecture note interface, the class communication group interface, and the memo interface (that is, a first interface).

Figure 27A:
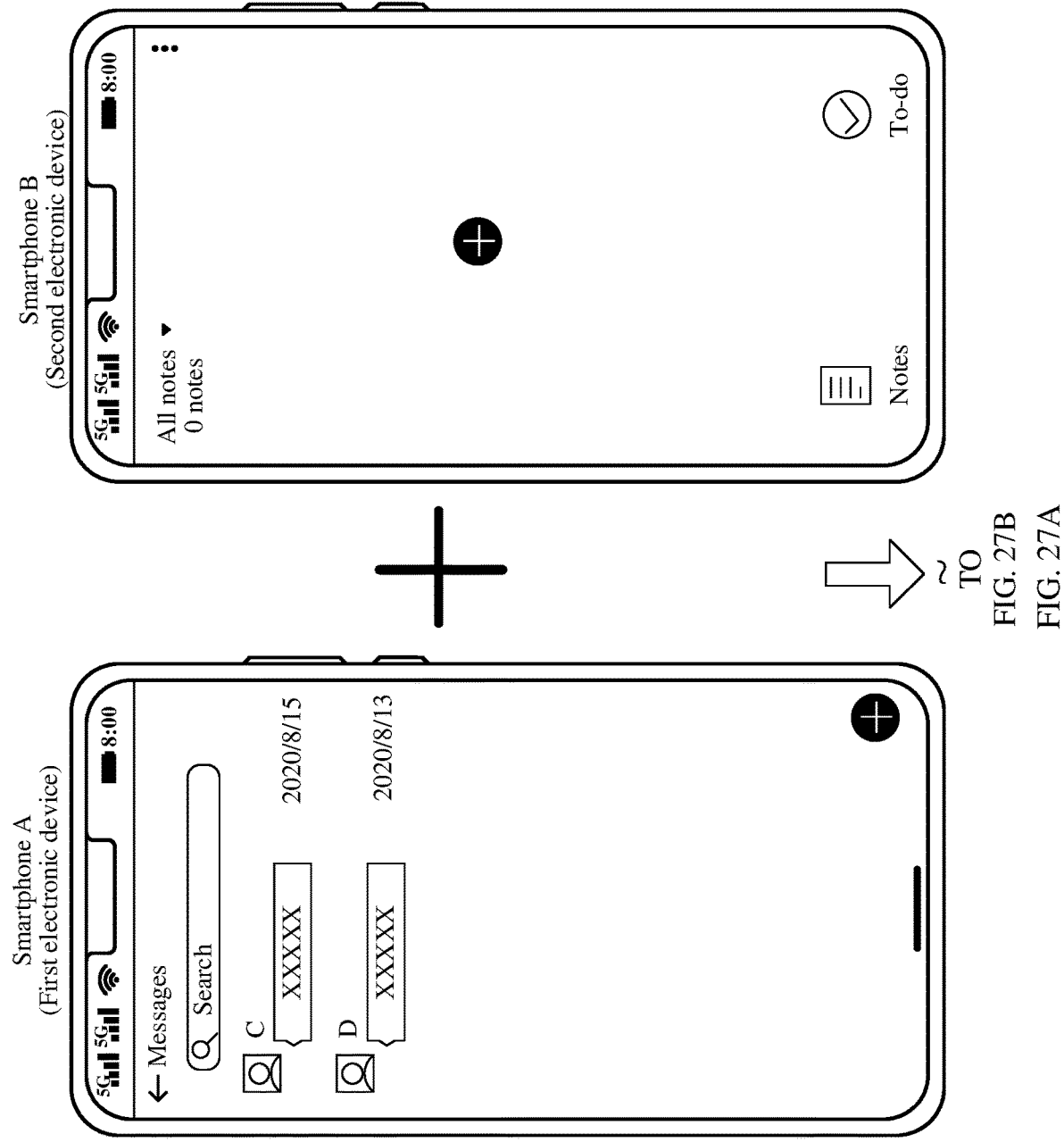
Figure 27C:
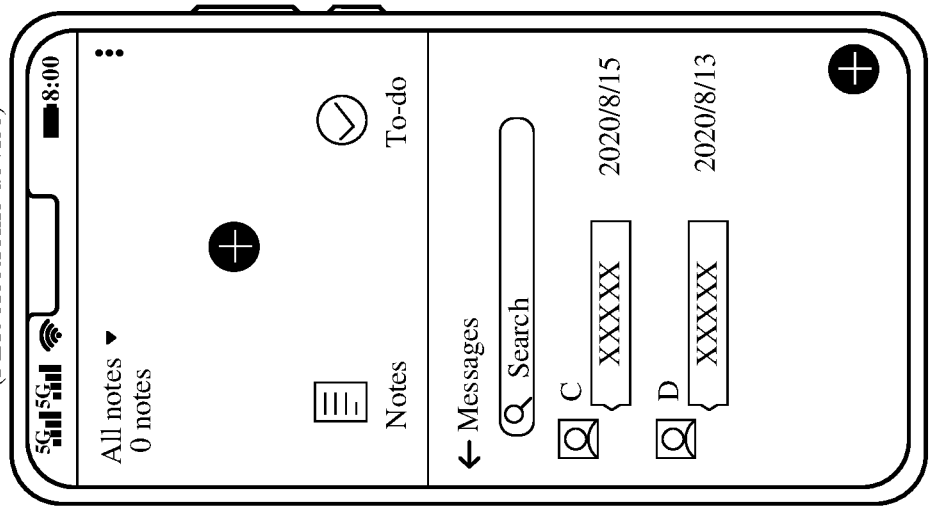

For another example, the user may tap "Back to the primary device" in the option box 902 shown in FIG. 9(b)(2) or FIG. 9(c), to withdraw the task interface transferred to the second electronic device. As shown in FIG. 27A to FIG. 27C, it is assumed that a smartphone A and a smartphone B display multi-task interfaces in a distributed collaborative manner, where the smartphone A displays a short message interface, and the smartphone B displays a memo interface. The smartphone A displays the option box 902 in response to an operation that a user taps a button, a folding key 903 for hiding the option box, on the smartphone A. In response to the tapping of the user on "Back to the primary device" in the option box 902, the smartphone A withdraws the memo interface transferred to the smartphone B. After the smartphone A withdraws the memo interface transferred to the smartphone B, the smartphone A displays the short message interface and the memo interface (that is, a first interface).

It can be understood that, to implement a function in any one of the foregoing embodiments, an electronic device (for example, the first electronic device or the second electronic device) includes corresponding hardware structures and/or software modules for performing the function. A person skilled in the art should be easily aware that units, algorithms, and steps in the examples described with reference to embodiments disclosed in this specification can be implemented in a form of hardware or a combination of hardware and computer software in this application. Whether a function is performed by hardware or hardware driven by computer software depends on a particular application and a design constraint condition of the technical solutions. A person skilled in the art may use different methods to implement the described functions for each particular application, but it should not be considered that the implementation goes beyond the scope of this application.

In embodiments of this application, functional modules of the electronic device (for example, the first electronic device or the second electronic device) may be divided. For example, each functional module may be obtained by division based on each corresponding function, or two or more functions may be integrated into one processing module. The integrated module may be implemented in a form of hardware, or may be implemented in a form of a software functional module. It should be noted that, in embodiments of this application, the division into the modules is an example and is merely logical function division, and may be other division in an actual implementation.

Figure 28:
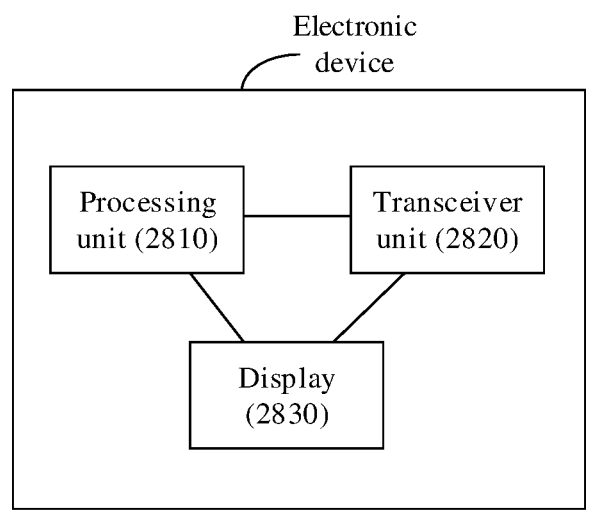
FIG. 28 is a block diagram of a structure of an electronic device according to an embodiment of this application.

For example, a case in which division of various functional modules is implemented by integration is shown in FIG. 28 that is a schematic diagram of a structure of an electronic device according to an embodiment of this application. The electronic device may be the first electronic device or the second electronic device. The electronic device may include a processing unit 2810, a transceiver unit 2820, and a display 2830.

When the electronic device is the first electronic device, the display unit 2830 is configured to support the first electronic device to display a first interface of a first application that includes at least a first function area and a second function area. The processing unit 2810 is configured to support the first electronic device to send, by using the transceiver unit 2820, in response to a detected touch operation when the touch operation with the second electronic device is detected, content in the first function area to the second electronic device for display. The transceiver unit 2820 is configured to send the content in the first function area to the second electronic device for display. After the transceiver unit 2820 sends the content in the first function area to the second electronic device for display, the first electronic device displays a second interface of the first application, where the second interface includes the second function area but does not include the first function area.

Alternatively, when the electronic device is the first electronic device, the display unit 2830 is configured to support the first electronic device to display the first interface including an electronic document list. The electronic document list includes at least one unread electronic document and at least one read electronic document. The processing unit 2810 is configured to support the first electronic device to detect, at the first electronic device, a touch operation with the second electronic device, and determine that the second electronic device is a secondary device of the first electronic device; and search for a latest unread electronic document in the at least one unread electronic document, and display a detail interface for the latest unread electronic document on the second electronic device. The transceiver unit 2820 is configured to support the first electronic device to send the detail interface for the latest unread electronic document to the second electronic device for display. After the transceiver unit 2820 sends the detail interface for the latest unread electronic document to the second electronic device for display, the display unit 2830 continues displaying the electronic document list, where the latest unread electronic document in the electronic document list is marked as read.

It should be noted that the transceiver unit 2820 may include a radio frequency circuit. Specifically, the electronic device may receive and send a radio signal by using the radio frequency circuit. The radio frequency circuit usually includes, but is not limited to, an antenna, at least one amplifier, a transceiver, a coupler, a low noise amplifier, a duplexer, and the like. In addition, the radio frequency circuit may alternatively communicate with another device through wireless communication. The wireless communication may use any communication standard or protocol, including but not limited to a global system for mobile communication, a general packet radio service, code division multiple access, wideband code division multiple access, long term evolution, an email, a short messaging service, and the like.

Figure 29:
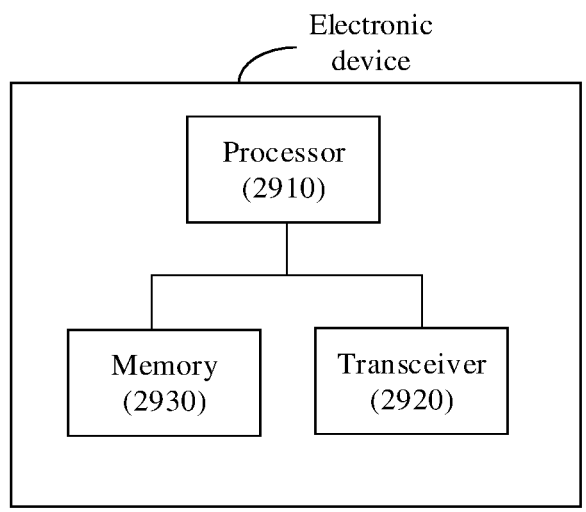
FIG. 29 is a schematic diagram of a structure of an electronic device according to an embodiment of this application.

It should be understood that each module of the electronic device may be implemented in a form of software and/or hardware. This is not specifically limited. In other words, the electronic device is presented in a form of functional modules. The "module" herein may be an application-specific integrated circuit ASIC, a circuit, a processor that executes one or more software or firmware programs, a memory, an integrated logic circuit, and/or another component capable of providing the foregoing functions. Optionally, in a simple embodiment, a person skilled in the art may figure out that the electronic device may be in a form shown in FIG. 29. The processing unit 2810 may be implemented by a processor 2910 shown in FIG. 29. The transceiver unit 2820 may be implemented by a transceiver 2920 shown in FIG. 29. Specifically, the processor is implemented by executing a computer program stored in the memory. Optionally, the memory is a storage unit in a chip, for example, a register or a cache. The storage unit may alternatively be a storage unit that is in a computer device and that is located outside a chip, for example, a memory 2930 shown in FIG. 29.

In an optional implementation, when data transmission is implemented by using software, all or some of the software may be implemented in a form of a computer program product. The computer program product includes one or more computer instructions. When the computer program instructions are loaded and executed on a computer, the procedures or functions in embodiments of this application are all or partially implemented. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, using a coaxial cable, an optical fiber, or a digital subscriber line (DSL)) or wireless (for example, via infrared, radio, or microwaves) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive, Solid State-Drive (SSD)), or the like.

The steps in the method or algorithm described in combination with embodiments of this application may be implemented by hardware, or may be implemented by a processor executing software instructions. The software instructions may include a corresponding software module. The software module may be stored in a RAM, a flash memory, a ROM, an EPROM, an EEPROM, a register, a hard disk, a removable hard disk, a CD-ROM, or a storage medium in any other form well-known in the art. For example, a storage medium is coupled to a processor, so that the processor can read information from the storage medium and write information into the storage medium. Clearly, the storage medium may be a component of the processor. The processor and the storage medium may be disposed in an ASIC. In addition, the ASIC may be disposed in an electronic device. Clearly, the processor and the storage medium may exist in the electronic device as discrete components.

According to the foregoing descriptions of the implementations, a person skilled in the art may clearly understand that for the purpose of convenient and brief description, division into the foregoing functional modules is merely used as an example for description. In actual application, the foregoing functions can be allocated to different functional modules for implementation based on a requirement. In other words, an inner structure of an apparatus is divided into different functional modules to implement all or some of the functions described above.

In an optional implementation, this application provides a communication system. The communication system includes a first electronic device and a second electronic device. The first electronic device and the second electronic device are configured to implement the method in any one of the possible implementations provided in this application.

In an optional implementation, this application provides a chip system. The chip system includes a processor and a memory. The memory stores instructions. When the instructions are executed by the processor, the method in any one of the possible implementations provided in this application is implemented. The chip system may include a chip, or may include a chip and another discrete device.

In the several embodiments provided in this application, it should be understood that the disclosed electronic device and method may be implemented in other manners. For example, the described apparatus embodiment is merely an example. For example, division into the modules or units is merely logical function division and may be other division in actual implementation. For example, a plurality of units or components may be combined or integrated into another apparatus, or some features may be ignored or not performed. In addition, the displayed or discussed mutual coupling or direct coupling or communication connections may be implemented through some interfaces. The indirect coupling or communication connections between the apparatuses or units may be implemented in electrical, mechanical, or another form.

The units described as separate components may or may not be physically separate, and components displayed as units may be one or more physical units, that is, may be located in one place, or may be distributed over a plurality of different places. All or some of the units may be selected based on an actual requirement, to achieve the objectives of the solutions of embodiments.

In addition, the functional units in embodiments of this application may be integrated into one processing unit, each of the units may exist alone physically, or two or more units are integrated into one unit. The integrated unit may be implemented in a form of hardware, or may be implemented in a form of a software function unit.

When implemented in the form of a software function unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in a form of a software product. The software product is stored in a storage medium and includes several instructions for instructing a device (that may be a single-chip microcomputer, a chip, or the like) or a processor (processor) to perform all or some of steps of the method according to embodiments of this application. The foregoing storage medium includes any medium that can store program code, for example, a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method, comprising:
   displaying, by a first electronic device, a first interface of a first application, wherein the first interface comprises at least a first function area and a second function area, and the first application is a video application;
   detecting, by the first electronic device, a touch operation with a second electronic device;
   in response to detecting the touch operation, sending, by the first electronic device, content in the first function area to the second electronic device for display;
   displaying, by the first electronic device, a second interface of the first application, wherein the second interface comprises the second function area but does not comprise the first function area; and
   after sending, by the first electronic device, the content in the first function area to the second electronic device for display, reallocating, by the first electronic device, a display layout of a remaining function area on the first electronic device.

2. The method according to claim 1, wherein:
   the first function area is determined by the first electronic device based on a function area selection operation of a user.

3. The method according to claim 1, wherein:
   the first function area is determined by the first electronic device based on a function area content selection operation of a user; or
   the first function area is autonomously determined by the first electronic device based on a task attribute of content in a function area of the first interface.

4. The method according to claim 1, wherein:
   the first function area is a function area for inputting a comment; or
   the first function area is a function area for playing a video.

5. The method according to claim 4, wherein the first function area is displayed by the first electronic device in the first application in a floating or overlapping manner when the first function area is a function area for inputting a comment.

6. The method according to claim 1, wherein the first function area and the second function area of the first interface are laid out on the first electronic device according to a preset relative position relationship.

7. The method according to claim 1, wherein the first function area and the second function area support an adjustment to an adaptability, and the adaptability comprises a stretching capability, a scaling capability, a hiding capability, a line wrapping capability, an equalization capability, a proportion capability, or an extension capability.

8. The method according to claim 1, further comprising:
   withdrawing, by the first electronic device in response to an operation of a user for triggering to withdraw collaborative display, the content in the first function area from the second electronic device; and
   displaying, by the first electronic device, the first interface of the first application after the first electronic device withdraws the content in the first function area from the second electronic device, wherein the first interface comprises at least the first function area and the second function area.

9. The method according to claim 1, wherein the content in the first function area and the content in the second function area of the first interface are rendered together, by the first electronic device according to a preset framework template, on a virtual screen of the first electronic device in a form of one or more atomic services.

10. The method according to claim 9, wherein sending, by the first electronic device, the content in the first function area to the second electronic device for display comprises:
sending, by the first electronic device, a standard video stream that is on the virtual screen and that corresponds to the content in the first function area to the second electronic device for display.

11. The method according to claim 1, wherein:
the first function area is autonomously determined by the first electronic device based on a function implemented by a function area of the first interface.

12. A first electronic device, comprising:
a memory, storing computer program code, wherein the computer program code comprises instructions;
a radio frequency circuit, configured to send and receive a radio signal; and
at least one processor, configured to execute the instructions, enabling the first electronic device to:
display a first interface of a first application, wherein the first interface comprises at least a first function area and a second function area, and the first application is a video application;
send, in response to a touch operation when the touch operation with a second electronic device is detected, content in the first function area to the second electronic device for display, wherein after the first electronic device sends the content in the first function area to the second electronic device for display, the first electronic device displays a second interface of the first application, and wherein the second interface comprises the second function area but does not comprise the first function area; and
reallocate, after sending the content in the first function area to the second electronic device for display, a display layout of a remaining function area on the first electronic device.

13. The first electronic device according to claim 12, wherein:
the first function area is determined based on a function area selection operation of a user; or
the first function area is autonomously determined based on a function implemented by a function area of the first interface.

14. The first electronic device according to claim 12, wherein:
the first function area is determined based on a function area content selection operation of a user; or
the first function area is autonomously determined based on a task attribute of content in a function area of the first interface.

15. The first electronic device according to claim 12, wherein the first function area is a function area for inputting a comment.

16. The first electronic device according to claim 15, wherein the first electronic device displays the first function area in the first application in a floating or overlapping manner when the first function area is a function area for inputting a comment.

17. The first electronic device according to claim 12, wherein the first function area and the second function area of the first interface are laid out on the first electronic device according to a preset relative position relationship.

18. The first electronic device according to claim 12, wherein the first function area and the second function area support an adjustment to an adaptability, and the adaptability comprises a stretching capability, a scaling capability, a hiding capability, a line wrapping capability, an equalization capability, a proportion capability, or an extension capability.

19. The first electronic device according to claim 12, wherein the first function area is a function area for playing a video.

20. A non-transitory computer readable medium storing instructions that, when executed by at least one processor of a first electronic device, cause the first electronic device to perform operations comprising:
displaying a first interface of a first application, wherein the first interface comprises at least a first function area and a second function area, and the first application is a video application;
detecting a touch operation with a second electronic device;
in response to detecting the touch operation, sending content in the first function area to the second electronic device for display;
displaying a second interface of the first application, wherein the second interface comprises the second function area but does not comprise the first function area; and
reallocating, after sending the content in the first function area to the second electronic device for display, a display layout of a remaining function area on the first electronic device.

* * * * *